(12) United States Patent
Venkatesh et al.

(10) Patent No.: US 12,236,386 B2
(45) Date of Patent: Feb. 25, 2025

(54) SYSTEM AND METHOD FOR ESTIMATING ARRIVAL TIME OF A VEHICLE AT A DESTINATION

(71) Applicant: Argo AI, LLC, Pittsburgh, PA (US)

(72) Inventors: Shubhashree Venkatesh, Fremont, CA (US); Noe Brito, Cupertino, CA (US); Yee-Ning Cheng, Sunnyvale, CA (US); Madhav Chhura, Whittier, CA (US); Sebastian Dovenor, Pittsburgh, PA (US); John Drake, Cranbury, NJ (US); Jonathan Pan, Campbell, CA (US); Jason Parraga, Fremont, CA (US); Scott Plant, San Jose, CA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 222 days.

(21) Appl. No.: 17/650,283

(22) Filed: Feb. 8, 2022

(65) Prior Publication Data

US 2023/0104379 A1    Apr. 6, 2023

Related U.S. Application Data

(60) Provisional application No. 63/292,140, filed on Dec. 21, 2021, provisional application No. 63/252,431, filed on Oct. 5, 2021.

(51) Int. Cl.
*G06Q 10/00*    (2023.01)
*B60W 50/00*    (2006.01)
(Continued)

(52) U.S. Cl.
CPC ....... *G06Q 10/083* (2013.01); *B60W 50/0097* (2013.01); *B60W 60/0011* (2020.02);
(Continued)

(58) Field of Classification Search
CPC .. G06Q 10/00; G06Q 50/00; G06Q 10/06311; G06F 16/285; B60W 60/00253;
(Continued)

(56) References Cited

U.S. PATENT DOCUMENTS 6,850,153 B1    2/2005    Murakami et al.
9,194,168 B1    11/2015    Lu et al.
(Continued)

FOREIGN PATENT DOCUMENTS

WO    2019153082 A1    8/2019
WO    2019213415 A1    11/2019
WO    2020228949 A1    11/2020

OTHER PUBLICATIONS

U.S. Appl. No. 17/650,281, filed Feb. 8, 2022, Systems and Methods for Managing Permissions and Authorizing Access to and Use of Services.
(Continued)

*Primary Examiner* — Mustafa Iqbal
(74) *Attorney, Agent, or Firm* — Fox Rothschild LLP

(57) ABSTRACT

Methods and systems for estimating a time of arrival for a vehicle at a destination are disclosed. The system will access an adjacency graph comprising nodes and edges. Each node is associated with a unique location in a geographic area in which the vehicle is traveling. Each edge connects two of the nodes and is associated with an estimated travel time between the two connected nodes. The system will select, from the locations in adjacency graph, a first location that is near the vehicle and a second location that is near the destination. The location and destination are each associated with nodes in adjacency graph. The system will calculate a shortest path along the edges in the adjacency graph from the location and destination nodes, and it will calculate an
(Continued)

estimated time of arrival for the vehicle as a function of the estimated travel times along the shortest path.

18 Claims, 26 Drawing Sheets

(51) Int. Cl.
    *B60W 60/00*     (2020.01)
    *G01C 21/00*     (2006.01)
    *G01C 21/36*     (2006.01)
    *G06F 16/28*     (2019.01)
    *G06Q 10/0631*     (2023.01)
    *G06Q 10/083*     (2023.01)
    *G08G 1/00*     (2006.01)
    *H04L 9/00*     (2022.01)
    *H04L 9/32*     (2006.01)
    *H04L 9/40*     (2022.01)

(52) U.S. Cl.
    CPC .......... *B60W 60/00253* (2020.02); *B60W 60/00256* (2020.02); *G01C 21/36* (2013.01); *G01C 21/3841* (2020.08); *G01C 21/3856* (2020.08); *G01C 21/387* (2020.08); *G06F 16/285* (2019.01); *G06Q 10/06311* (2013.01); *G08G 1/20* (2013.01); *H04L 9/3213* (2013.01); *H04L 63/0807* (2013.01); *H04L 63/0823* (2013.01); *H04L 63/101* (2013.01); *H04L 63/102* (2013.01); *H04L 63/105* (2013.01); *H04L 63/107* (2013.01); *B60W 2552/00* (2020.02); *B60W 2554/00* (2020.02); *B60W 2556/40* (2020.02); *B60W 2556/45* (2020.02)

(58) Field of Classification Search
    CPC ....... B60W 60/00256; B60W 60/0011; B60W 50/0097; B60W 2552/00; B60W 2554/00; B60W 2556/40; B60W 2556/45; G01C 21/3841; G01C 21/387; G01C 21/3856; G01C 21/36; G08G 1/20; H04L 9/3213; H04L 63/0807; H04L 63/0823; H04L 63/101; H04L 63/102; H04L 63/105; H04L 63/107
    USPC ............................................... 705/7.13
    See application file for complete search history.

(56) References Cited

U.S. PATENT DOCUMENTS

| | | |
|---|---|---|
| 10,073,449 B1 | 9/2018 | Sait |
| 11,228,613 B2 | 1/2022 | Chang et al. |
| 11,397,622 B2 | 7/2022 | Kiraly |
| 2003/0034873 A1 | 2/2003 | Chase |
| 2006/0218085 A1 | 9/2006 | Schuchardt |
| 2006/0265235 A1 | 11/2006 | Schuchardt |
| 2008/0097731 A1 | 4/2008 | Lanes |
| 2014/0108080 A1 | 4/2014 | Mitchell |
| 2014/0156327 A1 | 6/2014 | Cai |
| 2015/0074013 A1 | 3/2015 | Schoonmaker et al. |
| 2015/0142518 A1 | 5/2015 | Farinha Gomes Felix |
| 2015/0294403 A1 | 10/2015 | Chu et al. |
| 2016/0301698 A1 | 10/2016 | Katara et al. |
| 2016/0321665 A1 | 11/2016 | Thomas |
| 2017/0123421 A1 | 5/2017 | Kentley et al. |
| 2017/0132421 A1 | 5/2017 | Unitt |
| 2017/0339031 A1 | 11/2017 | Hu et al. |
| 2018/0003512 A1 | 1/2018 | Lynch |
| 2018/0004202 A1* | 1/2018 | Onaga ................. G05D 1/0027 |
| 2018/0025304 A1 | 1/2018 | Fisher |
| 2018/0188042 A1 | 7/2018 | Chen |
| 2018/0211541 A1 | 7/2018 | Rakah et al. |
| 2018/0216942 A1 | 8/2018 | Wang |
| 2018/0356239 A1 | 12/2018 | Marco |
| 2018/0356837 A1 | 12/2018 | Lisewski |
| 2019/0009794 A1 | 1/2019 | Toyoda |
| 2019/0035282 A1 | 1/2019 | Feguson |
| 2019/0120640 A1 | 4/2019 | Ho et al. |
| 2019/0179336 A1 | 6/2019 | Colijn et al. |
| 2019/0222986 A1 | 7/2019 | Aitken |
| 2019/0228375 A1 | 7/2019 | Laury et al. |
| 2019/0266897 A1 | 8/2019 | Turato |
| 2019/0318028 A1 | 10/2019 | Cao |
| 2020/0033847 A1 | 1/2020 | Way |
| 2020/0089221 A1 | 3/2020 | Bilous |
| 2020/0116509 A1 | 4/2020 | Sakaguchi |
| 2020/0116515 A1 | 4/2020 | Chadha et al. |
| 2020/0118075 A1 | 4/2020 | Yang et al. |
| 2020/0128101 A1 | 4/2020 | Meng |
| 2020/0160709 A1 | 5/2020 | Ramot |
| 2020/0173808 A1 | 6/2020 | Beaurepaire et al. |
| 2020/0191589 A1 | 6/2020 | Tamai et al. |
| 2020/0209002 A1 | 7/2020 | Hou et al. |
| 2020/0241869 A1 | 7/2020 | Niemiec |
| 2020/0314089 A1 | 10/2020 | Iasynetskyi |
| 2020/0334637 A1 | 10/2020 | Turner |
| 2020/0344470 A1 | 10/2020 | Shen |
| 2020/0365015 A1* | 11/2020 | Nguyen ............... G08G 1/0129 |
| 2020/0372428 A1 | 11/2020 | Liu et al. |
| 2020/0380629 A1 | 12/2020 | Monteil et al. |
| 2020/0386558 A1 | 12/2020 | DeLizio |
| 2020/0396227 A1* | 12/2020 | Fan ..................... H04Q 3/0075 |
| 2021/0033416 A1 | 2/2021 | Vladimerou |
| 2021/0035450 A1 | 2/2021 | Gao |
| 2021/0074163 A1 | 3/2021 | Robeson |
| 2021/0090025 A1 | 3/2021 | Bolton |
| 2021/0192405 A1 | 6/2021 | Bristow |
| 2021/0192962 A1 | 6/2021 | Bristow |
| 2021/0224413 A1 | 7/2021 | Gulas |
| 2021/0233390 A1 | 7/2021 | Georgiou |
| 2021/0241625 A1* | 8/2021 | Elisha .................... G08G 1/202 |
| 2021/0309248 A1 | 10/2021 | Choe |
| 2022/0057810 A1 | 2/2022 | Ha |
| 2022/0058309 A1 | 2/2022 | Safira |
| 2022/0063662 A1 | 3/2022 | Sprunk |
| 2022/0292451 A1 | 9/2022 | Massey |
| 2022/0365530 A1 | 11/2022 | Foster |
| 2022/0412764 A1 | 12/2022 | Wu |
| 2023/0015884 A1 | 1/2023 | Cao |
| 2023/0290966 A1 | 1/2023 | Foster |
| 2023/0085943 A1 | 3/2023 | Karri |
| 2023/0086061 A1* | 3/2023 | Srivastava ........... G06Q 30/016 705/333 |
| 2023/0156464 A1 | 5/2023 | Faccin |
| 2023/0205181 A1 | 6/2023 | Kishikawa |

OTHER PUBLICATIONS

U.S. Appl. No. 17/650,286, filed Feb. 8, 2022, System and Method for Generating a Planned Path for a Vehicle Using a Cloud Deployment System.
U.S. Appl. No. 17/650,288, filed Feb. 8, 2022, System and Method for Generating a Planned Path Using a Phantom Vehicle.
U.S. Appl. No. 17/650,289, filed Feb. 8, 2022, Systems and Methods for Defining Serviceable Areas.
Distributed Multi-AUV Coordination in Naval Mine Countermeasure Missions Sanem Sariel, Tucker Balch and Jason Stack Jan. 30, 2006 (Jan. 30, 2006).
On-board Data Mining Steve Tanner, Cara Stein, and Sara J. Graves Jul. 30, 2009 (Jul. 30, 2009).
International Search Report and Written Opinion for PCT/US2023/063542 dated May 30, 2023, 13 pages.
Gonzalez, D. et al., A Review of Motion Planning Techniques for Automated Vehicles, ResearchGate, IEEE Transactions on Intelligent Transportation Systems, vol. 17, No. 4, Apr. 2016.
Yurtsever, E. et al., A Survey of Autonomous Driving: Common Practices and Emerging Technologies, IEEE Access, Apr. 2020.
Graham Scan Algorithm to find Convex Hull, OpenGenus IQ: Computing Expertise & Legacy, 2022, available at https://q.opengenus.org/graham-scan-convex-hull/.

(56) References Cited

OTHER PUBLICATIONS

Amazon Resource Names (ARNs), 2022 Amazon Web Services, Inc., available at https://docs.aws.amazon.com/general/latest/gr/aws-arns-and-namespaces.html.
[Deprecated] Embedding Debezium Connectors, Debezium Documentation / Operations / Embedding Debezium, 2022 Debezium Community, available at https://debezium.io/documentation/reference/operations/embedded.html.
Chang. M. et al., Argoverse: 3D Tracking and Forecasting with Rich Maps, Nov. 6, 2019.
International Search Report and Written Opinion for PCT/US2023/071441 dated Oct. 31, 2023, 9 pages.
Karamanis et al., Vehicle redistribution in ride-sourcing markets using convex minimum cost flows, 2021.

* cited by examiner

| PermissionID(s) | Owner ID | Role ID | Tenant/User ID | Metro ID | Fleet ID |
|---|---|---|---|---|---|
| P₁ | OID₁ | RID₁ | T/UID₁ | MID₁ | FID₁ |
| P₂ | OID₁ | RID₂ | T/UID₁ | MID₁ | FID₁ |
| P₃ | OID₁ | RID₃ | T/UID₁ | MID₁ | FID₁ |
| P₄ | ... | ... | ... | ... | ... |
| P₅ | OID₁ | RID₂ | T/UID₁ | MID₁ | FID₁ |
| P₆ | OID₁ | RID₁ | T/UID₁ | MID₂ | Null |
| P₇ | OID₁ | RID₂ | Null | Null | Null |
| P₈ | OID₁ | RID₃ | T/UID₁ | MID₂ | FID₂ |
| P₉ | OID₁ | RID₄ | T/UID₁ | MID₂ | FID₂ |
| P₁₀ | OID₁ | RID₅ | T/UID₁ | MID₂ | FID₂ |
|  | ... | ... | ... | ... | ... |
| P₁₁ | OID_N | RID₁ | T/UID_U | MID₁ | FID₃ |
| P₁₂ | OID_N | RID₂ | T/UID_U | MID₁ | FID₃ |
| P₁₃ | OID_N | RID₃ | T/UID_U | MID₁ | FID₃ |
| P₁₄ | OID_N | RID₆ | T/UID_U | MID_T | FID_F |
| P_P | OID_N | RID₇ | T/UID_U | MID_T | FID_F |

Table 700

FIG. 7

Encoded Web Authentication Token
1100 eyJ0eXAiOiJKV1QiLCJhbGciOiJIUzI1NiJ9.eyJ
jbGllbnRQcm9maWxlIjoie1widGVuYW50SWRcIjp
cImFjOGI4NjMzLTVkNDgtNGU2Yi1hNmRkLTkyZjB
iYT1hZDc1NVwiLFwidGVuYW50UGVybWlzc21vbnN
cIjpbeIwicm9sZVwiOlwiUk9MRV9BRE1JTk1TVFJ
BVE9SXCIsXCJ1cm5cIjpcImFjOGI4NjMzLTVkNDg
tNGU2Yi1hNmRkLTkyZjBiYT1hZDc1NToxMDMyOmZ
iNDY3MmVhLTVhNDUtNGM0Zi1hYWZmLTM0YTE2OT1
hY2FhNFwifSx7XCJyb2xlXCI6XCJST0xFX0FETU1
OSVNUUkFUT1JcIixcInVyblwiOlwiYWM4Yjg2MzM
tNWQ0OC00ZTZiLWE2ZGQtOTJmMGJhOWFkNzU1OjE
wMzI6NDE4OTFhODUtODFmMC00ZmRlLTlkNjYtODA
5NzA2NGU2MDRlXCJ9XX0iLCJpc3MiOiJhcmdvLmF
pIiwiZXhwIjoxNTg1MTQ5ODkyfQ.Le09RyQvG3KY
D7JCCprirrE-KouZc6duF22rTc5eW98

FIG. 11

Decoded Web Authentication Token
1200

| HEADER: ALGORITHM & TOKEN TYPE |
|---|
| {<br>  "typ": "JWT",<br>  "alg": "HS256"<br>} |
| PAYLOAD: DATA |
| {<br>  "clientProfile": "{\"tenantId\":\"ac8b8633-5d48-4e6b-a6dd-92f0ba9ad755\",\"tenantPermissions\": [{\"role\":\"ROLE_ADMINISTRATOR\",\"urn\":\"ac8b8633-5d48-4e6b-a6dd-92f0ba9ad755:1032:fb4672ea-5a45-4c4f-aaff-34a1699acaa4\"}, {\"role\":\"ROLE_ADMINISTRATOR\",\"urn\":\"ac8b8633-5d48-4e6b-a6dd-92f0ba9ad755:1032:41891a85-81f0-4fde-9d66-8097064e604e\"}]}",<br>  "iss": "argo.ai",<br>  "exp": 1585149892<br>} |

FIG. 12

SYSTEM AND METHOD FOR ESTIMATING ARRIVAL TIME OF A VEHICLE AT A DESTINATION

This patent document claims priority to (i) U.S. Provisional Patent Application No. 63/252,431, filed Oct. 5, 2021, and (ii) U.S. Provisional Patent Application No. 63/292,140, filed Dec. 21, 2021. The disclosures of each priority application are fully incorporated into this document by reference.

STATEMENT OF THE TECHNICAL FIELD

The present disclosure relates generally to computing systems. More particularly, the present disclosure relates to implementing systems and methods for managing permissions and authorizing access to and use of services for systems such as fleets of autonomous vehicles.

BACKGROUND

Description of the Related Art

Cloud computing is being used to provide various services to clients of online service providers. The services include data storage services, data management services and data processing services. Such services are used in autonomous vehicle applications. Autonomous vehicles are now being used to carry people between geographic locations and deliver packages from retailers, food service outlets and other sources. The autonomous vehicles have at least one on-board computer and have internet/satellite connectivity. The software running on these on-board computers monitor and/or control operations of the vehicles. Data associated with operations of the autonomous vehicles may be stored in the cloud.

SUMMARY

This disclosure describes methods, systems and computer program products for estimating a time of arrival for a vehicle at a destination. The system will include a processor, which may include a processor of a producer of adjacency graph as described below, a user of the graph, or a combination of the two. The system and computer program product will include a computer-readable memory and programming instructions that are configured to cause the processor to implement the method. The processor may receive navigation data indicating a present location of the vehicle along a route to a location in a geographic area. The processor will access an adjacency graph comprising various nodes and edges, in which (a) each node is associated with a unique location in a geographic area in which a vehicle is traveling, and (b) each edge connects two of the nodes and is associated with an estimated travel time between the two nodes to which the edge is connected. The processor will select, from in adjacency graph, a first location that is near a present location of the vehicle and a second location that is near the destination. The first location will be associated with a first node in the adjacency graph and the second location will be associated with a second node in the adjacency graph. The processor will calculate a shortest path along the edges in the adjacency graph from the first node to the second node. The processor will then calculate an estimated time of arrival (ETA) for the vehicle as a function of the estimated travel times of the edges along the shortest path. The processor will then generate a message that includes the ETA.

Optionally, in some embodiments, to select the second location that is closest to the destination, the processor may send a request to a service that stores the adjacency graph to identify, from the nodes in the adjacency graph, a node having coordinates closed to the destination. Optionally, the request may include a request to not return any node having coordinates that are not reachable from the route.

Optionally, in any of the embodiments above, to calculate the shortest path, the system may use Dijkstra's algorithm, Floyd's algorithm, a depth-first search algorithm, a breadth-first search algorithm, or the Bellman-Ford algorithm. In addition, when calculating the shortest path the system may disqualify from inclusion in the shortest path any edge that leads to a node that is not reachable via the route.

Optionally, in any of the embodiments above, to calculate the ETA as a function of the estimated travel times of the edges along the shortest path comprise instructions to generate a sum of the estimated travel times of the edges along the shortest path. In addition, to calculate the ETA as a function of the estimated travel times of the edges along the shortest path the system also may, upon receiving traffic data for one or more geographic areas that correspond one or more of the nodes along the shortest path, adjust one or more of the estimated travel times based on the traffic data. Alternatively, upon receiving traffic data for a geographic area that corresponds to an identified node in the adjacency graph, the system may adjust the estimated travel times for each edge to which the identified node is connected each based on the traffic data.

Optionally, in any of the embodiments above, the system may generate the adjacency graph by: (i) accessing a set of points that represent potential destinations in the geographic area; (ii) converting each of the points to a lane in the geographic area to yield a set of lanes; (iii) for each lane in the set, applying Dijkstra's algorithm until another lane in the set is reached to yield at least one adjacent vertex for the lane; and (iv) generating a mapping of each lane in the set to each of its adjacent vertices to yield the adjacency graph.

BRIEF DESCRIPTION OF THE DRAWINGS

The present solution will be described with reference to the following drawing figures, in which like numerals represent like items throughout the figures.

FIGS. 7-8 each show table(s) that is(are) useful for understanding the structure of permissions.

FIG. 12 provides an illustration of a decoded web authentication token.

DETAILED DESCRIPTION

Figure 1:
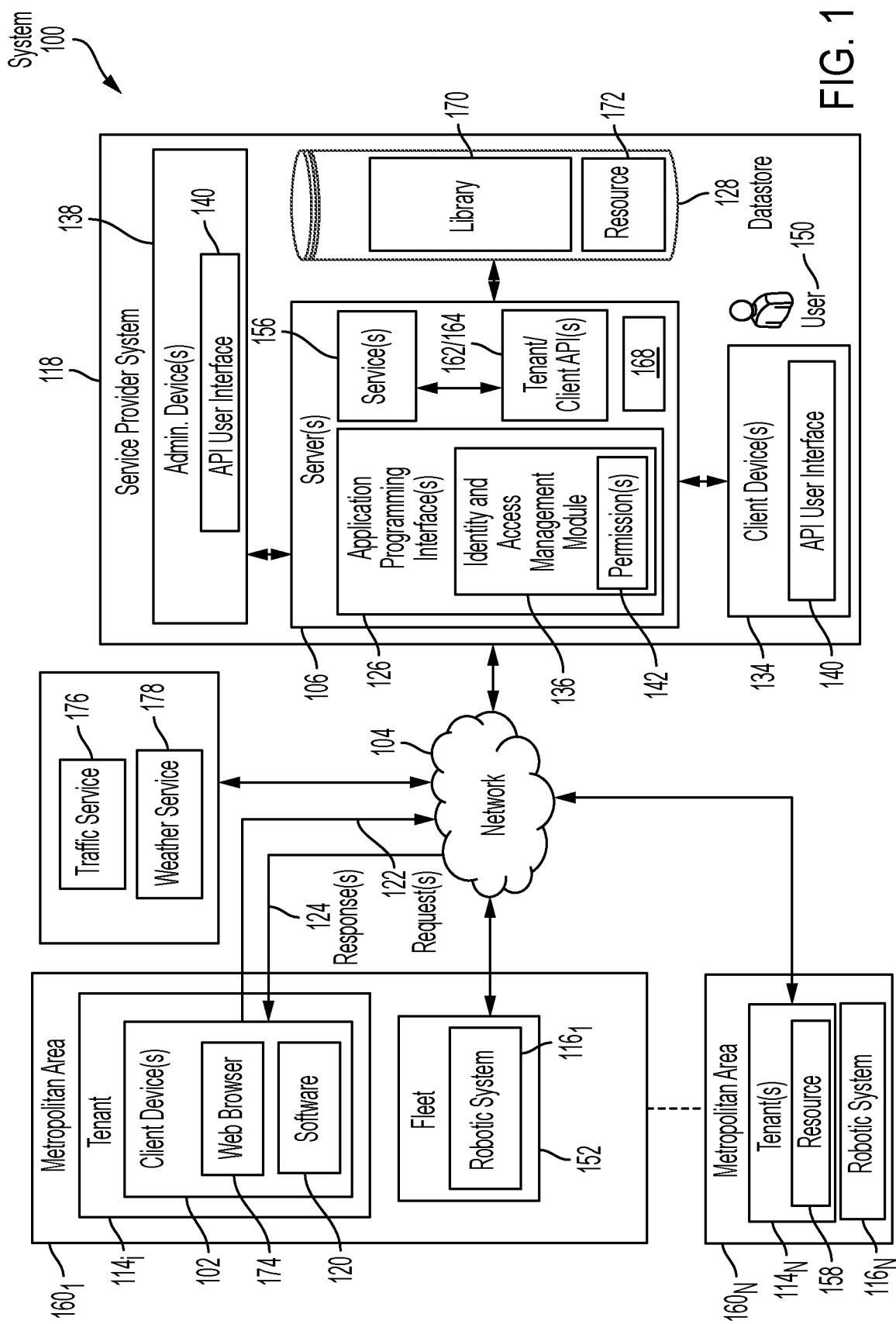
FIG. 1 is an illustration of a system architecture in accordance with aspects of the disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, watercraft, aircraft, aerial drones and the like. An "autonomous vehicle" or "AV" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The present document concerns systems and methods for managing permissions and authorizing access to services relating to autonomous vehicles and/or other robotic systems. The systems are configured to facilitate ride-hailing and item deliveries via vehicles. The term "ride-hailing", as used herein, refers to actions taken by an individual to order a ride in a vehicle (manually operated, semi-autonomous or autonomous) via a ride-hailing platform. The actions may be facilitated by a software application installed on a smart phone or other personal computing device in the possession of the individual. For simplicity, except where specifically denoted when this document uses the term "passenger" it is intended to cover not only people, but also objects such as packages or other delivered cargo. In addition, the terms "ride service" and "ride hailing" are intended to include both passenger and package transportation services.

This document uses the term "metropolitan area" to refer to a mapped geographic area in which a robotic system may move. It is not necessarily intended to be limited to cities that are a metropolis, but in this discussion is used to cover any mapped geographic area, including but not limited to: smaller cities; rural areas; suburban areas; one or more neighborhoods within a city; a waterway or group of waterways; a mapped area within a campus, building or other location; or combinations of any of these.

Notably, the present solution is described in this document in the context of a fleet of autonomous vehicles. However, the present solution is not limited to autonomous vehicle applications. The present solutions may be used in other applications, such with other robotic systems or fleets of non-robotic vehicles. Thus, the term "fleet" is intended to cover a group of autonomous vehicles, non-autonomous vehicles or robotic systems that are operated or managed by a common service provider.

Illustrative Systems

Referring now to FIG. 1, there is provided an illustration of an illustrative system 100 implementing the present solution. System 100 comprises metropolitan areas $160_1, \ldots, 160_N$ in which there may be one or more customers of a service provider. Each customer is referred to herein as a tenant. Each tenant $114_i, \ldots, 114_N$ can comprise or use tenant client device(s) 102 to access one or more fleet(s) 152 of robotic systems $116_1, \ldots, 116_N$ that are operated by the service provider. This access is facilitated by a web browser 174 and/or software 120 installed on the tenant client device(s) 102. The robotic systems $116_1, \ldots, 116_N$ can include, but are not limited to, land vehicles, aircraft, watercraft, subterrenes, spacecraft, drones and/or an articulating arm (for example, with a gripper at a free end). Thus, by way of example, the service provider may be an operator of a fleet 152 of robotic systems such as autonomous vehicles, and tenants $114_i, \ldots, 114_N$ (collectively referred to as tenants 114) may be delivery service operators, ride hailing service operators, or others who need access to the one or more vehicles of the fleet 152 at various times. The robotic systems $116_1, \ldots, 116_N$ of the fleet 152 can be distributed across multiple metropolitan areas as shown, or they can be contained within a single metropolitan area as shown.

Additionally, robotic system assignment is customer agnostic. Robotic systems can be reassigned on a task-by-task, time and/or demand basis. For example, a vehicle can be assigned to deliver packages from a first tenant in the morning of a given day, and subsequently re-assigned to facilitate software application testing or ride-hailing operations by a second, different tenant in the evening of the same day. The present solution is not limited by the particulars of this example. The robotic system assignment/re-assignment feature of the present solution allows a first party to manage the robotic systems, while allowing other second parties to provide services using the robotic systems which are managed by the first party.

The tenant client device(s) 102 can be used by employees or other users of the tenants to send requests 122 for accessing services 156 supported by server(s) 106 of the service provider system 118 and/or for receiving responses 124 from the service provider system 118. The communications between tenant client device(s) 102 and services 156 can be facilitated via tenant API(s) 162. A separate tenant API can be provided for each tenant to allow for scalability for any number of tenants to be integrated into the system 100. In addition, one or more service provider client device(s) 134 can be used by employees or other users of the service to send requests 122 for accessing services 156 supported by server(s) 106 of the service provider system 118 and/or for receiving responses 124 from the service provider system 118. The communications between service provider client device(s) 134 and services 156 can be facilitated via client API(s) 164. A separate client API can be provided for each client of the service provider to allow for scalability for any number service provider clients to be integrated into the system 100. The responses 124 can include, but are not limited to, resources generated by the server(s) 106 (for example, reports, data analytics, map data and/or other information) and/or resources 172 stored in a datastore 128 (for example, as map data, vehicle status information, and/or other information). Various types of services 156 that may be provided by the service provider will be discussed in detail below. The services provided to client devices 102, 134 can include, for example, providing vehicles in response to ride service or delivery service requests, as well as providing current status and/or historical log information of all vehicle runs that the fleet performed or is performing for that tenant. The services provided to service provider client devices 134, for example, can comprise a software testing service to allow a tenant to build Testing as a Service (TaaS) application(s) for ensuring software is functional and meets quality of performance demands, and/or a service for monitoring and/or conducting fleet operations for ride-hailing and item delivery purposes. In addition to service provider client devices 134, optionally the service provider system 118 may include one or more administrator client devices 138, which are service provider devices that are operated by individuals or systems having a higher level of authorization to perform functions that client devices operated by other users 150 may not be permitted to do (such as authorize client devices, as will be discussed below).

The service provider system 118 comprises an Application Programming Interface (API) 126 configured to facilitate assignment of permissions 142 and access management for the services 156. In this regard, API 126 comprises an Identity and Access Management (IAM) module 136. IAM module 136 is configured to (i) facilitate limitation and expansion of tenant permissions for requesting and/or accessing services and/or resources based on tenant identifiers, metropolitan identifiers and/or a fleet identifiers, and (ii) ensure that IAM operations are consistent across all services 156.

Permissions can be assigned by an administrator using an administrator device 138 to each client device operated by a tenant $114_i, \ldots, 114_N$ and/or each user 150 of a client device 134 of the service provider system 118. An API user interface 140 may be displayed on the administrator device 138 to facilitate the management of permissions 142 for tenants $114_i, \ldots, 114_N$ and internal users 150. The permissions 142 are: fine grained enough to specify access down to the tenants, metropolitan area, fleets and/or users; flexible enough that a tenant $114_i$ can be given permissions to a subset of resource(s) 158 of other tenant(s) $114_N$; exposed in web authentication tokens to facilitate instant access by all services 142; and structured in a queryable format. The structure of the permissions will be discussed in detail below.

The service provider system 118 also may receive information from and/or send information to one or more external services via network 104. Example services include a traffic service 176 that supplies real-time, historic and/or predicted future traffic data and a weather service 178 that supplies real-time, historic and/or predicted future weather data for any of the metropolitan areas $160_1 \ldots 160_N$.

Figure 2:
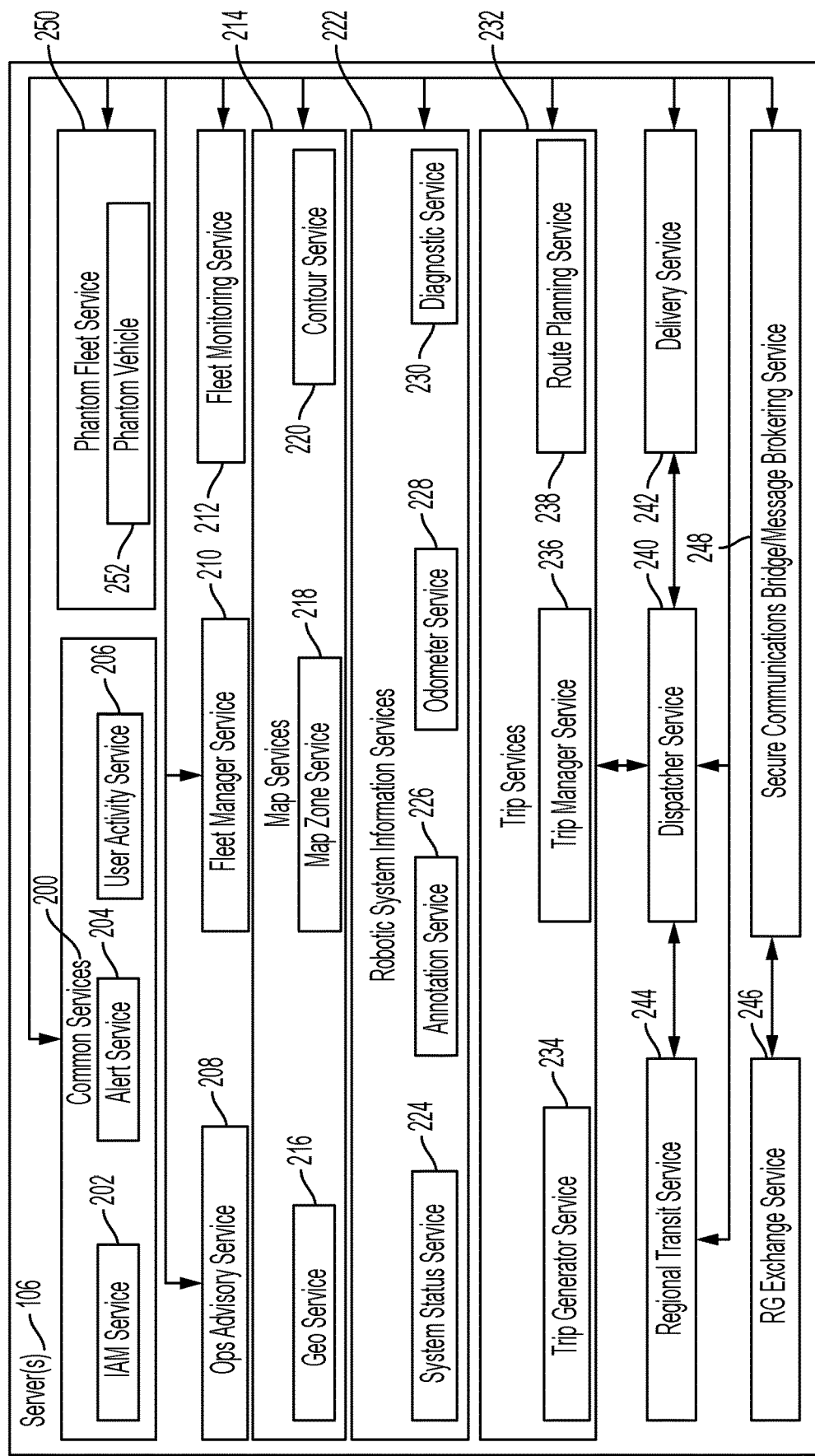
FIG. 2 is an illustration that is useful for understanding services supported by the server(s) shown in FIG. 1.

Referring now to FIG. 2, there is provided an illustration that is useful for understanding services which may be provided by the server(s) 106. The services are generally configured to facilitate real time connection between robotic systems $116_1, \ldots, 116_N$ and service provider system 118, support day-to-day fleet operations, support remote guidance operations for the robotic systems, support item deliveries, and/or support ride hailing and sharing operations.

As shown in FIG. 2, the services can include, but are not limited to, common services 200, an Ops advisory service 208, a fleet manager service 210, a fleet monitoring service 212, map services 214, robotic system information services 222, trip services 232, a dispatcher service 240, a delivery service 242, a regional transit service 244, a Routing Group (RG) exchange service 246, a secure communications bridge/message brokering service 248, and/or a phantom fleet/vehicle service 250.

The secure communications bridge/message brokering service 248 is configured to allow the service provider system 118 to communicate securely with the robotic systems $116_1, \ldots, 116_N$. For example, the service provider system 118 can send commands to the robotic systems $116_1, \ldots, 116_N$, send queries to the robotic systems $116_1, \ldots, 116_N$ for information (for example, current location, current operational state, etc.), and/or receive notifications and other information from the robotic systems $116_1, \ldots, 116_N$. An alert can be issued by the service provider system 118 when connectivity is lost with one or more robotic systems $116_1, \ldots, 116_N$.

The common services 200 include services that are common to a plurality of tenants. Such services can include, for example, an IAM service 202, an alert service 204 and/or a user activity service 206. The IAM service 202 manages identity and access for other services. The IAM service 202 supports authenticating different types of clients as discussed herein and enforcing authorizations. The alert service 204 manages high level alerts raised by other services and provides the same to users of the system (for example, for mission control and remote guidance). The user activity service 206 tracks and indexes API calls made to services for auditing purposes.

The operations advisory service 208 (referred to as Ops Advisory in the figure) provides a means to convey a message to multiple operators of a robotic system or fleet at the same time (for example, when there are co-pilots).

The fleet manager service 210 generally maintains a list of robotic systems for each fleet that the service provider system 118 is to track and maintains a mapping of the fleets to metropolitan or geographic areas. Each fleet is associated with one tenant during a given period of time, but a fleet may be associated with different tenants at different periods of time. In addition, a given tenant may be associated with multiple fleets during any given period of time. Each fleet comprises many robotic systems (for example, autonomous vehicles). In some scenarios, each fleet includes either all real robotic systems or all phantom robotic systems, which will be described in more detail below. Based on the fleet and tenant information, the fleet manager service 210 can authorize tenant access to and use of robotic systems in respective fleets. The manner in which the authorization is achieved can be the same as or similar to that described in relation to FIGS. 7-14.

Each tenant has the ability to define policies that are to be implemented by given fleet(s) and enforced by the fleet manager service 210 during each period of time that a fleet is assigned to that tenant. For example, a tenant can define hours of operation for any number of robotic systems in a fleet (for example, 8 AM EST-3 PM EST Monday through Friday). The system will automatically control each of the individual robotic systems of the fleet to comply with the tenant defined policy (i.e., hours of operation) applicable to that unit. In effect, the fleet manager service 210 causes the robotic systems to be dispatched from a terminal to provide a service in accordance with the tenant defined policy, i.e., begin providing the service at the start of the operating hours, stop providing the service of the end of operating hours, and return to the terminal (for example, for re-fueling or re-charging) until dispatched once again. The present solution is not limited to the particulars of this example.

In some scenarios, the fleet manager service 210 automatically and dynamically re-assigns fleets or individual robotic systems to tenants based on certain information, and whether the information satisfies a rule or other parameters that are associated with a given tenant. The information can include, but is not limited to, hour of day, day of week, week of month, type of service to be provided by the fleet (for example, ride or package/good delivery), overall service demand at a given time, and/or other information.

The fleet manager service 210 may also maintain information specifying features supported by each robotic system. The fleet manager service 210 can cause the robotic systems to be configured (via wireless communications) using parameters based on the fleet assignments to first tenant(s) and re-configured based on fleet re-assignments to different second tenant(s). The configuration and/or re-configuration operations and parameters can include, but is(are) not limited to, setting (or modifying) radio parameters, setting a maximum speed, setting (or modifying) a distance between the robotic system and another robotic system at which breaking is to be initialized, setting (or modifying) a time parameter for the robotic system(s) to leave a terminal, setting (or modifying) ride/delivery rates, and/or setting (or modifying) a time parameter for the robotic system(s) to return to a terminal. The robotic systems can be reconfigured based on changes to fleet policies, fleet/tenant (re)assignments, and/or other criteria.

The fleet monitoring service 212 is configured to assist with consolidated monitoring and/or management of each entire fleet with a focus on mission control and remote guidance user/needs/requirements. The mission control is provided to manage and monitor live interactions with all robotic systems in each fleet in all metropolitan areas. The remote guidance is provided to guide robotic systems through unexpected events (for example, a parked garbage truck or road construction) in an environment (for example, on a roadway).

The map service 214 comprises a geographic service 216 (referred to in the figure as a geo service), a map zone service 218 and a contour service 220. The geo service 216 provides APIs to ingest vector maps, provide lane identifiers in a given map, provide a list of places where a robotic system can stop, and/or maintain identifiers for a closest place where a robotic system can stop to a given latitude and longitude. The map zone service 218 provides geo-polygons as zones on a map that have a special meaning, and performs operations associated with the zones such as fleet tracking and/or favorite location marking.

The contour service 220 provides clients with the ability to retrieve serviceable areas for robotic systems in given metropolitan areas. The contour service 220 generates, maintains and/or updates map data including information denoting serviceable areas in a given metropolitan area (for example, metropolitan area $160_1, \ldots, 160_N$ of FIG. 1) and/or information specifying connected zones within which trips by robotic systems are expected to be successful. Each serviceable area can be denoted via a geometric shape (for example, a polygon) defined by 2D or 3D map coordinates (for example, x-coordinate, y-coordinate, and/or z-coordinate). The geometric shape can be selected, calculated or otherwise defined using information from the geo service 216 (for example, the list of places where a robotic system is allowed to travel and/or stop). Routes can be defined in the map between connected zones.

An abstraction of the map data can be provided to users of the contour service 220. The map data abstraction can be presented to users via a web page using a web browser (for example, web browser 174 of FIG. 1) and/or a software application (for example, a mobile application). The web page and/or software application is/are configured to facilitate the display of a map including identifiers (for example, icons) for places where robotic systems can route to/from (referred to in this document as route locations, or RLs) or places where the robotic system can stop (referred to in this document as pick-up/drop-off locations, or PUDOLs), indications for serviceable areas (for example, semi-transparent polygon overlaid on a road map) and/or indications of routes between connected zones (for example, lines overlaid on the road map). The web page and/or software application may also be configured to assist with improving the parameters used in a contours algorithm to calculate or otherwise determine serviceable areas, connected zones and/or routes between connected zones.

In some scenarios, the contours algorithm is configured to compute contours on a given map based on RLs and/or the PUDOLs. The contours algorithm can include, but is not limited to, a Density-Based Spatial Clustering of Applications with Noise (DBSCAN) algorithm, concave hull algorithm, convex hull algorithm and/or a Graham's Scan (GS) algorithm. In some scenarios, the DBSCAN algorithm is configured to determine clusters of RLs and/or PUDOLs. Each cluster comprises a plurality of RLs and/or PUDOLs which have been grouped together based on certain criteria. The criteria can include, but is not limited to, a distance between RLs (for example, a Euclidean distance), a distance between PUDOLs (for example, a Euclidean distance), a minimum number of RLs required for a cluster, a minimum number of PUDOLs required for a cluster, a minimum number of neighbor RLs for a given RL, a minimum number of neighbor PUDOLs for a given PUDOL, and/or reachability of an RL to all other neighboring RLs, reachability of a PUDOL to all other neighboring PUDOLs (for example, an AV can drive from point A to point B, where point A is PUDOL of interest and point B is a neighboring PUDOL). For example, two RLs or PUDOLs are considered neighbor RLs or PUDOLs when the distance therebetween is less than or equal to a threshold value. The threshold value can be defined based on an acceptable walking distance between RLs or PUDOLs. A given RL or PUDOL is marked or classified as a core RL or PUDOL when the given RL or PUDOL has a total number of neighbor RLs or PUDOLs exceeding the minimum number of neighbor RLs or PUDOLs. In contrast, a given RL or PUDOL is marked or classified as a border RL or PUDOL when it (i) has a total number of neighbor RLs or PUDOLs less than the minimum number of neighbor RLs or PUDOLs and (ii) is reachable from a core RL or PUDOL (for example, an AV can drive from point A to point B, where point A is RL or PUDOL of interest and point B is a neighboring RL or PUDOL). Otherwise, a given RL or PUDOL is marked or classified as an outlier RL or PUDOL that is located in a low-density region.

Once the clusters of RLs and/or PUDOLs have been determined, the GS algorithm is performed to create a geometric shape (for example, polygon) for each cluster. The GS algorithm generally finds a convex hull of a finite set of points in a plane. The GS algorithm finds all nodes of the convex hull ordered along its boundary. Next, neighbor clusters are identified. Two clusters are neighbors when there exists a route between them for a robotic system. The route can be identified using, for example, a routing library (for example, library 170 of FIG. 1) stored in a datastore (for example, datastore 128 of FIG. 1). Neighbor clusters can facilitate knowledge as to whether an individual can request a ride from one part of town to another part of town.

The robotic system information services 222 can include a system status service 224, an annotation service 226, an odometer service 228 and a diagnostic service 230. The system status service 224 monitors, tracks and logs information about operations, operational states, activities, task initializations, task completions, locations and/or system faults/errors of the robotic systems. The annotation service 226 receives and stores annotations that are created in robotic systems in real time. The odometer service 228 consumes, stores and makes available odometer readings for robotic systems. The diagnostic service 230 provides a set of health signals that can be used by one or more other services.

The trip service 232 can include a trip generator service 234, a trip management service 235 and a route planning service 238. The trip generator service 234 may automatically generate and assign trips to robotic systems based on a template. The trip management service 235 provides trip related APIs, validates if a given trip can be completed within desired parameters, and handles trip related requests for the robotic systems. The route planning service 238 plans trips for robotic systems in accordance with rules.

The dispatcher service 240 supports a mobile rider application with various functionalities. These functionalities can include, but are not limited to, rides and ride progress, serviceable areas for rides, user authentication, ride payment, electronic notifications, and/or robotic system dispatching. The delivery service 242 facilitates item ordering, payments and/or robotic system dispatching for delivering a paid-for item or other transported cargo. The regional transit service 244 facilitates the provision of transit services by robotic systems (for example, autonomous, semi-autonomous and/or teleoperated vehicles). The RG exchange service 246 monitors robotic systems and other devices in the system, tracks requests through their life-cycles, and allocates operators to tasks.

The phantom fleet service 250 provides simulations of robotic system operations in accordance with other services, including those described above. This service facilitates: integration and large scale testing; training for an added feature without impacting real robotic systems; building of fully functional user interfaces that behave exactly the same way as a user interface for a corresponding real robotic system in a fleet operates; integration and testing of proprietary software of tenants prior to deployment to real robotic systems; and testing of new functionalities without impacting real robotic systems (for example, to test a customer's new or upgraded rider application). For example, the phantom fleet service 250 facilitates simulation of a robotic systems trip from a first geographic location to a second geographic location defined in a map while interacting with various other services of the system. The results of the simulation may indicate the routes that phantom robotic systems took during the simulated trips, the movements of the phantom robotic systems along the various routes, and/or whether the individual trips were completed by the corresponding phantom robotic system. The present solution is not limited to the particulars of this example.

The phantom fleet service 250 exists on the server(s) 106 concurrent with, and behaves the same as, the real robotic systems $116_1, \ldots, 116_N$ and provides customer(s) with remote interface(s) to predict and understand the impacts of fleet growth. The phantom vehicle(s) 252 may pick-up and drop-off virtual passengers and/or cargo and show logistics/performance ahead of actually deploying those physical robotic systems (virtual beta type of fleet scaling).

Figure 3:
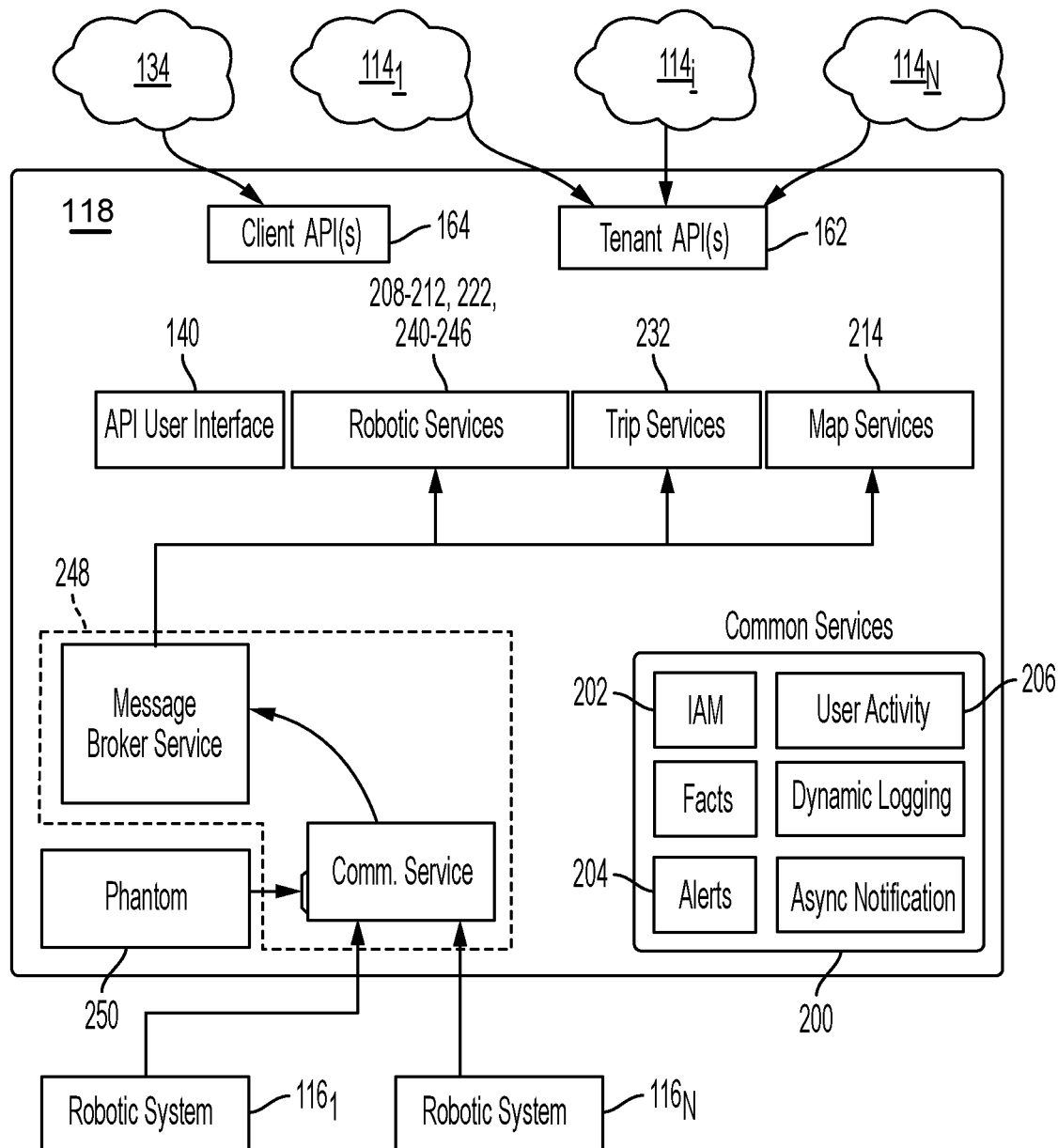
FIGS. 3-4 each provide an illustration that is useful for understanding interactions between tenant, users, robotic systems and services.

FIG. 3 provides an illustration that shows interactions between service provider client devices(s) 134, tenants 114$_1$, . . . , 114$_N$, robotic systems 116$_1$, . . . , 116$_N$ and the service provider system 118. The client API(s) 164 allow(s) the service provider client device(s) 134 and the service(s) 156 to communicate with each other. Similarly, the tenant API(s) 162 allow the tenants 114 and the service(s) 156 to communicate with each other. As described above in relation to FIG. 2, the service(s) can include, but are not limited to, secure communications bridge/message brokering service 248, one or more common services 200, robotic service(s) 208-212, 222, 240-246, trip services 232, map services 214, and/or a phantom fleet service 250. The common services can include, but are not limited to, the IAM service 202, alert service 204, user activity service 206, facts service(s), dynamic logging service(s), and/or asynchronous notification service(s). The secure communications bridge/message brokering service 248 allows the robotic system(s) 116 and the service provider system 118 to communicate with each other in a secure manner.

Figure 4:
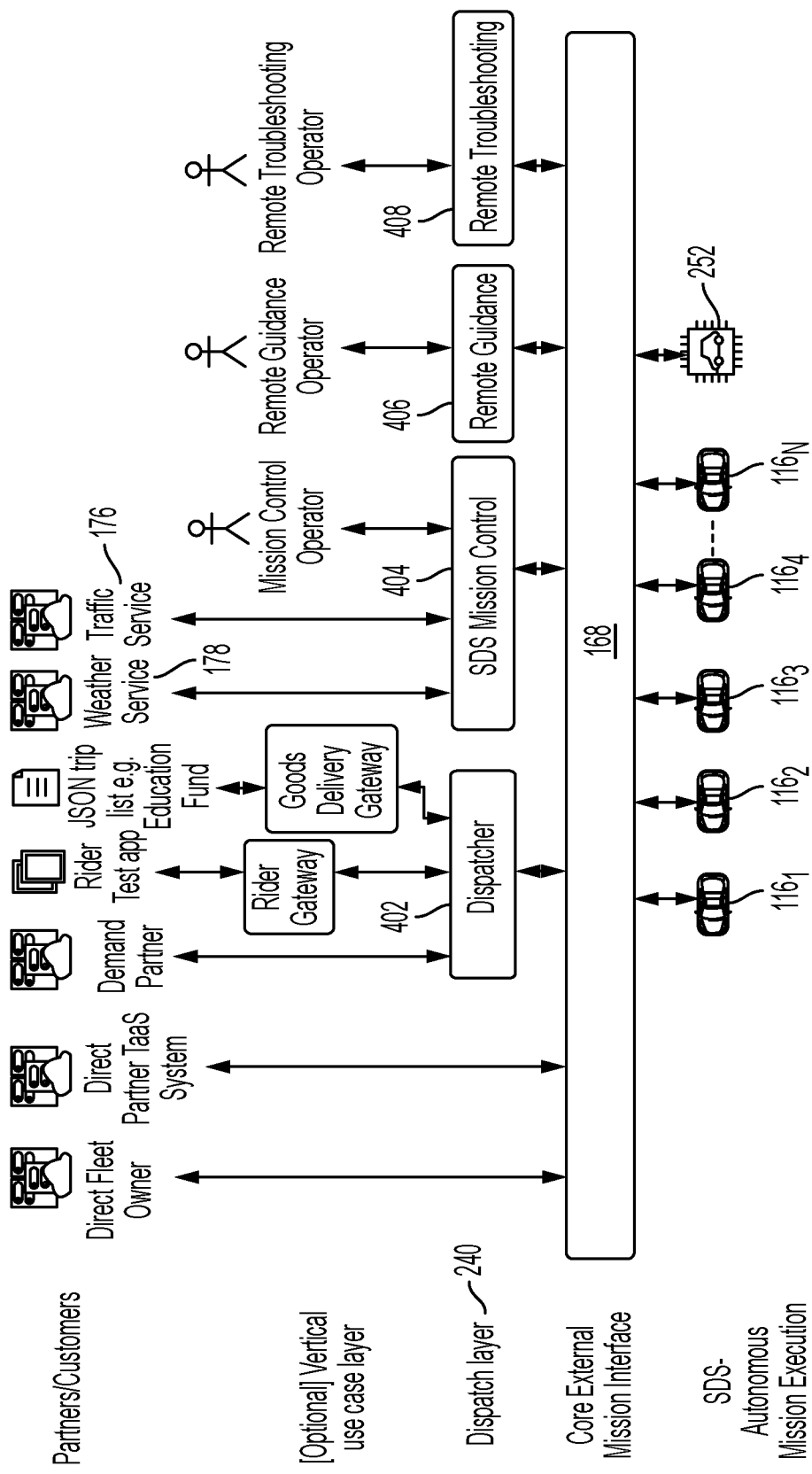

FIG. 4 provides an illustration that shows an architecture that is useful for understanding the dispatch service 240. The dispatch service 240 supports a mobile rider application with certain functionalities. In addition to those listed above, the functionalities can include, but are not limited to, a dispatcher function 402, a mission control function 404, a remote guidance function 406 and a remote troubleshooting function 408. The dispatcher function 402 is generally configured to facilitate dispatching of robotic systems 116 in accordance with scheduled tasks (for example, scheduled pick-up/drop-off task). The mission control function 404 is configured to manage missions (for example, a ride hailing mission or cargo delivery mission) by directing and controlling operations of the robotic systems 116. The missions can be managed using traffic information from the traffic service 176 and/or weather information from the weather service 178. The remote guidance function 406 is configured to supervise and/or guide tasks (for example, scheduled pick-up/drop-off task) from a remote location. The remote trouble shooting function 408 is configured to solve problems for a robotic system and/or a fleet of robotic systems from a remote location.

Figure 5:
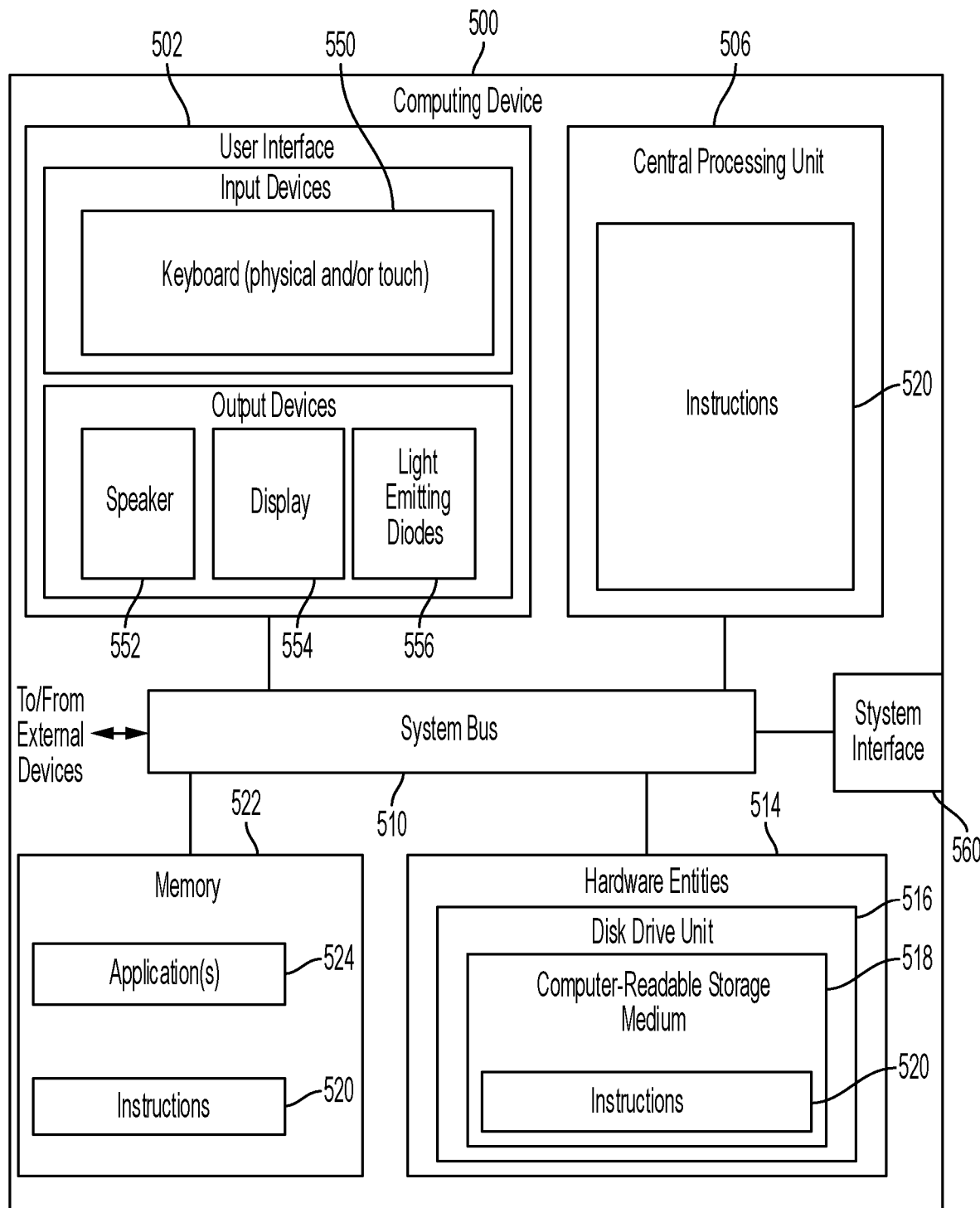
FIG. 5 is an illustration of a computing device that is useful for implementing various embodiments.

FIG. 5 provides an illustration of an illustrative architecture for a computing device 500. The client device(s) 102, 134, resources 158, robotic systems 116$_1$, . . . , 116$_N$, server(s) 106 and/or administrator device 138 of FIG. 1 may be the same as or similar to computing device 500. As such, the discussion of computing device 500 is sufficient for understanding the listed devices of FIG. 1.

Computing device 500 can be any now or hereafter known computer capable of performing functions described herein. Computing device 500 may include more or less components than those shown in FIG. 5. For example, the computing device may comprise a Graphics Processing Unit (GPU). However, the components shown are sufficient to disclose an illustrative solution implementing the present solution. The hardware architecture of FIG. 5 represents one implementation of a representative computing device configured to facilitate access to services as described herein. As such, the computing device 500 of FIG. 5 implements at least a portion of the method(s) described herein.

Some or all components of the computing device 500 can be implemented as hardware, software and/or a combination of hardware and software. The hardware includes, but is not limited to, one or more electronic circuits. The electronic circuits can include, but are not limited to, passive components (for example, resistors and capacitors) and/or active components (for example, amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit(s) (CPU(s)) 506, a system bus 510, a memory 522 connected to and accessible by other portions of computing device 500 through system bus 510, a system interface 560, and hardware entities 514 connected to system bus 510. The user interface can include input devices and output devices, which facilitate user-software interactions for controlling operations of the computing device 500. The input devices include, but are not limited to, a physical and/or touch keyboard 550. The input devices can be connected to the computing device 500 via a wired or wireless connection (for example, a Bluetooth® connection). The output devices include, but are not limited to, a speaker 552, a display 554, and/or light emitting diodes 556. System interface 560 is configured to facilitate wired or wireless communications to and from external devices (for example, network nodes such as access points, etc.).

At least some of the hardware entities 514 perform actions involving access to and use of memory 522, which can be a Random Access Memory (RAM), a disk drive, flash memory, a Compact Disc Read Only Memory (CD-ROM) and/or another hardware device that is capable of storing instructions and data. Hardware entities 514 can include a disk drive unit 516 comprising a computer-readable storage medium 518 on which is stored one or more sets of instructions 520 (for example, software code) configured to implement one or more of the methodologies, procedures, or functions described herein. The instructions 520 can also reside, completely or at least partially, within the memory 522 and/or within the CPU 506 during execution thereof by the computing device 500. The memory 522 and the CPU 506 also can constitute machine-readable media. The term "machine-readable media", as used here, refers to a single medium or multiple media (for example, a centralized or distributed database, and/or associated caches and servers) that store the one or more sets of instructions 520. The term "machine-readable media", as used here, also refers to any medium that is capable of storing, encoding or carrying a set of instructions 520 for execution by the computing device 500 and that cause the computing device 500 to perform any one or more of the methodologies of the present disclosure. The term "computer program product" refers to non-transitory, machine-readable media together with the computer programming instructions that are stored on such media.

Figure 6:
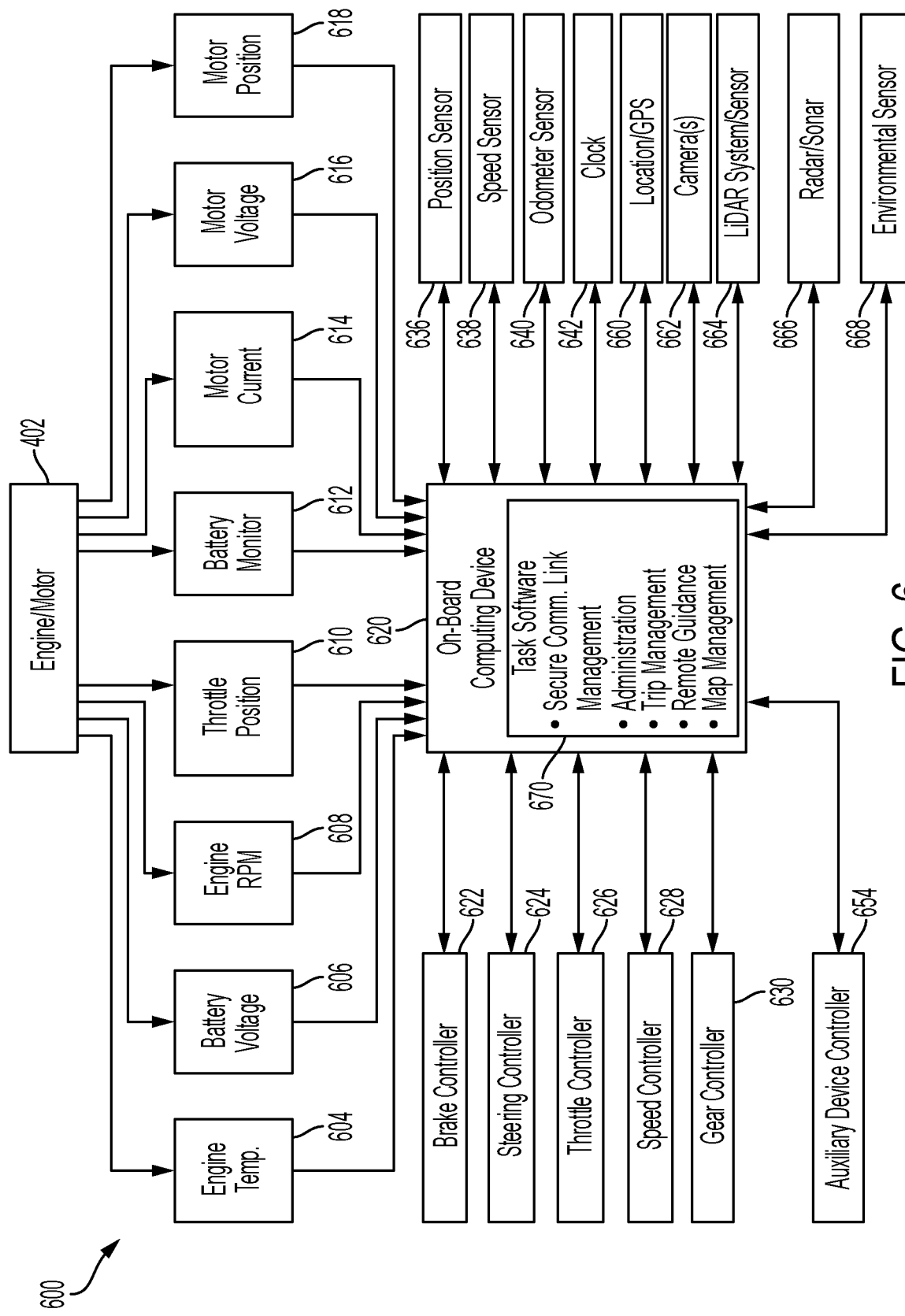
FIG. 6 provides a block diagram of a robotic system in accordance with aspects of the disclosure.

FIG. 6 provides an illustration of an architecture for a robotic system 600. Robotic systems 116$_1$, . . . , 116$_N$ of FIG. 1 can have the same or similar system architecture as that shown in FIG. 6. Thus, the following discussion of robotic system 600 is sufficient for understanding robotic systems 116$_1$, . . . , 116$_N$ of FIG. 1.

As shown in FIG. 6, robotic system 600 includes an engine or motor 602 and various sensors 604-618 for measuring various parameters of the robotic system. As noted above, the robotic system can include, but is not limited to, mobile platforms. In gas-powered or hybrid mobile platforms having a fuel-powered engine, the sensors may include, for example, an engine temperature sensor 604, a battery voltage sensor 606, an engine Rotations Per Minute (RPM) sensor 608, and a throttle position sensor 610. If the mobile platform is an electric or hybrid mobile platform, then the robotic system may have an electric motor, and accordingly will have sensors such as a battery monitoring system 612 (to measure current, voltage and/or temperature of the battery), motor current 614 and motor voltage 616 sensors, and motor position sensors such as resolvers and encoders 618.

Operational parameter sensors that are common to both types of mobile platforms include, for example: a position sensor 636 such as an accelerometer, gyroscope and/or inertial measurement unit; a speed sensor 638; and an odometer sensor 640. The robotic system 600 also may have a clock 642 that the system uses to determine robotic system time during operation. The clock 642 may be encoded into an on-board computing device, it may be a separate device, or multiple clocks may be available.

The robotic system 600 also will include various sensors that operate to gather information about the environment in which the robotic system is traveling. These sensors may include, for example: a location sensor 648 (for example, a Global Positioning System (GPS) device); and image-based perception sensors such as one or more cameras 662. The sensors also may include environmental sensors 668 such as a precipitation sensor and/or ambient temperature sensor. The image-based perception sensors may enable the robotic system to detect objects that are within a given distance range of the robotic system 600 in any direction, while the environmental sensors collect data about environmental conditions within the robotic system's area of travel.

During operations, information is communicated from the sensors to the on-board computing device 620. The on-board computing device 620 can be the same as or similar to computing device 500 described above. The on-board computing device 620 can (i) cause the sensor information to be communicated from the robotic system to an external device (for example, computing device(s) 102 and/or server(s) 106 of FIG. 1) and/or (ii) use the sensor information to control operations of the robotic system. For example, the on-board computing device 620 may control: braking via a brake controller 632; direction via a steering controller 624; speed and acceleration via a throttle controller 626 (for example, in the context of a gas-powered vehicle) or a motor speed controller 628 (such as a current level controller in the context of an electric vehicle); a differential gear controller 630 (in vehicles with transmissions); and/or other controllers. The on-board computing device 620 may further perform secure communication link management operations, administration tasks, trip management operations, remote guidance operations and/or map management operations.

Geographic location information may be communicated from the location sensor 648 to the on-board computing device 620, which may then access a map of the environment that corresponds to the location information to determine known fixed features of the environment such as streets, buildings, stop signs and/or stop/go signals.

In some scenarios, the on-board computing device 620 detects a moving object and performs operations when such detection is made. For example, the on-board computing device 620 may generate one or more possible object trajectories for the detected object, and analyze the possible object trajectories to assess the probability of a collision between the object and the robotic system if the robotic system was to follow a given platform trajectory. If the probability does not exceed the acceptable threshold, then the on-board computing device 620 may cause the robotic system 600 to follow the given platform trajectory. If the probability exceeds an acceptable threshold, the on-board computing device 620 performs operations to: (i) determine an alternative platform trajectory and analyze whether the collision can be avoided if the robotic system follows this alternative platform trajectory; or (ii) causes the robotic system to perform a maneuver (for example, brake, accelerate, or swerve).

FIG. 7 provides a table 700 that is useful for understanding the structure of permissions 142 that may be employed by system 100. Table 700 can be stored in server(s) 106 of FIG. 1 and/or datastore 128 of FIG. 1. Permissions may be structured as a role along with a corresponding scope for that role. The role defines which services a computing device can communicate with when being used by an individual with a granted level of authority. The level of authority can include, but is not limited to, roles such as an administrator, a remote guidance operator, a mission specialist, or a viewer. The scope defines which resources can be returned to the computing device in response to queries or requests (for example, data for certain fleet(s)). The resources can include, but are not limited to, document(s), map data, report(s), data analytic(s), command(s) and/or control information, parameter value(s), trip detail(s), vehicle status information, data log(s) and/or other information. The roles map to permissions associated with the resources defined by the scope (for example, viewXXX or manageXXX). For example, an administrator may have a view trips permission and a manage trips permission, while a viewer may only have a view trips permission. Permissions are associated with two entities: tenants and users. Tenants represent organizations external to the service provider, while users represent employees of the service provider. Tenants and users can each have one or more permissions.

As shown in table 700, each permission entry or row comprises the following elements: a permission identifier $P_1, \ldots, P_p$; an owner identifier $OID_1, \ldots, OID_N$; a role identifier $RID_1, \ldots, RID_Z$; and a scope. The scope includes a tenant/user identifier $T/UID_1, \ldots, T/UID_U$, a metropolitan identifier $MID_1, \ldots, MID_T$, and a fleet identifier $FID_1, \ldots, FID_F$. The permission identifiers $P_1, \ldots, P_r$ identify permission entries. The owner identifier OID identifies a tenant or user that owns the permission. The role identifier RID can identify a level of authority associated with a given tenant/user. The tenant/user identifier T/UID identifies a tenant $114_i, \ldots, 114_N$ of FIG. 1 (for example, company A, company B, etc.) or user 150 of FIG. 1 for which access is being granted. The tenant/user identifier T/UID can be the same as or different than the owner identifier. The metropolitan identifier MID identifies a metropolitan area $160_1, \ldots, 160_W$ of FIG. 1. The fleet identifier FID identifies a fleet 152 of FIG. 1. For example, a remote guidance operator working for a company in Miami, Florida has the following permission: Role—Operator; Tenant ID—Vehicle OEM; Metro ID—Miami, Florida; and Fleet ID—South Beach Demo. The present solution is not limited to the particulars of this example.

The scope is hierarchical in the sense that each element further narrows the scope of permissions for obtaining access to stored resources. As noted above, a scope is defined by a tenant/user identifier T/UID, a metropolitan identifier MID and a fleet identifier FID. During datastore query operations, the scope is used to identify or select resources to retrieve from the datastore (for example, datastore 128 of FIG. 1). The resources are identified/selected by comparing the contents of the scope to contents of a table in which Universal Resource Identifiers (URNs) are associated with resource identifiers. Each URN comprises a tenant value, a metro value and a fleet value. A resource is identified/selected when the tenant identifier of the scope matches the tenant value of the URN, the metropolitan identifier of the scope matches the metro value in the URN, and/or the fleet identifier in the scope matches the fleet value in the URN.

Since the scope is hierarchical, elements of the scope can be omitted starting from the bottom of the hierarchy to indicate wildcarding. The wildcarding can result in the identification of: a large number of resources when only the tenant identifier of the scope has a value other than null; a reduced number of resources when the tenant identifier and the metropolitan identifier of the scope have values other than null; and a further reduced number of resources when the tenant, metro and fleet identifiers of the scope have values other than null. For example, a test manager for a robotic system is located in Palo Alto and has the following scope which is absent of a fleet identifier: Role ID—Operator; Tenant—Company A; Metro ID—Palo Alto; Fleet ID—Null. In contrast, a software developer has the following scope: Role ID—Administrator; Tenant ID—Null; Metro ID—Null; Fleet ID—Null. The number of resources provided to the test manager is greater than the number of resources provided to the software developer. The present solution is not limited to the particulars of this example.

Figure 8:
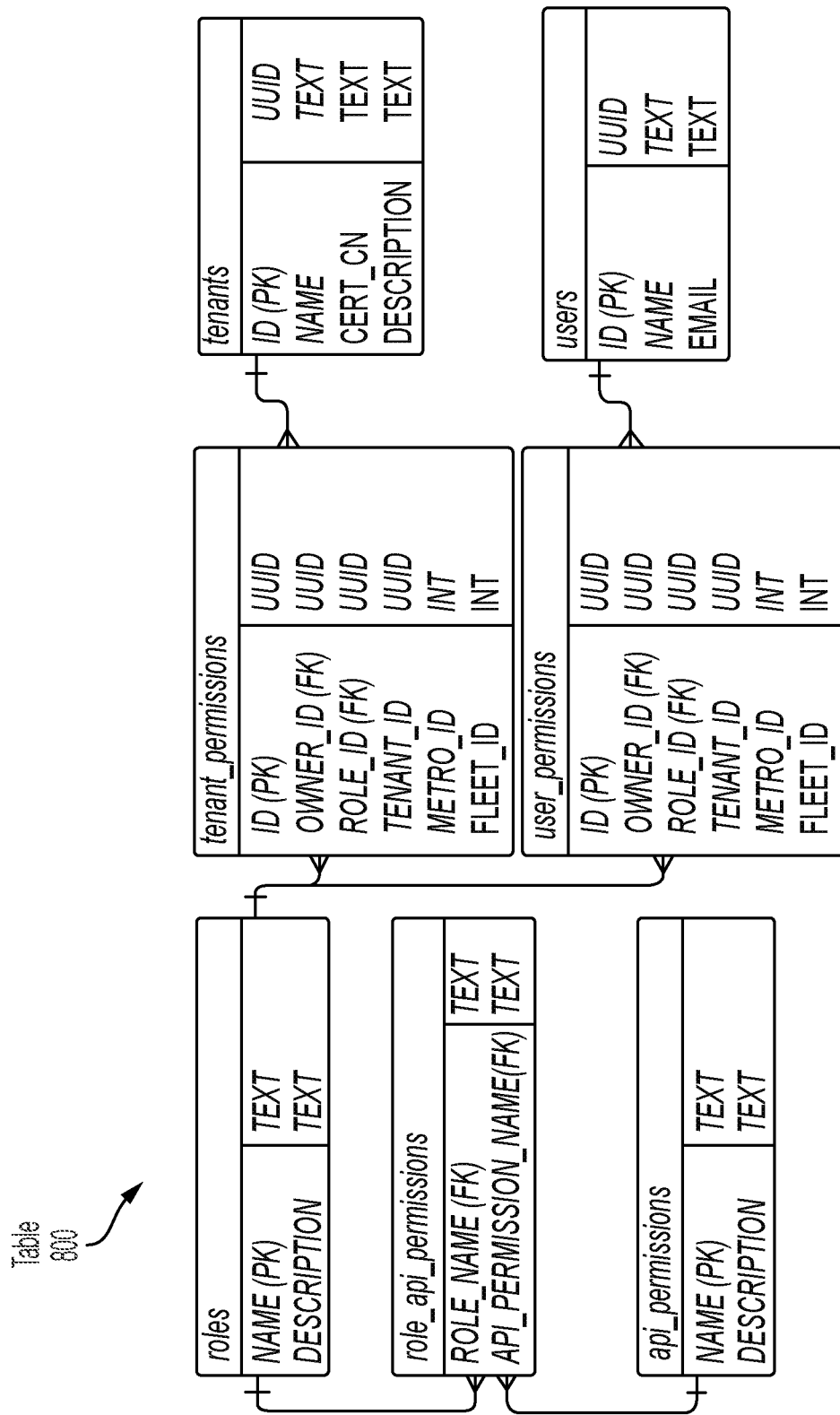

The present solution is not limited to the permissions structure of FIG. 7. In other scenarios, permissions can be structured as a plurality of tables 800 as shown in FIG. 8. The tables can include, but are not limited to, tenant tables, tenant_permissions tables, user tables, a user_permissions tables, role tables, role_api_permissions tables, and api_permissions tables. Each tenant table comprises a table identifier ID(PK), a tenant name NAME, a certificate common name CERT_CN, and a tenant description DESCRIPTION. Each tanant_permission table comprises a table identifier ID(PK), an owner identifier OWNER ID(FK), a role identifier ROLE IF(FK), a tenant identifier TENANT_ID, a metropolitan area identifier METRO_ID, and a fleet identifier FLEET_ID. Each user table comprises a table identifier, ID(PK), a username NAME, and an email address EMAIL for the user. Each user_permission table comprises a table identifier ID(PK), an owner identifier OWNER ID(FK), a role identifier ROLE IF(FK), a tenant identifier TENANT_ID, a metropolitan area identifier METRO_ID, and a fleet identifier FLEET_ID. Each role table comprises a role name NAME(PK) and a role description DESCRIPTION. Each role_api_permissions table comprises a role name ROLE_NAME(FK) and a API permission name API_PERMISSION_NAME(FK). Each api_permission table comprises an API permission name NAME(PK) and an API permission description DESCRIPTION. The table connection lines illustrate how information in one table can be used to access information in another table. This multi table solution also provides a means to map information of one table to information in another table (for example, a ROLE_ID(FK) in a tenant_permission table can be mapped to a NAME(PK) in an api_permission table).

Figure 9:
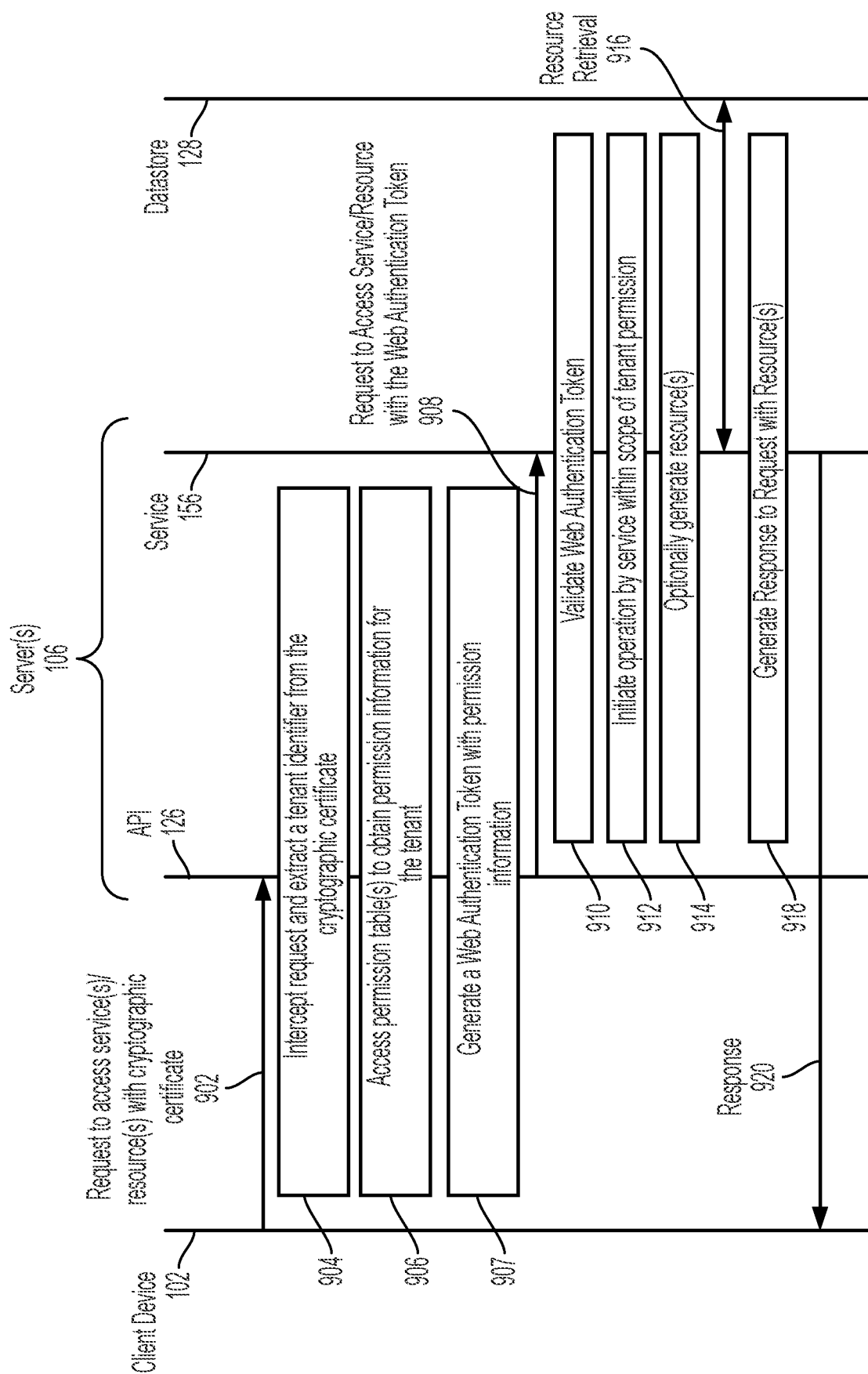
FIG. 9 provides an illustration that is useful for understanding how permissions are used for authorizing a tenant's access to services.
Figure 10:
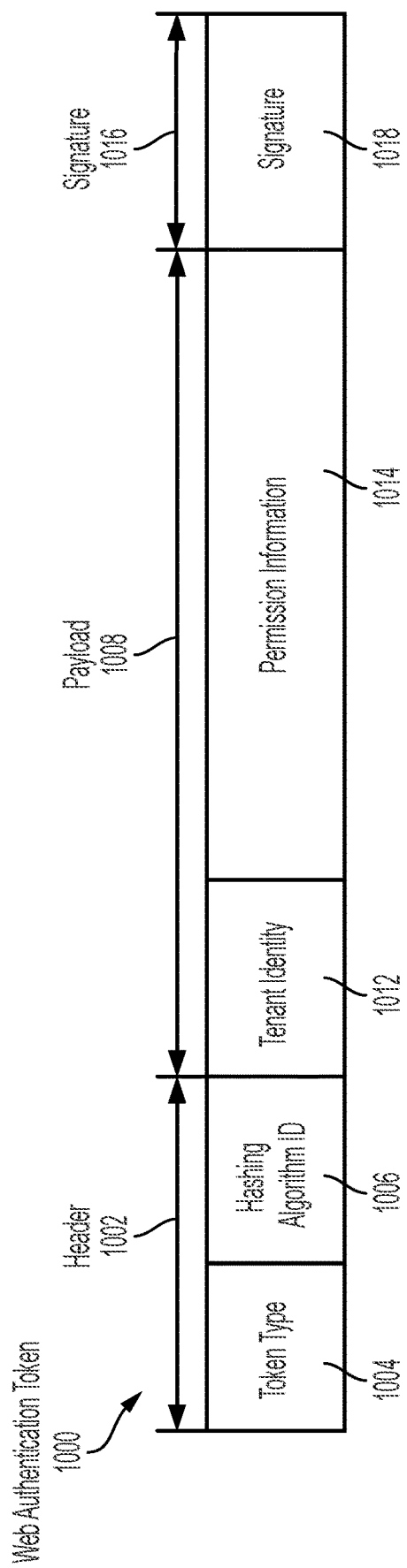
FIG. 10 provides an illustrative architecture for a web authentication token FIG. 11 provides an illustration of an encoded web authentication token.

FIG. 9 provides an illustration that is useful for understanding how permissions 142 may be used in system 100 for authorizing a tenant's access to services 156. During operation of system 100, a client device 102 of the tenant 114 generates and sends a request 902 to the service provider system 118. In some examples the request may be received by server(s) 106. The request is for accessing service(s) 156 and/or resource(s) 172. For example, the request is for accessing and viewing data including statuses of all vehicles in any fleet associated with a given tenant (for example, car company A) and located in a given metropolitan area (for example, Pittsburgh). A cryptographic certificate is communicated along with the request.

The API 126 intercepts and performs operations to extract a tenant identifier from the cryptographic certificate as shown by 904. The extracted tenant identifier is used to obtain permission information from permission tables (for example, permission table 700 of FIG. 7 or tables 800 of FIG. 8), as shown by 906. The permission information includes a role identifier (for example, $RID_1$ of FIG. 7) and a scope. In some examples, the scope may be defined by at least the tenant identifier (for example, $T/UID_1$ of FIG. 7), a metropolitan identifier (for example, $MID_1$ of FIG. 7) and a fleet identifier (for example, $FID_1$ of FIG. 7). It should be appreciated that other factors may also be employed to define one or more scope properties associated with a tenant at a given time.

The API 126 then generates a web authentication token including the permission information as shown by 907. An illustration of a web authentication token 1000 is provided in FIG. 10. A shown in FIG. 10, the web authentication token 1000 comprises a header portion 1002, a payload portion 1008 and a signature portion 1016. The header portion 1002 comprises a token type 1004 and a hashing algorithm identifier 1006. The payload portion 1008 comprises a tenant identity 1012 and permission information 1014. The tenant identity 1012 can be the same as or different than the tenant identifier in the permission information 1014. An example is provided below that shows a user tenant identity 812 that differs from the tenant identifier of permission information 814.

```
{
  "clientProfile": "{
    "tenantId" : "2e077f64-2f56-4ad3-94bf-25331eb5c6e1"
    "user" : {
      "id" : "92001490-41ae-457a-a28d-32ac49fa7dba",
      "displayName" : "Joe Smith",
      "email" : "jsmith@company.ab"
    },
    "newPermissions" : [ {
      "role" : "administrator"
    }, {
      "role" : "viewer",
      "tenantId" : "0cbd2695-8da8-4b48-b325-5dd27800241a"
    } ]}"
  "iss": "argo.ai".
  "exp": 1639501096,
  "iat": 1639414696
}
```

The signature portion 1016 comprises a signature 1018. An illustration of an encoded web authentication token 1100 is shown in FIG. 11, and an illustration of a decoded web authentication token 1200 is shown in FIG. 12.

Referring again to FIG. 9, the API 126 may forward to the server 106 the request to access the service(s)/resource(s) along with a web authentication token. At 910, the server 106 performs operations to validate the web authentication token (for example, check that the token has not expired and that the tenant has permission to execute operation). Once the web authentication token is validated, the server 106 initiates the operation by the service within the scope of the permission contained in the token, as shown by 912.

Next, the server 106 can optionally generate resource(s) in 914 and/or retrieve resource(s) from datastore 128 as shown by 916. 916 can involve using the scope to identify/select resource(s) to retrieve from the datastore. A resource is identified/selected when at least a portion of the contents of the scope matches the contents of a URN associated with the resource. In some examples, a scope comprises a tenant identifier, a metropolitan identifier and a fleet identifier. The URN comprises a tenant value, a metro value and a fleet value. A resource associated with the URN is selected for retrieval when the tenant identifier matches the tenant value, the metropolitan identifier matches the metro value, and the fleet identifier matches the fleet value. The present solution is not limited to the particulars of this example. In other scenarios, the metropolitan identifier and/or fleet identifier can be null in which case the resource is selected for retrieval when only the tenant identifier matches the tenant value of the URN.

The server 106 then generates a response including the resource(s) as shown by 918. The response is then communicated from the server 106 to the client device 102 as shown by 920.

Figure 13:
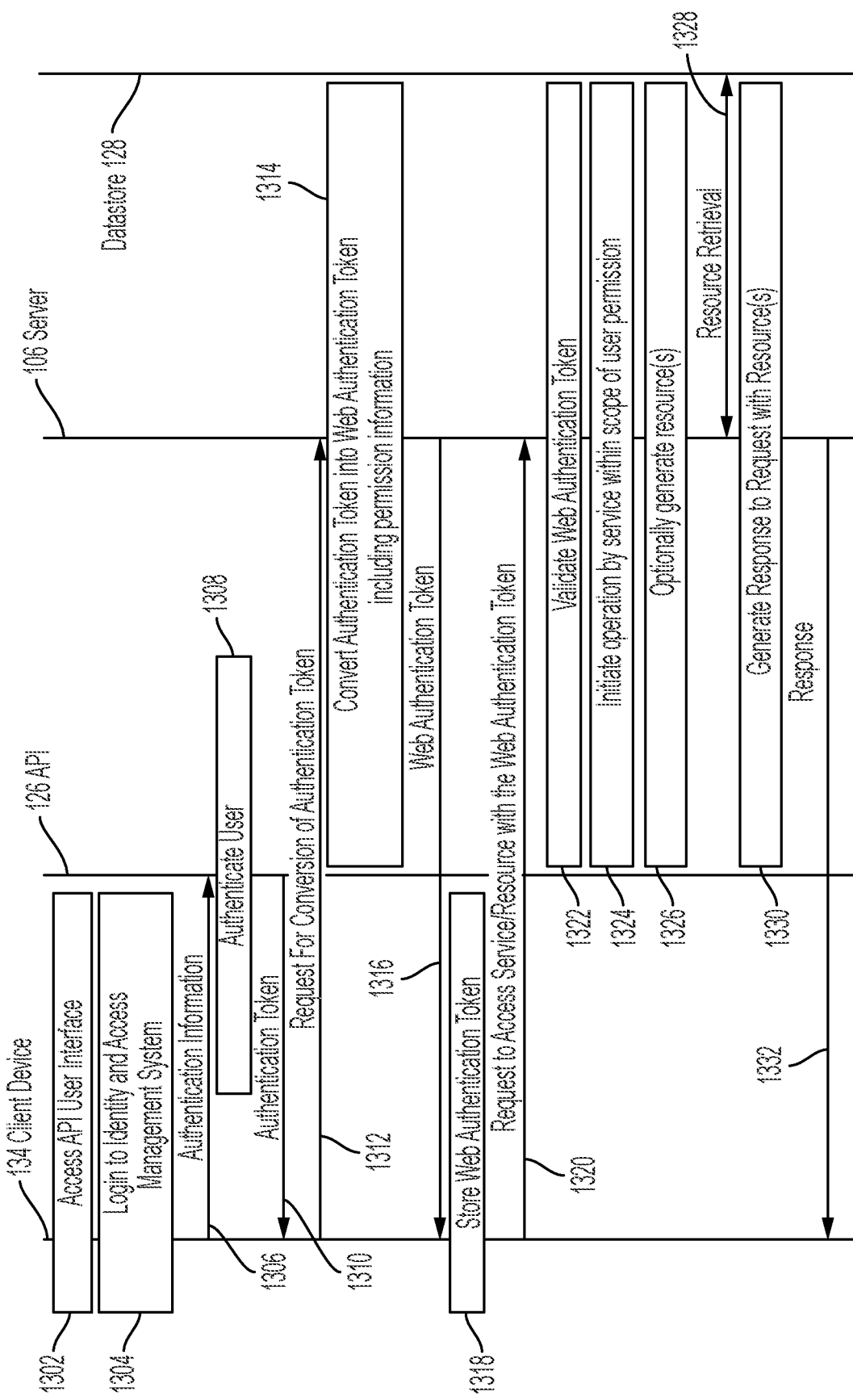
FIG. 13 provides an illustration that is useful for understanding how permissions are used for authorizing a user's access to services.

FIG. 13 provides an illustration that is useful for understanding how permissions 142 may be used in system 100 for authorizing user access to services 156. During operation of system 100, a user 150 of a client device 134 performs operations to access an API user interface (for example, API user interface 140 of FIG. 1) as shown by 1302. The API user interface is configured to facilitate user login to an IAM system (for example, server 106 and API 126 of FIG. 1). As such, the user (for example, user 150 of FIG. 1) uses the API user interface to perform user software interactions to login to the IAM system as shown by 1304. For example, the user inputs authentication information such as a username and a password.

Figure 14:
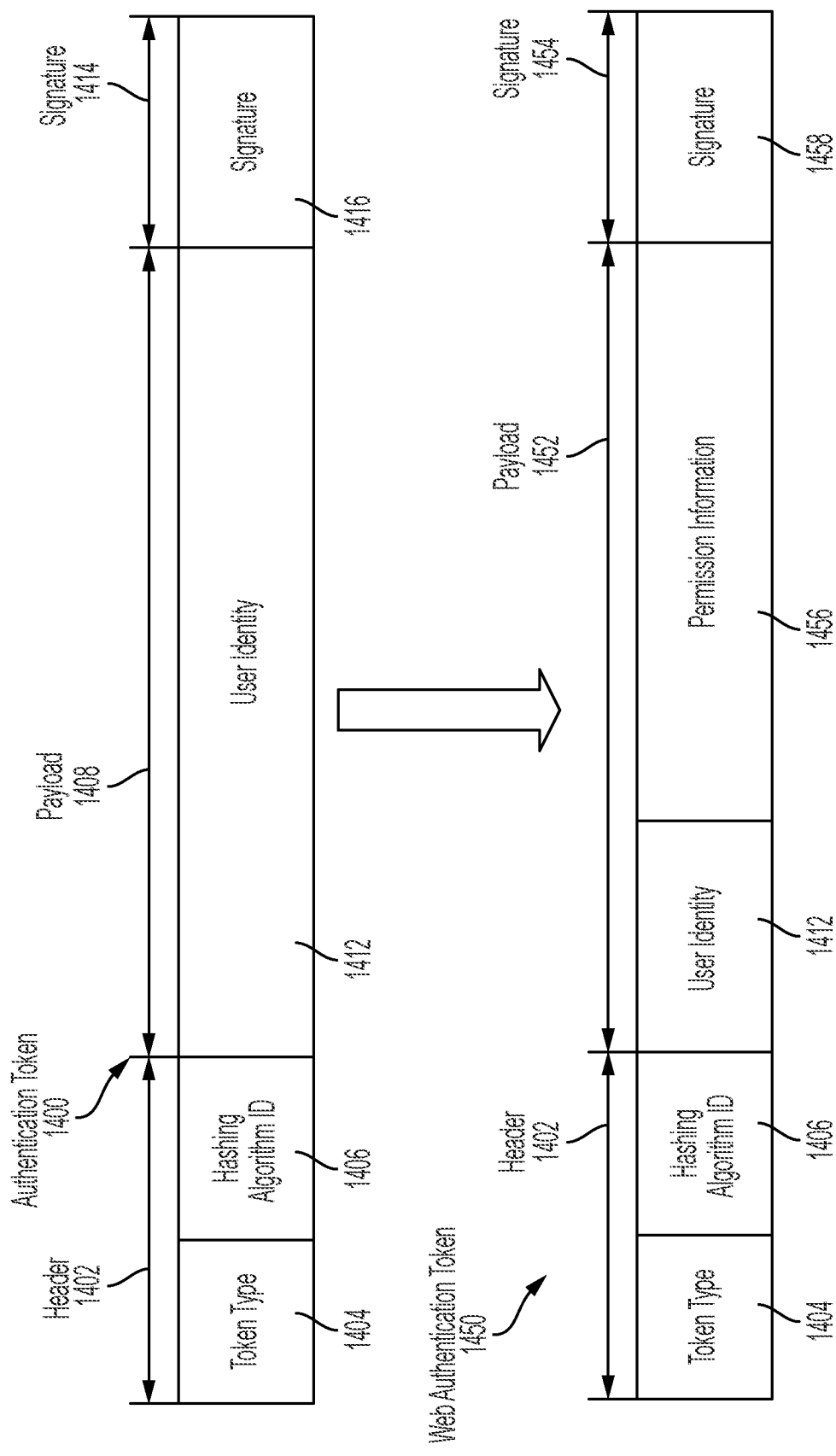
FIG. 14 provides an illustration that is useful for understanding how an authentication token is converted into a web authentication token

In 1306, the client device 134 communicates the authentication information to the API 126 of the IAM system. The API 126 performs operations in 1308 to authenticate the user using the authentication information in accordance with conventional user authentication techniques. Once authenticated, at 1310, the API 126 generates and communicates an authentication token to the client device 134. An illustration of a known exemplary authentication token 1400 in provided in FIG. 14. As shown in FIG. 14, authentication token 1400 comprises a header portion 1402, a payload portion 1408 and a signature portion 1414. The header portion 1402 comprises a token type 1404 and a hashing algorithm identifier 1406. The payload portion 1408 comprises a user identity 1412. The user identity can include, but is not limited to, a username and email address. The signature portion 1414 comprises a signature 1416.

In response to the reception of the authentication token, the client device 134 generates a request for conversation of the same. The request is communicated from the client device 134 to the server 106 as shown by 1312. In 1314, the authentication token is converted by the server 106 into a web authentication token including permission information. An illustration is provided in FIG. 14 that shows how this conversion may be achieved by: using the user identity in the authentication token 1400 to retrieve permission information from table(s) (for example, table(s) 700, 800 of FIGS. 7-8) stored in a datastore (for example, datastore 128 of FIG. 1 and/or memory 322 of FIG. 3); removing the signature 1416 from the authentication token 1400; appending the permission information to the payload portion of the authentication token 1400; generating a new signature 1458 using a hashing algorithm; and appending the signature 1458 to the payload 1452 to produce a web authentication token 1450. The permission information 1456 comprises the scope associated with the user, i.e., a user identifier, a metropolitan identifier and a fleet identifier. The user identifier can be the same as or different than the user identity 1412. An example is provided below that shows a user identifier that differs from the user identifier 1412.

```
{
  "clientProfile": "{
    "tenantId" : "2e077f64-2f56-4ad3-94bf-25331eb5c6e1",
    "user" : {
      "id" : "92001490-41ae-457a-a28d-32ac49fa7dba",
      "displayName" : "Joe Smith",
      "email" : "jsmith@company.ab"
    },
    "newPermissions" : [ {
      "role" : "administrator"
    }, {
      "role" : "viewer",
      "tenantId" : "0cbd2695-8da8-4b48-b325-5dd27800241a"
    } ]}",
  "iss": "argo.ai",
  "exp": 1639501096,
  "iat": 1639414696
}
```

The metropolitan identifier and/or the fleet identifier may have null values to facilitate wildcarding as described above.

As noted above, a total number of resources is variable based on values of the metropolitan identifier and fleet identifier. In this regard, the total number of resources is greater when at least one of the metropolitan and fleet identifiers has a null value as compared to when both the metropolitan and fleet identifiers have values other than null values.

Referring again to FIG. 13, the server 106 communicates the web authentication token to the client device 134 as shown by 1316. The web authentication token is stored by the client device 134 in 1318 (for example, in a local memory 522 of FIG. 5). Next, the client device 134 generates a request to access service(s) and/or resource(s) of the server provider system 118. The request is communicated from the client device 134 to the server 106 along with the web authentication token, as shown by 1320. At the server 106, operations are performed in 1322 to validate the web authentication token. These operations can involve: checking that the web authentication token has not expired; and checking that the user has permission to execute operation.

Once the web authentication token has been validated, the server 106 initiates operations of by a service 156 within the scope of the user permission at 1324. The service may generate resource(s) and/or retrieve resource(s) from the datastore 128, as shown by 1326-1328. 1328 can involve using the scope to identify/select resource(s) to retrieve from the datastore. A resource is identified/selected when at least a portion of the contents of the scope matches the contents of a URN associated with the resource. For example, a scope may comprise a tenant identifier, a metropolitan identifier and a fleet identifier. The URN comprises a tenant value, a metro value and a fleet value. A resource associated with the URN is selected for retrieval when the tenant identifier matches the tenant value, the metropolitan identifier matches the metro value, and the fleet identifier matches the fleet value. The present solution is not limited to the particulars of this example. In other scenarios, the metropolitan identifier and/or fleet identifier can be null in which case the resource is selected for retrieval when only the tenant identifier matches the tenant value of the URN.

The server 106 then generates a response including the resource(s) as shown by 1330. The response is then communicated from the server 106 to the client device 134 as shown by 1332.

In some situations, the API at 126 may not be able authenticate the user, or the server may not be able to validate the web authentication token. This may happen, for example, if a user of a tenant client device is registered with the tenant's system but not yet registered with the fleet management service provider system. When this happens, the server 106 may generate an alert and transmit the alert to the user, to an administrator of the service provider system, and/or to an administrator of the tenant's system to inquire whether the user may be registered with the service provider system. If the administrator of the service provider system or the administrator of the tenant system approves, the user's credentials may be registered with the service provider system.

In some scenarios, the system 118 generates alerts for Vehicle/Driver Dispatch Blockers and/or identifies vehicle/driver mismatches.

When navigating in an environment, in-vehicle navigation systems and AV motion planning systems rely on map data. The available map data, especially when used by an AV motion planning system, may be that of a High Definition (HD) map. An HD map is a set of digital files containing data about physical details of a geographic area such as the geometric boundaries of roads, lanes within roads, barriers, and road surface markings. Map data also may contain information about traffic control measures such as posted speed limits, for particular road segments, as well as traffic signals and signs that are positioned along particular locations on one or more lanes. An AV uses HD map data to augment the information that the AV's on-board cameras, LiDAR system, environmental sensors and/or other sensors perceive. The AV's on-board processing systems can quickly search map data to identify features of the AV's environment and/or to help verify information that the AV's sensors perceive.

Some RLs and/or PUDOLs may be predefined and stored with the available HD map data. However, designated pickup/drop-off locations are not predefined for all possible pickup/drop-off locations. In addition, in some areas such as urban environments, the pickup or drop-off location may not be fixed and may change based on certain conditions. In each such case, the AV must dynamically determine when and where it can execute pickup and drop-off operations in compliance with permissible stopping criteria. The AV must be able to make these decisions in consideration of the criteria, passenger convenience and the burden that the AV stop may place on other vehicles that are moving near the pickup/drop-off location.

As used in this document, the term "requested destination" or simply "destination" refers to a location for which a passenger or other person system acting on behalf of the passenger submits, and the robotic system or its related navigation system receives, a request for the robotic system to perform a pickup or drop-off operation. A requested destination may be a street address, a set of coordinates that can be found in map data, the names of two streets that form an intersection, a landmark, a transit stop name, and/or another identifier of a pickup/drop-off location.

This document may use the term "pickup/drop-off operation" to refer to an operation in which a robotic system stops to pick up a passenger or item, to drop off a passenger or item, or to perform both pickup and drop-off operations in relation to the item.

This document may use the term "pickup/drop-off zone" or "PDZ" to refer to an interval around a requested stopping location at which a robotic system is permitted to stop to perform a pickup or drop-off operation. In some situations, a robotic system's motion planning system may dynamically define a PDZ by applying a stored set of rules to the map data and data that the robotic system's perception system collects in real-time. In other situations, PDZs may be defined in map data as one or more polygons positioned in a lane segment. The robotic system's motion planning system will use PDZs as a guide to help the vehicle dynamically determine where to stop, such as in-lane or curbside.

The term "stopping interval" refers to an interval within a PUDOL at which the vehicle actually stops to perform the pickup or drop-off operation. A stopping interval may encompass the entire PUDOL, or it may be a segment within the PUDOL. The stopping interval may include the requested destination, or it may be another segment within the PUDOL that is near the destination but not precisely at the destination. A "PUDOL" as defined above may be either a PDZ or a stopping location within a PDZ, depending on the configuration of the system.

Figure 15:
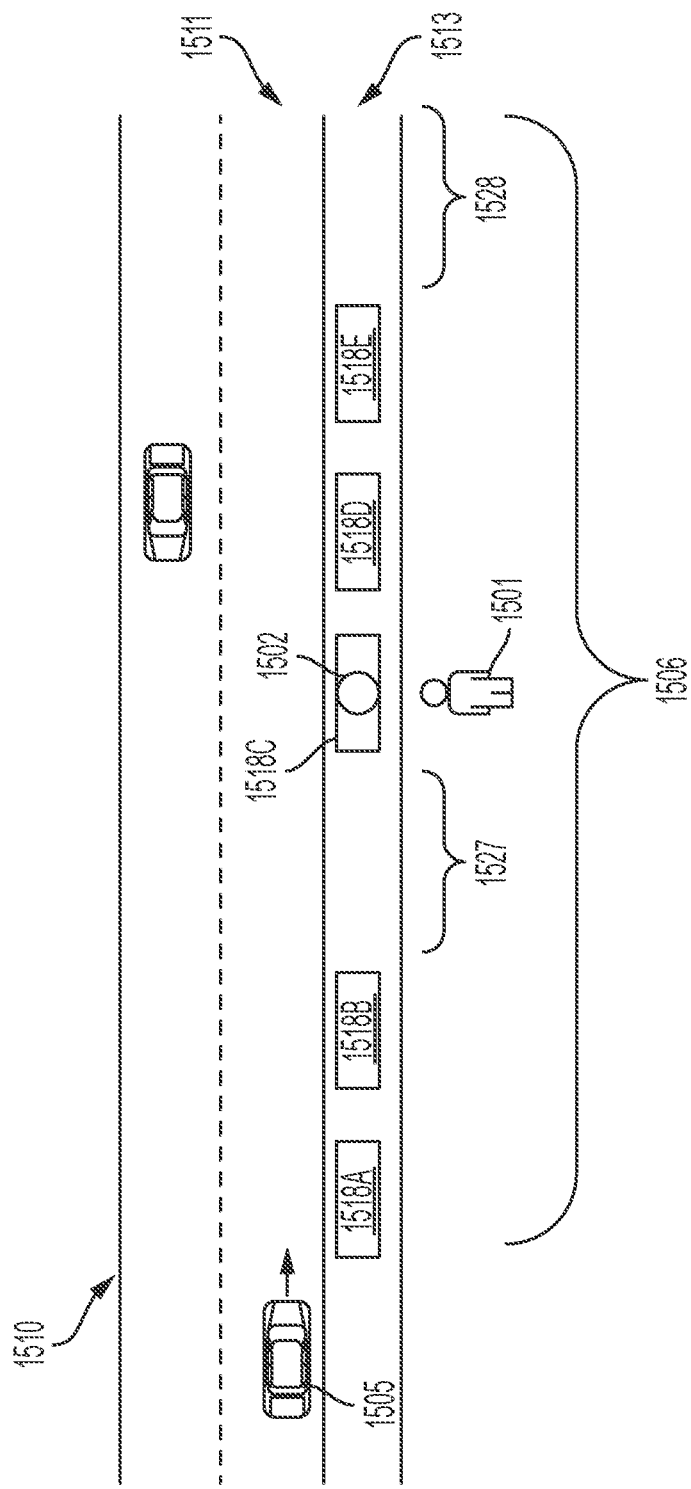
FIG. 15 illustrates the concept of pickup/drop-off zones for a vehicle, along with stopping locations within such zones.

The concepts of a requested destination, PDZ, and stopping interval are illustrated by way of example in FIG. 15, in which a vehicle 1505 has access to a map of an area. In this example, the area is a grid of roads that includes a street 1510. Street 1510 includes multiple lanes, including the vehicle's lane of travel 1511 and a curbside or parking lane 1513. The map may be stored in a memory device onboard the vehicle, although it could also be stored on a mobile electronic device or offboard server that is in communication with the vehicle. The map may be periodically updated by the remote server and/or augmented by information that the vehicle's perception system detects as the vehicle 1505 moves through the area.

In operation, the vehicle 1505 receives a ride service request to pick up or drop off a passenger 1501 or package at a requested destination 1502. The motion planning system of the vehicle 1505 then determines a path or route along which the vehicle 1505 may navigate to the requested destination 1502. The path may be a sequence of streets or lanes leading up to a PDZ 1506, which in the example shown is a segment of the parking lane 1513 that includes the requested destination 1502 and one or more stopping intervals within the PDZ 1506.

As shown in FIG. 15, any number of obstacles 1518A-1518E may be positioned in the PDZ 1506. The obstacles 1518A-1518E, which this document also may refer to alternatively as obstructions or occlusions, may be other vehicles, people, structures, signs or other items that prevent the vehicle from entering the area of the PDZ that is at the obstacle's location. In this example, the PDZ is occluded as one of the obstacles 1518C prevents the vehicle 1505 from stopping at the requested destination 1502. When the vehicle 1505 is an AV, the AV's perception system will identify and classify each of these obstacles, and since the requested destination 1502 is blocked, the AV's motion planning system will determine one or more lane segments within the PDZ that can serve as a stopping interval. Two candidate stopping intervals 1527, 1528 are shown in FIG. 15. The AV's motion planning system or another processor will select one of the candidate stopping locations as the final stopping location to which the AV will navigate and perform the pickup/drop-off operation. The system will then generate an alternate path to guide the vehicle to the final stopping location.

Figure 16:
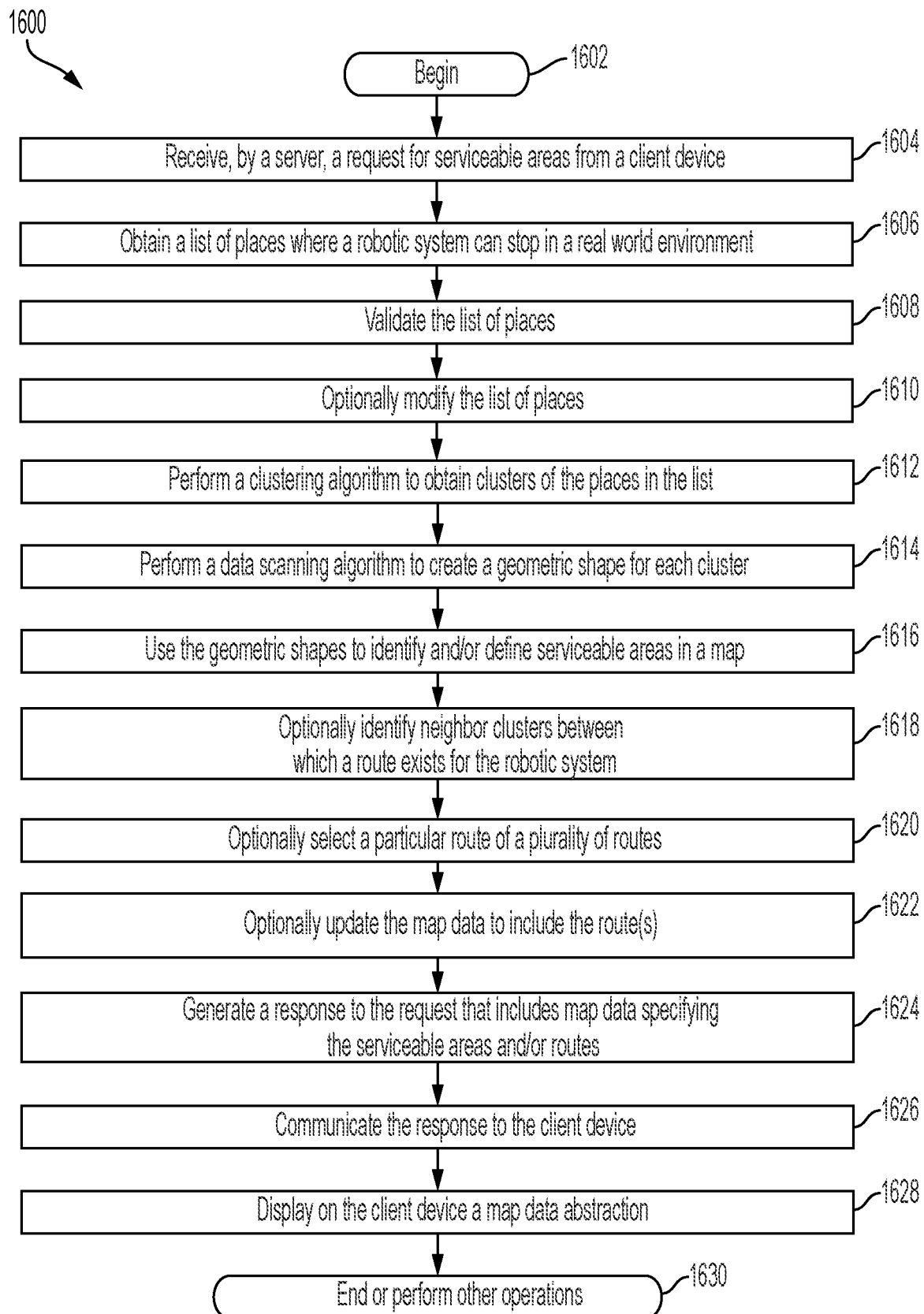
FIG. 16 provides a flow diagram of an illustrative method for retrieving serviceable areas for robotic systems in given metropolitan areas.

FIG. 16 provides a flow diagram of an illustrative method 1600 for retrieving serviceable areas for robotic systems in given metropolitan areas. In general, the system generates contours and stores them in a datastore. The contours may be displayed in internal tooling or exposed to other users. The purpose of the contours is to provide a quick reference as to where the AV can route to/from. Imagine a ride hailing software application where a person specifies a pick-up location and a drop-off location. These specified locations can be validated against the contours in order to determine whether an AV can service this ride.

As shown in FIG. 16, method 1600 can be implemented by a contour service (for example, contour service 220 of FIG. 2). Method 1600 includes various operations to facilitate the provision of clients with the ability to retrieve serviceable areas for robotic systems (for example, robotic systems $116_1, \ldots, 116_N$ of FIG. 1) in given metropolitan areas (for example, metropolitan areas $160_1, \ldots, 160_N$ of FIG. 1).

As shown in FIG. 16, method 1600 begins with 1602 and continues with 1604 where a server (for example, server(s) 106 of FIG. 1) receives a request for serviceable areas from a client device (for example, client device 102 or 134 of FIG. 1). In response to the request, the server performs operations to obtain a list of PUDOLs in a real-world environment in 1606. The list of PUDOLs can be obtained from a geo service (for example, geo service 216 of FIG. 2) supported by the server or another server. The server validates the list of PUDOLs in 1608.

This validation can be achieved using various information to determine whether there are any PUDOLs that should be removed from the list and/or added to the list. The information can include, but is not limited to, current road condition information, traffic information, road repair information, road closure information, school zone/pickup-drop off hours, predicted high traffic areas (for example, concert), and/or environmental conditions in a given metropolitan area (for example, rain, fog, etc.). For example, a determination can be made that a PUDOL should be removed from the list when the PUDOL resides proximate to an amphitheater where a concert is starting or ending, and thus would make the paid-for trip duration excessively long due to traffic. A determination can be made that a PUDOL should be added to the list when the PUDOL resides proximate to a location where road work has been completed. The present solution is not limited to the particulars of these examples. The list can optionally be modified in 1610 by removing and/or adding PUDOLs therefrom/thereto.

Once the list of PUDOLs has been obtained and/or modified, the server performs a clustering algorithm in 1612 to obtain clusters of PUDOLs in the list. The clustering algorithm can include, but is not limited to, a DBSCAN algorithm, a concave hull algorithm, and/or a convex hull algorithm. One way of achieving this clustering will be described in detail below in relation to FIG. 17. Each cluster comprises a plurality of PUDOLs which have been grouped together based on certain criteria. The criteria can include, but is not limited to, a distance between PUDOLs (for example, a Euclidean distance), a minimum number of PUDOLs required for a cluster, a minimum number of neighbor PUDOLs for a given PUDOL, and/or reachability of a PUDOL to all other neighboring PUDOLs (for example, an AV can drive from point A to point B, where point A is PUDOL of interest and point B is a neighboring PUDOL). For example, two PUDOLs are considered neighbor PUDOLs when the distance therebetween is less than or equal to a threshold value. The threshold value can be defined based on an acceptable walking distance between PUDOLs. A given PUDOL is marked or classified as a core PUDOL when the given PUDOL has a total number of neighbor PUDOLs exceeding the minimum number of neighbor PUDOLs. In contrast, a given PUDOL is marked or classified as a border PUDOL when it (i) has a total number of neighbor PUDOLs less than a predetermined minimum number of neighbor PUDOLs and (ii) is reachable from a core PUDOL (for example, an AV can drive from point A to point B, where point A is PUDOL of interest and point B is a neighboring PUDOL). Otherwise, a given PUDOL is marked or classified as an outlier PUDOL that is located in a low-density region.

Next in 1614, the server performs a data scanning algorithm. The data scanning algorithm can include, but is not limited to, known GS algorithms. The GS algorithm uses results of the clustering algorithm to create a geometric shape (for example, polygon) for each cluster. The GS algorithm generally (i) finds a convex hull of a finite set of data points (for example, PUDOLs) in a plane, (ii) finds all nodes of the convex hull ordered along its boundary, and (iii) identifies neighbor clusters. Two clusters are neighbors when there exists a route between them for a robotic system. The route can be identified using, for example, a routing library (for example, library 170 of FIG. 1) stored in a datastore (for example, datastore 128 of FIG. 1). The neighbor clusters can be consolidated into a single cluster.

In 1616, the geometric shape is used to identify and/or define serviceable areas in a map. The geometric shape can be defined by 2D or 3D map coordinates (for example, x-coordinate, y-coordinate, and/or x-coordinate). As such, the coordinates of the geometric shape can be correlated with the coordinates of the map, and the map can be modified to include an indication of where the geometric shape resides relative to a metropolitan area. The indication can be provided via a semi-transparent shape overlaid on the map. The area covered by the semi-transparent shape overlay can be identified as a serviceable area.

Figure 20:
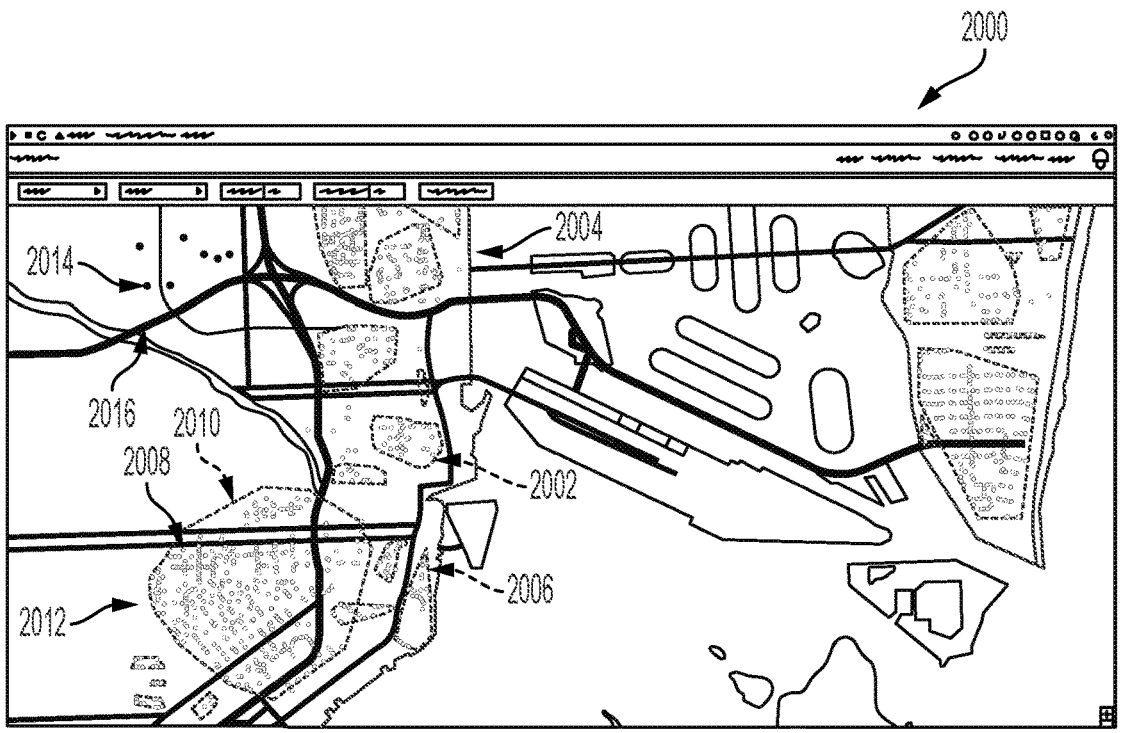
FIGS. 20-21 each provide an illustration that is useful for understanding serviceable areas.

An illustrative map 2000 showing serviceable areas 2002 within a metropolitan area 2004 is provided in FIG. 20. Each serviceable area includes the geographic area covered by the respective semi-transparent overlaid shape (for example, polygon). The present solution is not limited to the particulars of FIG. 20.

Referring back to FIG. 16, optional steps 1618-1622 allow the server to perform operations to: identify neighbor clusters between which a route exists for the robotic system; select a particular route from a plurality of routes when two or more routes exist between neighbor clusters; and update map data to include the route(s).

In 1624, the server generates a response to the request which includes map data specifying the serviceable areas and/or routes. As noted above, an abstraction of the map data is provided to the client device that requested serviceable areas. For example, the client device may be provided a map with the overlays showing serviceable areas, and not with indicators for the PUDOLs. At the client device, the map data abstraction is presented to the user, for example, in a map format.

Figure 21:
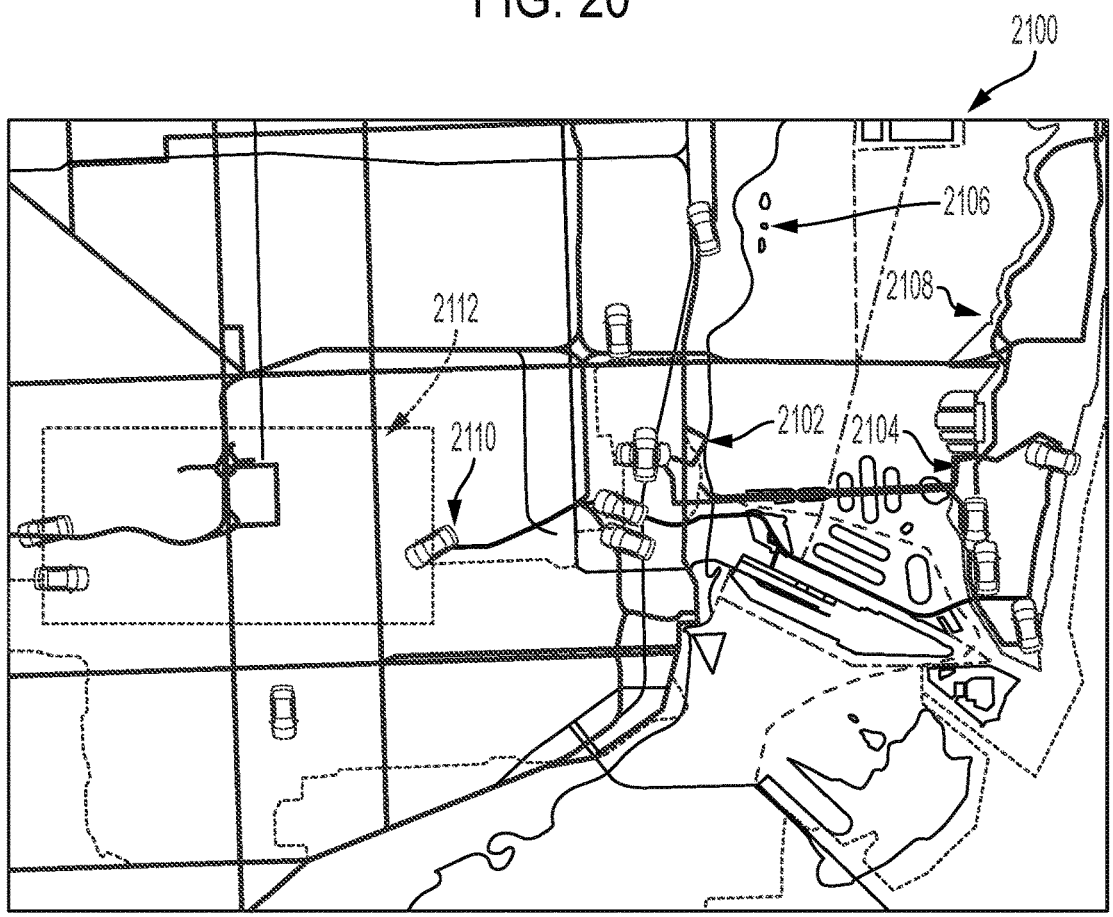

An illustration of a map data abstraction is provided in FIG. 21. As shown in FIG. 21, the map data abstraction comprises a map 2100 showing locations of serviceable areas 2102, 2104, 2112 within metropolitan areas 2106, 2108. Serviceable areas 2104 and 2112 are associated with a first tenant, while serviceable area 2102 is associated with a second different tenant. Serviceable areas associated with different tenants can be remote from each other as shown by serviceable areas 2102 and 2104, and/or can at least partially overlap each other as shown by overlapping serviceable areas 2102 and 2112. It should be noted that map 2100 is absent of indicators for PUDOLs (for example, dots 2006 of FIG. 20). The map can also include indicators for current locations of robotic systems 2110. In some scenarios, the map 2100 can be presented via a web page. The present solution is not limited the illustrative map data abstraction of FIG. 21. For example, the map data abstraction can additionally show route(s) between different serviceable areas. Subsequently, 1630 is performed where method 1600 ends or other operations are performed.

The other operations can include, but are not limited to causing, by the computing device, the robotic system to be controlled based on contents of the map. In some scenarios, the robotic system comprises an autonomous vehicle that is caused to travel from a first place in the metropolitan area to a second different place in the metropolitan area. Operations of an autonomous vehicle for traveling between places may be based on a plurality of inputs including at least object trajectory generation, vehicle trajectory generation, and operations to cause the vehicle to follow the vehicle trajectory via steering, acceleration and/or deceleration.

Figure 17:
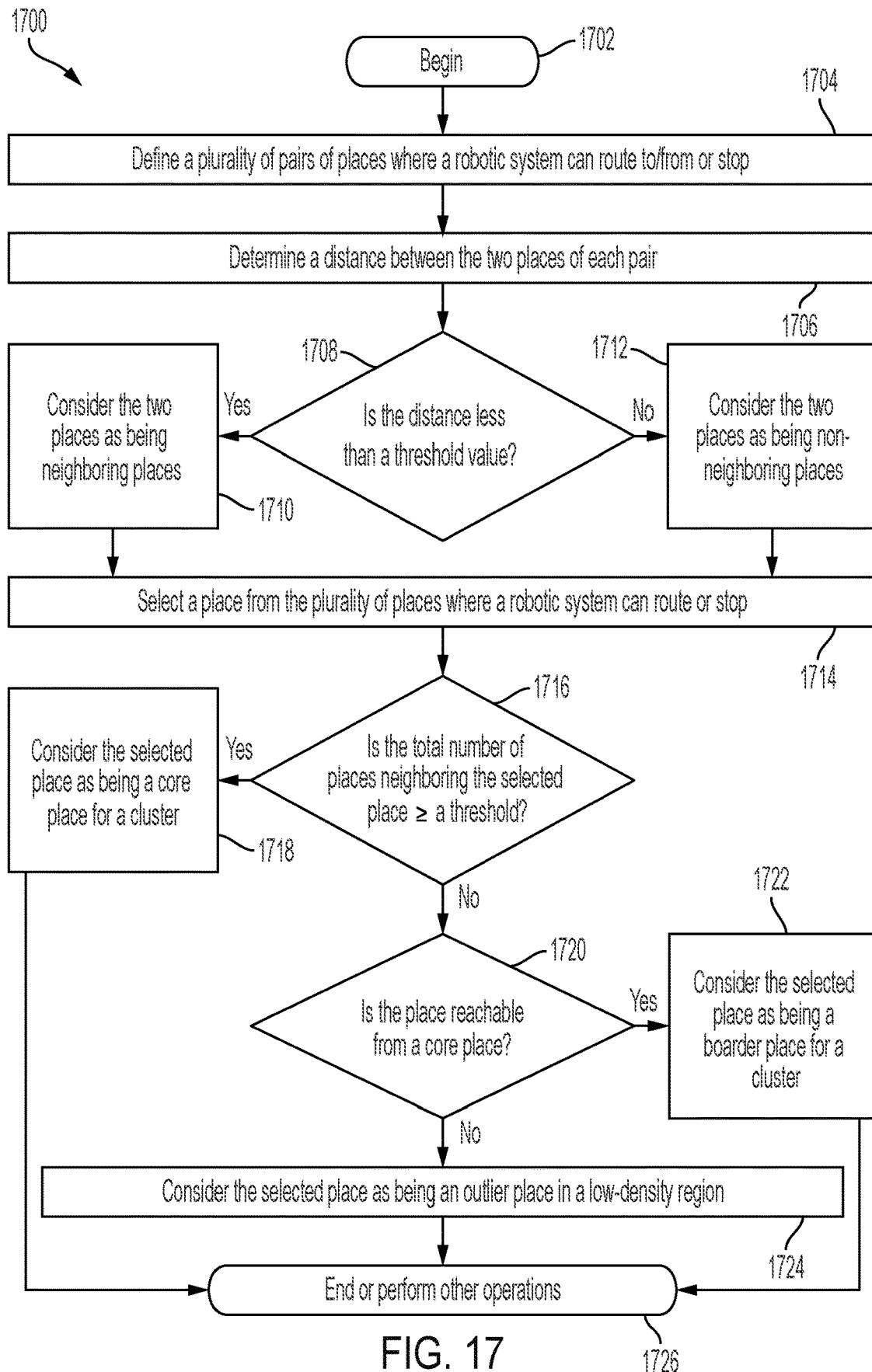
FIG. 17 provides a flow diagram of an illustrative method for clustering places where robotic systems can stop.

FIG. 17 provides a flow diagram of an illustrative method 1700 for clustering PUDOLs. In some examples, method 1700 can be performed by the server in operations 1608 of FIG. 16. Method 1700 implements a DBSCAN algorithm to determine the clusters of PUDOLs. Other types of algorithms can be used in addition to or as an alternative to the DBSCAN algorithm. The other types of algorithms can include, but are not limited to, concave hull algorithms and/or convex hull algorithms.

As shown in FIG. 17, method 1700 begins with 1702 and continues with 1704 where a plurality of pairs of RLs and/or PUDOLs are defined. This can be achieved using a list of RLs/PUDOLs, and defining all possible pairs of RLs/PUDOLS in the list. In 1706, a distance between the two RLs or PUDOLS of each pair is determined. The distance can include, but is not limited to, a Euclidean distance. Euclidean distances and algorithms for determining the same are well known. Each distance is then used to identify neighboring RLs or PUDOLs, boarder RLs or PUDOLs and outlier RLs or PUDOLs as shown by 1708-1726.

In 1708, each distance is compared to a threshold value. The threshold value can be pre-defined, variable based on current conditions of the system, fleet deployment scheduling, the environment of the metropolitan area, and/or randomly selected from a list of pre-defined threshold values. If the distance is less than the threshold value [1708:YES], then the server considers the two RLs or PUDOLs as being neighboring places as shown by 1710. In contrast, if the distance is equal to or greater than the threshold value [1708:NO], then the server considers the two RLs or PUDOLs as being non-neighboring places as shown by 1712.

Figure 18:
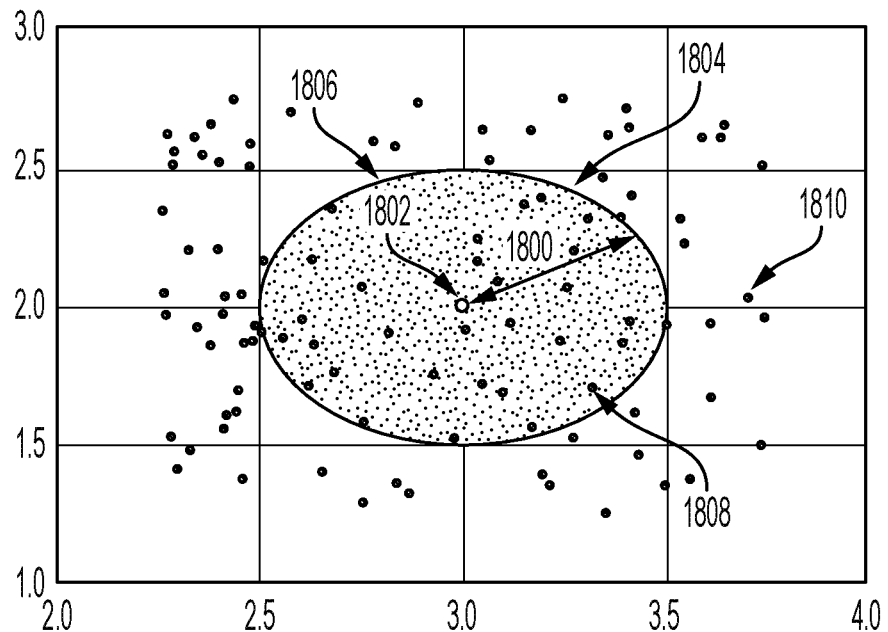
FIGS. 18-19 each provide an illustration showing a neighborhood of data points.
Figure 19:
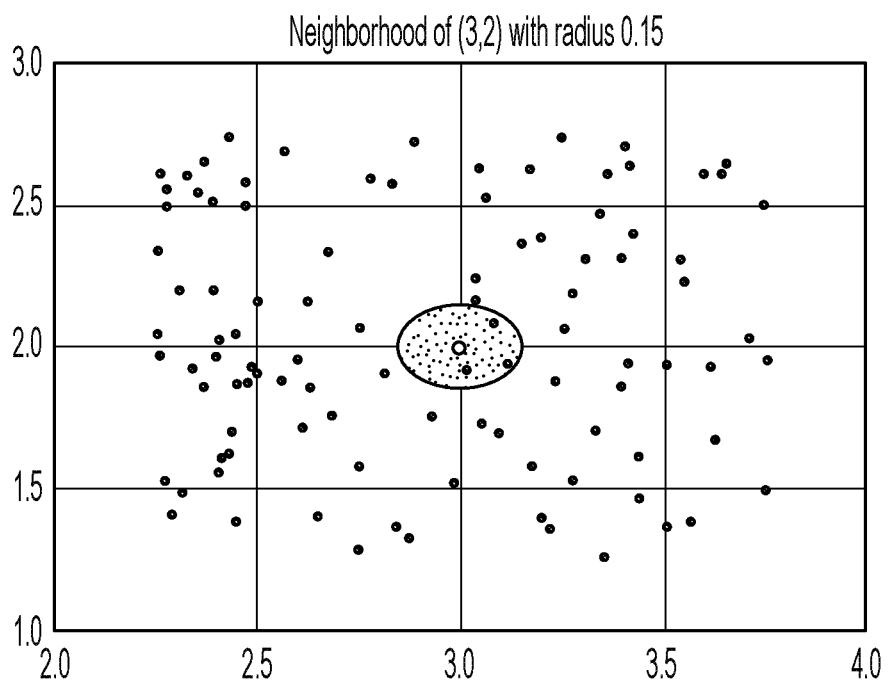

An illustration is provided in FIG. 18 that is useful for visualizing the operations of 1708-1712. In FIG. 18, the distance 1800 between a center point 1802 and a boundary 1804 of an ellipse 1806 represents a threshold value. The PUDOLs 1808 residing within the ellipse 1806 are neighboring places. The PUDOLs 1810 residing outside of the ellipse 1806 are non-neighboring places. The present solution is not limited to the particulars of FIG. 18. Another illustration is shown in FIG. 19 for the case where a smaller threshold value is employed.

Referring again to FIG. 17, the server performs operations in 1714 to select an RL or PUDOL from the plurality of RLs or PUDOLs. In 1716, the server then determines whether a total number of RLs or PUDOLs that are neighbors with the selected RL or PUDOL is greater than or equal to a threshold value. If the total number of RLs or PUDOLs neighboring the selected RL or PUDOL is greater than or equal to the threshold value [1716:YES], then the server considers the selected RL or PUDOL as being a core place for a cluster as shown by 1718. If the total number of RLs or PUDOLs neighboring the selected RL or PUDOL is less than the threshold value [1716:NO], then, in 1720, the server performs operations to determine whether the selected RL or PUDOL is reachable from a core place. If so [1720:YES], then, in 1722, the server considers the selected RL or PUDOL as being a boarder place for a cluster. A set of core places (for example, PUDOLs 2008 of FIG. 20) and boarder places (for example, PUDOLs 2010 of FIG. 20) defines a given cluster (for example, cluster 2012 of FIG. 20). If not [1720:NO], then, in 1724, the server considers the selected RL or PUDOL as being an outlier place (for example, PUDOL 2014 of FIG. 20) in a low-density region (for example, region 2016 of FIG. 20) in 1524. Subsequently, 1726 is performed where method 1700 ends or other operations are performed.

Figure 22:
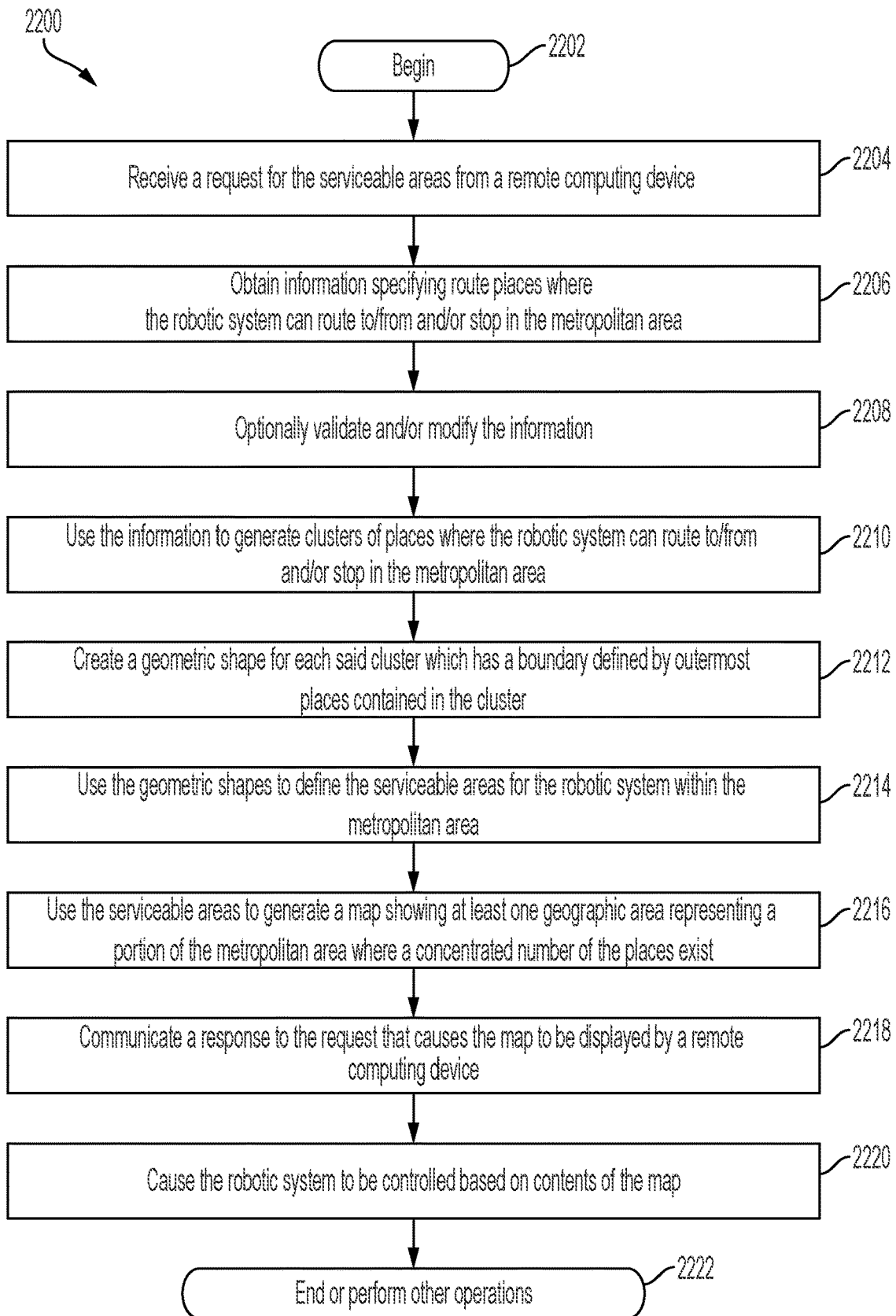
FIG. 22 provides an illustration of a method for obtaining serviceable areas for a robotic system in a metropolitan area.

Referring now to FIG. 22, there is provided a flow diagram of a method 2200 for obtaining serviceable areas for a robotic system in a metropolitan area. Serviceable areas may also be referred to herein as geonets. The serviceable areas may be defined by activity (for example, TaaS, cargo and package delivery, mapping missions, etc.) by a tenant (for example, tenant 114$i$, . . . , or 114$_N$ of FIG. 1) or a service provider user (for example, user 150 of FIG. 1). The serviceable areas may be changed based on one or more factors, including at least for example, fleet deployment scheduling and utilization, activity type, tenant subscription, robotic system health and driving range. The robotic system can be dynamically assigned/re-assigned to different tenants and/or geonets.

As shown in FIG. 22, the method 2200 begins with 2202 and continues with 2204 where a computing device (for example, server 106 of FIG. 1) receives a request for the serviceable areas from a remote computing device (for example, client device 102 or 134 of FIG. 1). In response to the request, the computing device obtains information in 2206 that specifies places where the robotic system can route to, route from and/or stop in the metropolitan area (for example, a list of PUDOLs). The computing device may validate and/or modify the information as shown by 2208. The information can be validated by using current road condition information, traffic information, road repair information, road closure information, school zone information, pickup-drop off hour information, predicted high traffic area information, and/or environmental condition information. The information can be modified based on results of the validating operations.

In 2210, the computing device uses the information to generate clusters of places where the robotic system can route to, route from and/or stop in the metropolitan area. The clusters may be generated based on a distance between two places where the robotic system can route to, route from or stop in the given metropolitan area, a minimum number of places required for a cluster, a minimum number of neighbor places for a given place where the robotic system can route to, route from or stop in the given metropolitan area, and/or a reachability of a place to all other neighboring places where the robotic system can route to, route from or stop in the given metropolitan area. The clusters may be generated using a density-based spatial clustering of applications with noise algorithm, a concave hull algorithm, and/or a convex hull algorithm.

In 2212, the computing device creates a geometric shape for each cluster which has a boundary defined by outermost places contained in the cluster. The geometric shape may be created using a Graham's scan algorithm. The computing device then uses the geometric shapes in 2214 to define the serviceable areas for the robotic system within the metropolitan area. The serviceable areas are used by the computing device in 2216 to generate a map showing at least one geographic area representing a portion of the metropolitan area where a concentrated number of the places exist. The computing device can communicate a response to the request that causes the map to be displayed by the remote computing device, as shown by 2218.

In some scenarios, the computing device performs operations in 2220 to cause the robotic system to be controlled based on contents of the map. For example, if the robotic system is an autonomous vehicle, then the computing device can cause the autonomous vehicle to travel from a first PUDOL in the serviceable area to a second different PUDOL in the same or different serviceable area. The determination of vehicle operations to travel between locations may be based on at least vehicle trajectory planning operations and operations to cause the vehicle to follow a predetermined vehicle trajectory.

As each vehicle in a fleet moves about a geographic area, the service provider system 118 will monitor the vehicle's progress and calculate an estimated time of arrival (ETA) at a PUDOL, another destination such as a parking area, or a waypoint along the way to the PUDOL or other destination. There are many possible ways of calculating ETA, including calculating a function of the distances and speed limits along the expected (or planned) path from the vehicle's current location to its destination using distances and speed limits that correspond to road segments in an HD map, storing a large volume of ETA data in a matrix. Repeatedly calculating ETA as a function of distances and speed limits from HD map data is a computationally intensive process, while storing ETA data in a matrix requires a massive amount of data storage space to cover all possible starting points and destinations.

Figure 23A:
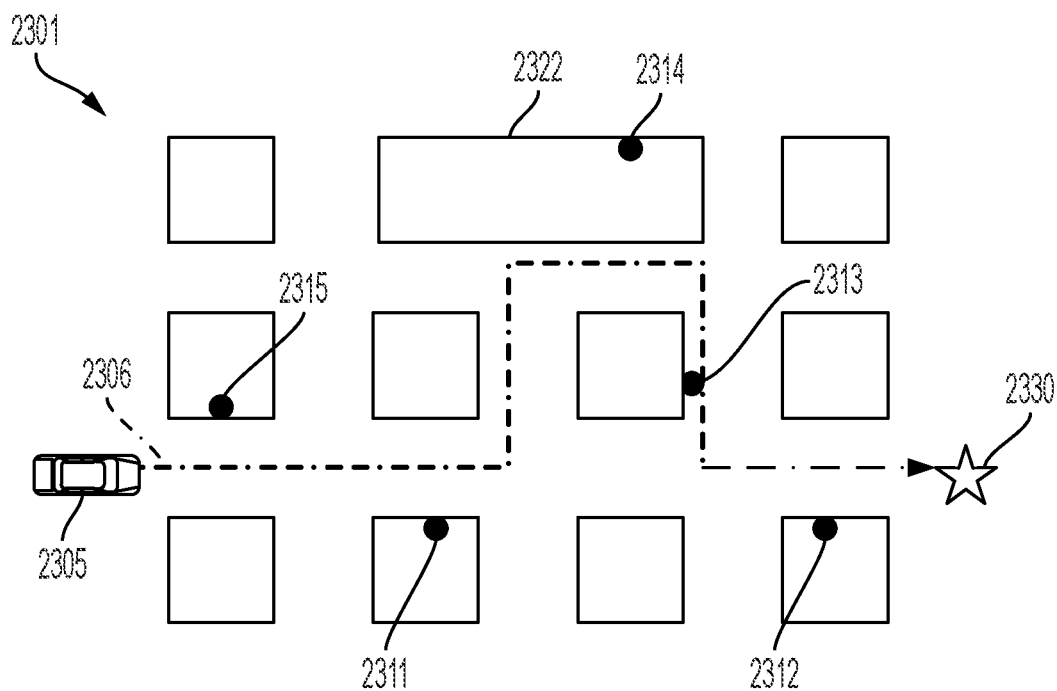
FIG. 23A illustrates a geographic area in which several pickup/drop-off locations are located along a vehicle's route to a destination.

To address this problem, the service provider system may store or have access to a stored adjacency graph. The adjacency graph will comprise a set of nodes and edges, in which each node is associated with a unique location in the geographic area, and each edge connects two of the nodes and is associated with an estimated travel time between the two nodes to which the edge is connected. This is illustrated by way of example in FIGS. 23A and 23B. FIG. 23A shows a map of a geographic area 2301 in which a vehicle 2305 moves along a route 2306 to a destination 2330. Multiple PUDOLs 2311-2314 are present on the map. PUDOLs 2311-2313 are positioned along the route, while PUDOL 2314 is in the geographic area 2301 but not reachable from the route 2306 since it is on the opposite side of a building along which the route 2306 passes.

Figure 23B:
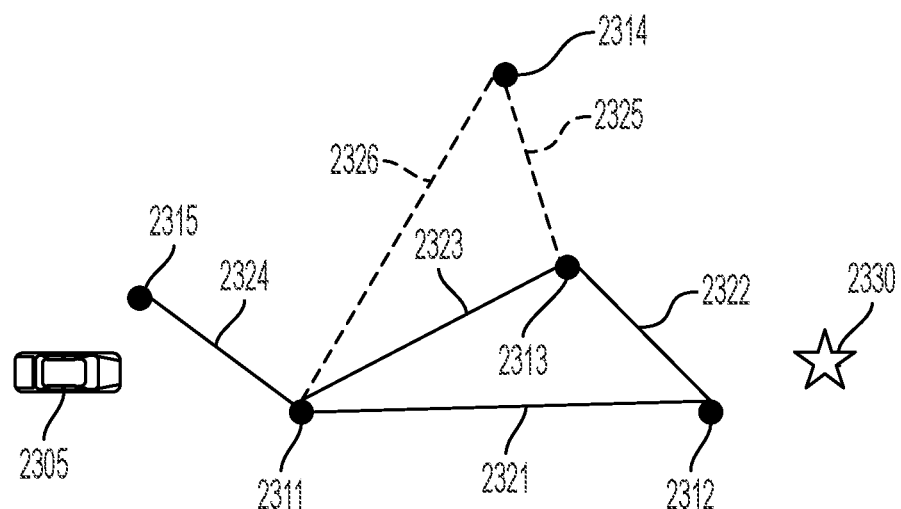
FIG. 23B illustrates certain of the data of FIG. 23A in adjacency graph format.

FIG. 23B illustrates an adjacency graph that stores key data for the geographic area 2301 of FIG. 23A. The adjacency graph associates each of the PUDOLs 2311-2314 with a node of the graph. The graph also includes edges 2321-2325, each of which connects two of the nodes (PUDOLs 2311-2314). The graph will associate each edge with an ETA between the two nodes to which the edge is connected, and it will store the ETA for each edge in a memory. The ETAs may be predetermined and stored in the graph, or some or all of the ETAs may be dynamically determined such as by calling a mapping service or by using map data to calculate a route and a distance between the locations to which the nodes correspond. The system may adjust the ETAs based on traffic data or other information, as will be discussed below.

Figure 24:
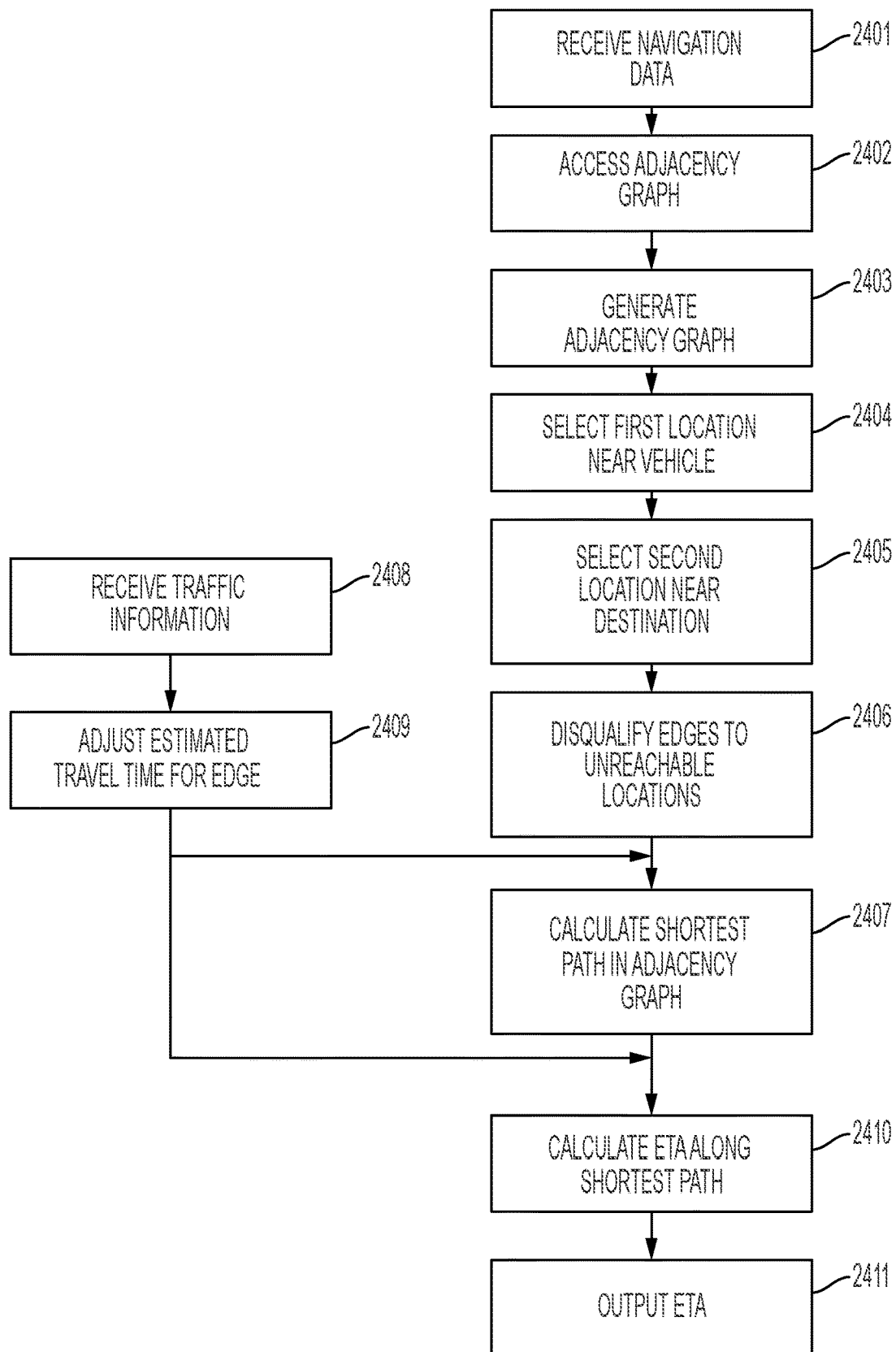
FIG. 24 illustrates a method by which a processor may use an adjacency graph to calculate an estimated time of arrival for a vehicle to arrive at a destination.

FIG. 24 illustrates a method by which a processor of a system may use an adjacency graph to calculate an ETA for a vehicle to arrive at a destination. While the examples here describe the processor as part of a service provider system, the methods also may be implemented by processors that are onboard the vehicle itself, by a processor onboard another vehicle, or by a client device or system operated by a tenant or others.

At 2401, the system will receive navigation data indicating a present location of the vehicle along a route to a location in a geographic area. The processor may receive this from the vehicle itself, from an electronic device that is onboard the vehicle, or from one or more smart traffic infrastructure nodes that are positioned along a route along with the vehicle is traveling. (Examples of smart traffic infrastructure nodes are disclosed in, for example, U.S. patent application Ser. No. 16/928,844, filed Jul. 14, 2020, the disclosure of which is incorporated into this document by reference.) The present location may be coordinates returned from geographic position system (GPS) data, a location of a camera or other smart infrastructure sensor that detected the vehicle, or a location determined by a perception system (such as a camera and/or LIDAR system) that is onboard the vehicle.

At 2402, the system will access an adjacency graph in which: (a) each node is associated with a unique location in the geographic area; and (b) each edge connects two of the nodes and is associated with an estimated travel time between the two nodes to which the edge is connected. An example adjacency graph is shown in FIG. 23B and discussed above. The system may store multiple adjacency graphs for multiple geographic areas, and it may issue a service call to the adjacency graph storage to access or return the graph or graphs that cover the area of the vehicle's route to the destination.

If an adjacency graph is not available for a current geographic area, or if the available adjacency graph for a current area does not satisfy one or more rules (such as a rule that the graph remains current and was created or updated within a threshold period of time), then at 2402 the system may generate a new adjacency graph for the current area. To do this, by way of example the system may access a set of coordinates (for example, from GPS data or other location data) representing points in the area that are possible destinations. The system may convert each of the points into a lane, for example by accessing map data and selecting the lane in the map data that includes or is nearest to the point. For each lane (which we will refer to in this discussion as C) in the set of lanes (which we will refer to as S), the system may apply Dijkstra's algorithm. However, rather than running the algorithm to full completion, the system may apply Dijkstra's algorithm for each lane C only until one or more of the other lanes in the set S are reached. In this way, the adjacency graph only expands to adjacent vertices and not the entire map. While executing Dijkstra's algorithm, for each lane C the system will maintain a record of all lanes in the set S that are reachable by C. The system then may generate a mapping of each lane in S to its adjacent and reachable vertices. This mapping will be the adjacency graph.

At 2404, the system will select, from locations in the adjacency graph, a first location that is near the present location of the vehicle. At 2405, the system will select, from locations in the adjacency graph, a second location that is closest to the destination. The first location is associated with a first node in the adjacency graph and the second location is associated with a second node in the adjacency graph. To select either the first or the second location, the system may examine the adjacency graph and/or send a request to a service that stores the adjacency graph to identify, from the nodes in the adjacency graph, a node having coordinates closest to the vehicle (for the first location) or the destination (for the second location). With reference to the example of FIG. 23B, the first location (that is, the location closest to the vehicle 2305) may be PUDOL/node 2315, while the second location (that is, the closest to the destination 2330) may be PUDOL/node 2312. Optionally, the system may calculate this from map data. Optionally, the request or other method may require that the system not return or otherwise consider any node having coordinates that are not reachable via the route. The system also may require that the node identified as "closest" also satisfy certain criteria, such as that the node be aligned with a current orientation of the vehicle (i.e., if a traveling to the closest node would require the vehicle to make a turn that exceeds certain deceleration and/or turning radius thresholds, or to adjust its current path by more than a threshold amount of yaw, the node will not satisfy the rule). If two or more nodes are equally near to the vehicle location, the system may apply such criteria or other criteria to select one of the nodes as the closest node, or it may output each of the nodes as a candidate node to a user of the system and then receive a user selection of one of the nodes as the closest node.

Returning to FIG. 24, at 2407 the system will calculate a shortest path along the edges in the adjacency graph from the first node to the second node. The system may use any suitable shortest path calculation to do this, such as Dijkstra's algorithm (such as the single-source shortest path variation), Floyd's algorithm (such as the all-pairs shortest path version), a depth-first search algorithm, a breadth-first search algorithm, and/or the Bellman-Ford algorithm. Optionally, before calculating the shortest path, at 2406 the system may disqualify from inclusion in the shortest path any edge that leads to a node associated with a location that is not reachable via the route. For example, in FIGS. 23A and 23B, edges 2325 and 2326 are disqualified (and they appear as dashed lines) because PUDOL 2314 is on a back side of a building 2322 that is opposite to the front side of the building by which the vehicle 2305 passes, and therefore PUDOL 2314 is not reachable via route 2306.

At 2410, the system will calculate the ETA as a function of the estimated travel times of the edges along the shortest path. The system may use any suitable calculation to calculate the ETA. For example, the system may generate a sum of the estimated travel times along the edges along the shortest path. The system may return this sum as the ETA. Alternatively, if the system has access to traffic data for any of areas of a node or edge, it may receive the traffic data from a traffic service at 2408, and at 2409, it may adjust the estimated travel time along that edge based on the traffic data. For example, if traffic data shows that traffic in the area of a node is moving at an average speed that is X percent below the posted speed limit, it may increase the estimated travel time for edges leading from that node by X percent or more. This adjustment may occur by the system using the adjacency graph at the time of use; alternatively, the producer of the graph may use the traffic data when generating the graph in the first place.

Optionally, if the system receives traffic data at 2408, it may also use the traffic data to adjust the estimated travel time for one or more edges at 2409 before calculating the shortest path at 2407. For example, if the adjusted travel time for an edge exceeds a threshold percentage increase as compared to the stored estimated travel time for that edge, the system may disqualify that edge from being part of the shortest path.

At 2411, the system will generate and output a message that includes the ETA. The system may transmit or otherwise output the ETA to a user of any of the client devices shown in FIG. 1, or to another system or device.

The use of an adjacency graph to determine ETA is a computational improvement over prior methods. For example, an adjacency graph has many fewer edges and nodes than a full HD map. (The HD map has edges and nodes for all short lengths of roadway, regardless of whether or not PUDOLs are possible on them. In contrast, the adjacency graph only considers the possible PUDOL locations, which makes it compact and reduces the consideration of unnecessary edges in the computation.) So, the computation time of any shortest path algorithm will be significantly reduced.

The use of an adjacency graph also provides a compact data set that can be transferred to a tenant or other partner, who can then use the adjacency graph to calculate trip ETAs on a separate system, before contacting the systems of this document to submit a trip request.

Figure 25:
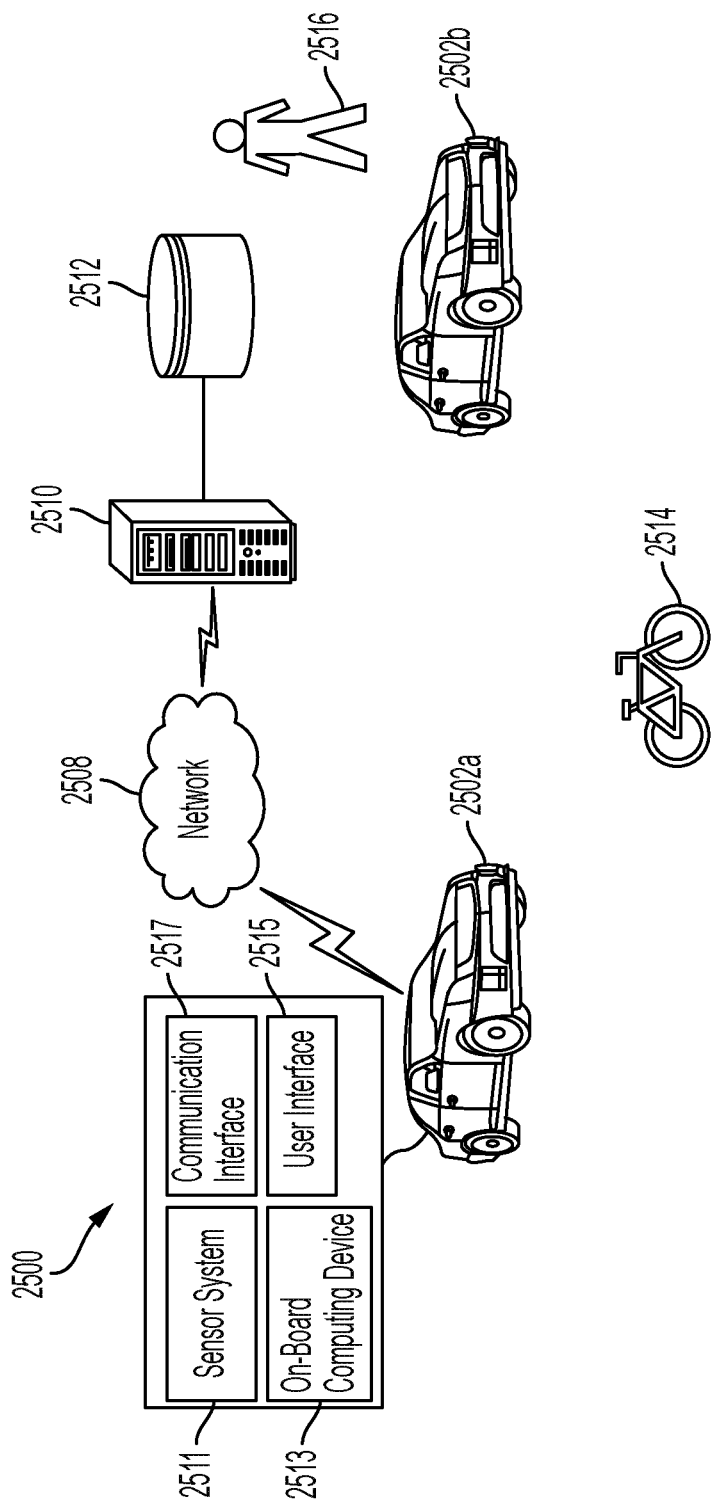
FIG. 25 illustrates an example system in which a cloud-based service provider may generate a route plan for a vehicle in response to a ride service request.

FIG. 25 illustrates an example autonomous vehicle system 2500, in accordance with aspects of the disclosure, which interacts with a remote server 2510 such as the service provider system 118 of FIG. 2. System 2500 comprises a vehicle 2502a that is traveling in a geographic area in a semi-autonomous or autonomous manner. Vehicle 2502a is illustrated as an AV traveling on a road but it could also be another type of land vehicle, an aircraft, or a watercraft.

Vehicle 2502a is generally configured to detect objects such as other objects that are in its proximity. The objects can include, but are not limited to, a vehicle 2502b, cyclist 2514 (such as a rider of a bicycle, electric scooter, motorcycle, or the like) and/or a pedestrian 2516.

As illustrated in FIG. 25, the AV 2502a may include a sensor system 2511, an on-board computing device 2513, a communications interface 2517, and a user interface 2515. AV 2502a may further include certain components (as illustrated, for example, in FIG. 6) included in vehicles, which may be controlled by the on-board computing device 2513 using a variety of communication signals and/or commands, such as, for example, acceleration signals or commands, deceleration signals or commands, steering signals or commands, braking signals or commands, etc.

The sensor system 2511 may include one or more sensors that are coupled to and/or are included within the AV 2502a, such as those illustrated in FIG. 6. For example, such sensors may include, without limitation, a LiDAR system, a radio detection and ranging (RADAR) system, a laser detection and ranging (LADAR) system, a sound navigation and ranging (SONAR) system, one or more cameras (for example, visible spectrum cameras, infrared cameras, etc.), temperature sensors, position sensors (for example, global positioning system (GPS), etc.), location sensors, fuel sensors, motion sensors (for example, inertial measurement units (IMU), etc.), humidity sensors, occupancy sensors, or the like. The sensor data can include information that describes the location of objects within the surrounding environment of the AV 2502a, information about the environment itself, information about the location and motion of the AV 2502a, information about a route of the vehicle, or the like. As AV 2502a travels over a surface, at least some of the sensors may collect data pertaining to the surface.

The AV 2502a may also communicate lidar data, radar data, images and/or other sensed data to a remote computing device 2510 (for example, cloud processing system) over communications network 2508. Remote computing device 2510 may be configured with one or more servers to perform one or more processes of the technology described in this document. This is illustrated by way of example in FIG. 2, in which server 106 includes trip services 232 that may include a trip generator service 234, a trip manager service 236, and/or a route planning service 238. Returning to FIG. 25, remote computing device 2510 may also be configured to communicate data and instructions to and from the AV 2502a over network 2508. Similarly, remote computing device 2510 may be further configured to communicate data and instructions to and from additional remote server(s) and/or database(s) 2512.

Network 2508 may include one or more wired or wireless networks. For example, the network 2508 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 2502a may retrieve, receive, display, and edit information generated from a local application or delivered via network 2508 from database 2512. Database 2512 may be configured to store and supply raw data, indexed data, structured data, map data, program instructions or other configurations as is known. Database 2512 also may store one or more motion planning instruction sets which match or otherwise correspond to on-board motion planning systems of one or more known vehicles, such as vehicle 2502a. Some of the motion planning instruction sets in the database may be uniquely associated with specific vehicles, such as by associating a vehicle identifier with the set. Some of the motion planning instruction sets in the database may be associated with groups of vehicles, such as a group of vehicles of the same make, model and year. By replicating the motion planning instructions of vehicle 2502a in the cloud service, remote computing device may generate routes for vehicle 2502a in a way that improves upon prior systems that generate generic route plans offboard a vehicle, as will be described below.

The communications interface 2517 may be configured to allow communication between AV 2502a and external systems, such as, for example, external devices, sensors, other vehicles, servers, data stores, databases, infrastructure device, etc. The communications interface 2517 may utilize any now or hereafter known protocols, protection schemes, encodings, formats, packaging, etc. The communication protocols may include, without limitation, Wi-Fi, an infrared link, Bluetooth, etc. The user interface system 2515 may be part of peripheral devices implemented within the AV 2502a including, for example, a keyboard, a touch screen display device, a microphone, and a speaker, etc. The user interface 2515 may alternatively or additionally be provided at a client device.

Figure 26:
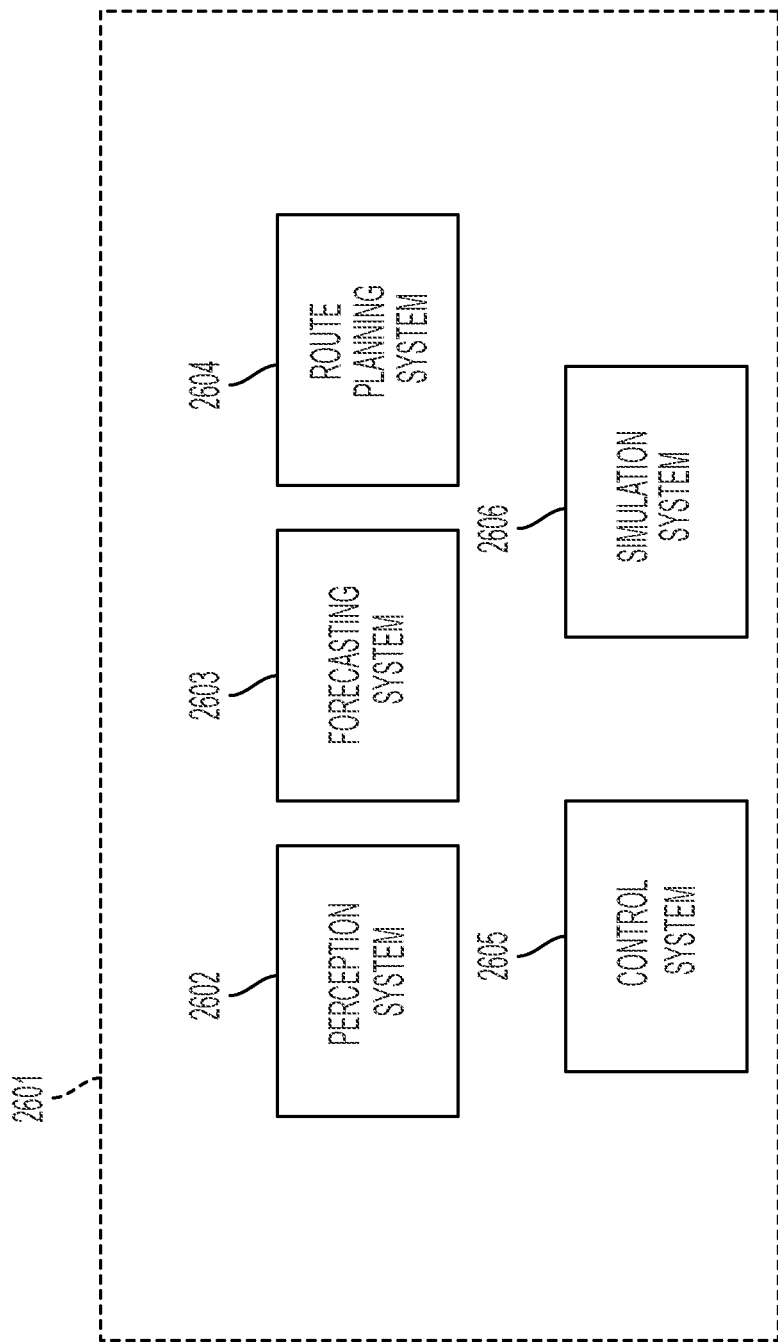
FIG. 26 illustrates example subsystems of an autonomous vehicle.

FIG. 26 shows a high-level overview of robotic device subsystems that may be relevant to the discussion below. Certain components of the subsystems may be embodied in processor hardware and computer-readable programming instructions that are part of the AV's on-board computing system 2601 (which is also represented as 620 in FIG. 6). However, as will be described below, some or all of the illustrated subsystems also may be replicated in a service provider system (such as 118 in FIG. 1).

The subsystems may include a perception system 2602 that includes sensors that capture information about moving actors and other objects that exist in the vehicle's immediate surroundings. Example sensors include cameras, LiDAR sensors, radar sensors, and the other sensors discussed above in the context of FIGS. 6 and 24. The data captured by such sensors (such as digital image, LiDAR point cloud data, or radar data) may be referred to as perception data. The perception system may include one or more processors, and computer-readable memory with programming instructions and/or trained artificial intelligence models that, during a run of the AV, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects may employ any suitable classification process, such as those that make bounding box predictions for detected objects in a scene and use convolutional neural networks or other computer vision models. Some such processes are described in Yurtsever et al., "A Survey of Autonomous Driving: Common Practices and Emerging Technologies" (published in IEEE Access, April 2020).

The perception system 2602 may deliver perception data to the forecasting system 2603. The forecasting system (which also may be referred to as a prediction system) will include processors and computer-readable programming instructions that are configured to process data received from the perception system and forecast actions of other actors that the perception system detects.

The perception system 2602, as well as the forecasting system 2603, will deliver data and information to the motion planning system 2604, and optionally to the control system 2605 so that the receiving systems may assess such data and initiate any number of reactive actions to such data. The motion planning system 2604 and control system 2605 include and/or share one or more processors and computer-readable programming instructions that are configured to process data received from the other systems, determine a trajectory for the vehicle or other robotic system, and output commands to hardware of the robotic system to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in IEEE Transactions on Intelligent Transportation Systems, vol. 17, no. 4 (April 2016).

The vehicle and/or the cloud deployment service also may include or have access to a simulation system 2606. A simulation system is a processor and data set of simulation scenarios. A simulation scenario is a data set of parameters and/or programming instructions that identify one or more objects in a scene, the initial locations of the objects, and configurations for the objects such as acceleration profiles or other profiles that guide the actor's possible movements in the scene. Some objects may be actors that are moving or which could move, such as vehicles, pedestrians or animals. Other objects also may be static objects that can occlude the field of view of the AV's perception system, such as vegetation or buildings. Simulation scenarios may include data obtained from actual runs of vehicles in the real world, data generated through manual or automated simulation processes, or both.

Figure 27:
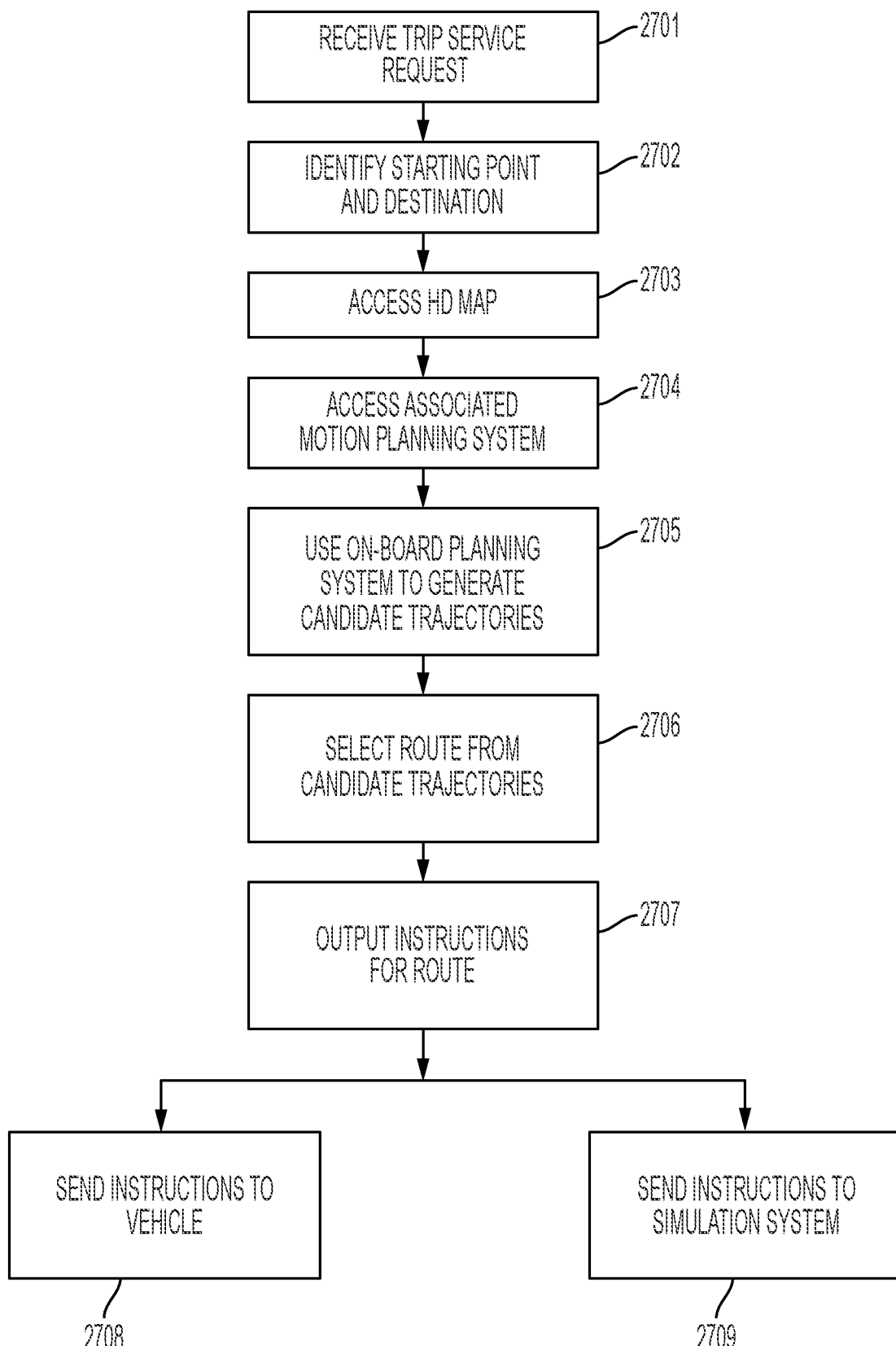
FIG. 27 illustrates a method by which a service provider system may operate as a cloud-based trip-planning and deployment service for a vehicle.

FIG. 27 illustrates a method by which a service provider system such as that described above may operate as a cloud-based trip planning and deployment service for one or more vehicles. When the cloud service receives a trip service request at 2701, it will generate a planned route for a vehicle (which we may refer to as a "first vehicle" in this discussion to distinguish it from other vehicles) as shown in this diagram.

At 2702, the service will identify a starting point and a destination for the trip service request. This information may be part of the trip service request, or the cloud service may do this in other ways such as by receiving GPS data or an address of the starting point or destination from an external service that is not part of the trip service request.

At 2703, the cloud service will access a high definition (HD) map that includes the starting point and the destination. An HD map is a vector map that represents observable, physical objects in parametric representations. The objects contained in a vector map are those features of a drivable area that define the drivable area and provide information that a vehicle can use to make decisions about how to move about the drivable area. Unlike raster maps which arrange data in the form of a grid of pixels, vector maps arrange data in the form of vertices and paths. The three basic symbol types of vector data are points (which are x, y coordinates, also known as nodes or vertices), lines (paths between nodes, also known as edges) and polygons (which are groups of points and lines that connect nodes and form a closed path).

The cloud service may include or have access to a data store that includes multiple candidate motion planning systems that are available for use. Each of the candidate motion planning systems will match the motion planning system that is loading on-board one or more actual vehicles. At 2704, the system will access the data store and select a motion planning system that corresponds to the system that is on-board the first vehicle. For example, as described above, the cloud service may operate as a service provider for one or more fleets of vehicles, in which each of the vehicles will include or otherwise be associated with a unique identifier. The unique identifier can include, but is not limited to, a Vehicle Identification Number (VIN), a Media Access Control (MAC) address, a serial number, and/or other unique string of symbols. To access the motion planning system that corresponds with that of the first vehicle, the system may receive a unique identifier for the first vehicle and access a motion planning system in cloud storage that is associated with that vehicle identifier. Alternatively, the system may receive a fleet identifier and access a motion planning system that is associated with all vehicles currently assigned to the identified fleet. In some embodiments, vehicles may be permitted to move between fleets, and in such situations the system will select and access the candidate motion planning system for the fleet to which the vehicle is assigned at the time of the request.

At 2705, the system will use the functions of the selected on-board motion planning system to generate multiple candidate trajectories for the first vehicle from the starting point to the destination in the map. The system may do this using any suitable trajectory planning system such as those described in the context of FIG. 26. At 2706, the system will select the planned route for the first vehicle from the candidate trajectories.

When generating the candidate trajectories, when selecting the planned route, or both, the system may do so based in part on one or more physical capabilities of the first vehicle. For example, the system may consider the length, height and/or possible turning radius of the first vehicle. If a candidate trajectory follows a path that the vehicle is not physically capable of following (for example, such as a curve radius of a road, or a vehicle height restriction, or a driveway with a sudden change in elevation that may cause the vehicle to get stuck when transitioning from flat to an upward angle), the system may eliminate the candidate trajectory from consideration as the selected route, or it may not consider that path to be a candidate trajectory at all.

In addition or alternatively, when generating the candidate trajectories, when selecting the planned route, or both, the system may do so based in part on one or more operating restrictions that correspond to the vehicle service request. For example, the ride service request may be associated with a particular tenant (for example, such as a delivery service or a ride hailing service). The system may store operating restrictions that the system must follow when generating a planned route for a ride service request which it implements for that tenant. Example restrictions may include condition-specific speed restrictions (for example, such as requiring that the vehicle reduce speed by a specified amount in rain, show or other certain weather conditions), location restrictions (for example, such as requiring that the vehicle operate only within certain permitted geographic zones, or requiring that the vehicle not operate in designated restricted zones), or other operating restrictions. For example, as described above in the context of FIG. 22, a vehicle or fleet may be associated with one or more particular geonets, each of which is a serviceable area with boundaries beyond which vehicle service is restricted. The boundaries may be a subset of HD map data that is available to the vehicle. If a candidate trajectory follows a path that is not permitted (or which is restricted) by the operating restrictions, the system may eliminate the candidate trajectory from consideration as the selected route, or it may not consider that path to be a candidate trajectory at all.

At 2707, the cloud service will output trip instructions that are configured to cause the motion control system of the first vehicle to move along the planned route. For example, the cloud service may transmit the trip instructions to the first vehicle (as in 2708), which may use the instructions to move along the planned route, and/or which may display the route on an in-vehicle display to an operator or passenger of the vehicle. As another example, at 2709 the cloud service may cause a simulation system to use the trip instructions to simulate a run of the first vehicle. For example, in the simulation a simulated vehicle's perception system may detect elements in the scene, and the system may compute a continued trajectory response to the detected elements. The continued trajectory may not change the trajectory, in which case it will cause the first vehicle to continue along the planned route in the simulation. Alternatively, the continued trajectory may be an alternate trajectory, such as one that will ensure that the vehicle avoids moving within a threshold distance of the object in the simulation.

Figure 28:
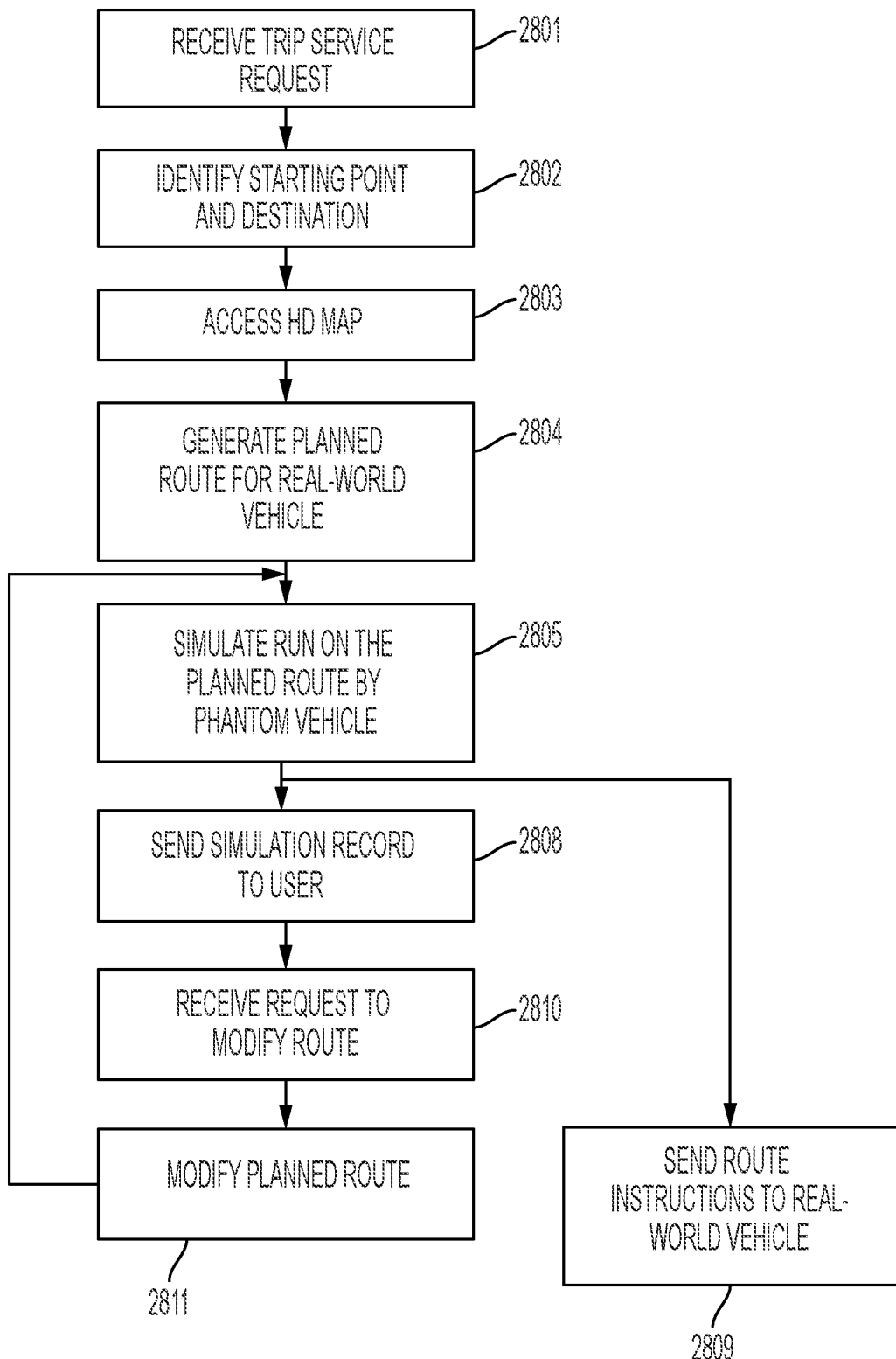
FIG. 28 illustrates a method by which a service provider system may use a phantom vehicle to assess a planned route before deploying a real-world vehicle along that route.

FIG. 28 illustrates a method by which a service provider system such as that described above may curate a run for a real-world vehicle by generating or otherwise using a virtual vehicle (referred to in this document as a "phantom vehicle") and simulate a run of the phantom vehicle on a planned route before actually sending the real vehicle on that route. This process can help the service provider, a tenant, or others view and assess how a real-world vehicle is likely to operate when it follows the planned route.

Many of the events of this process are similar to those discussed above in the context of FIG. 27. In addition, just as the vehicles may be associated with a fleet, phantom vehicles may be pre-generated and associated with a fleet, Phantom vehicles may have one or more characteristics of real vehicles, such as a vehicle class, dimensions, weight, make and model, and/or other characteristics. Just as real vehicles may be profiled in the system's database, a phantom vehicle may be profiled, although with an additional identification element that identifies the profile as being that of a phantom vehicle. Phantom vehicles may therefore be profiled and ready to receive service requests at any time. In addition, phantom vehicles in a fleet may be assigned to a particular tenant and configured to operate in compliance with a tenant-specific policy, as will be defined in more detail below in the discussion of FIG. 29. The cloud deployment service described above may include, or work alongside, a phantom vehicle deployment service.

In FIG. 28, when the cloud service receives a trip service request at 2801, or in response to another triggering event, the service will generate a planned route for a real-world vehicle that the service provider manages or otherwise addresses in its trip planning service.

At 2802, the cloud service will identify a starting point and a destination for a run of the vehicle during the trip. This information may be part of the trip service request, or the cloud service may do this in other ways such as by receiving GPS data or an address of the starting point or destination from an external service that is not part of the trip service request.

At 2803, the cloud service will access a high definition (HD) map that includes the starting point and the destination.

At 2804, the cloud service will generate a planned route for the real-world vehicle. The system may do this using any suitable trajectory planning process, including but not limited to those described above. For example, as with the method of FIG. 27, in step 2804 the service may identify and access a motion planning system for the vehicle, and it will use that motion planning system to generate multiple candidate trajectories for the real-world vehicle from the starting point to the destination in the map, and it may select the planned route from the candidate trajectories the planned route. The accessed motion planning system may be one that corresponds to the system that is on-board the real-world vehicle. The system may select the route based in part on one or more physical capabilities of the real-world vehicle, or based on one or more operating restrictions that correspond to the ride service request, again each as described above in the discussion of the cloud deployment service in FIG. 27.

Unlike in FIG. 27, in FIG. 28, the cloud service will also simulate a run by the phantom vehicle along the planned route. For example, in the simulation a phantom vehicle's perception system may detect elements in the scene, and the system may compute a continued trajectory response to the detected elements. The continued trajectory response may not change the initial trajectory, in which case it will cause the phantom vehicle to continue along the planned route in the simulation. Alternatively, the continued trajectory response may cause an alternate trajectory, such as one that will ensure that the phantom vehicle avoids moving within a threshold distance of the object in the simulation.

During the run, just like a real vehicle, the phantom vehicle may report its current location using GPS coordinates as obtained from HD map data. The phantom vehicle also may operate according to the tenant-specific policy that is assigned to the phantom vehicle's fleet at the time of the simulated operation. The phantom vehicle service will report the phantom vehicle's state along the route on a periodic basis, such as every 100 milliseconds (ms), or every 200 ms, or on another periodic timeline. For example, during the first iteration, the vehicle is at location_1. The next iteration, an elapsed time from the previous iteration is then calculated. Then, using the configured speed of the phantom vehicle and the elapsed time, the system will calculate the distance traveled along the route which results in location_2. The system then reports location 2 to be the phantom vehicle's current location. This process continues until the phantom vehicle reaches the end of the route.

At 2809, the cloud service may output trip instructions that are configured to cause the motion control system of the real-world vehicle to move along the planned route. For example, the cloud service may transmit the trip instructions to the vehicle, which may use the instructions to move along the planned route, and/or which may display the route on an in-vehicle display to an operator or passenger of the vehicle. Similarly, the planned route may be transmitted to any number of client devices.

Optionally, before or instead of sending the trip instructions to the real-world vehicle, the system may record at least some elements of the simulation and output the recorded simulation elements to a user at 2808. For example, the user may be a tenant who shares use of the real-world vehicle with one or more other tenants, and the service may transmit the record of the simulation to that tenant.

Optionally, after receiving and viewing the simulation record, the tenant or other user may submit to the cloud service a request to modify the planned route at 2810. When the cloud service receives a modification request at 2811, it may use the modify the planned route to modify the route, such as my applying a restriction to avoid a specified road or area, or to follow a particular road or navigate through a particular area. When this happens, the system may return to step 2805 and simulate a run of the modified planned route. It may then send a new simulation record to the user at 2808 and/or send modified route instructions to the vehicle at 2809.

As noted above, the phantom vehicle service results may indicate the route that the phantom vehicle took during the simulated trip, the movements of the phantom vehicle along the route, and/or whether the trip was completed by the phantom vehicle. The present solution is not limited to the particulars of this example.

Figure 29:
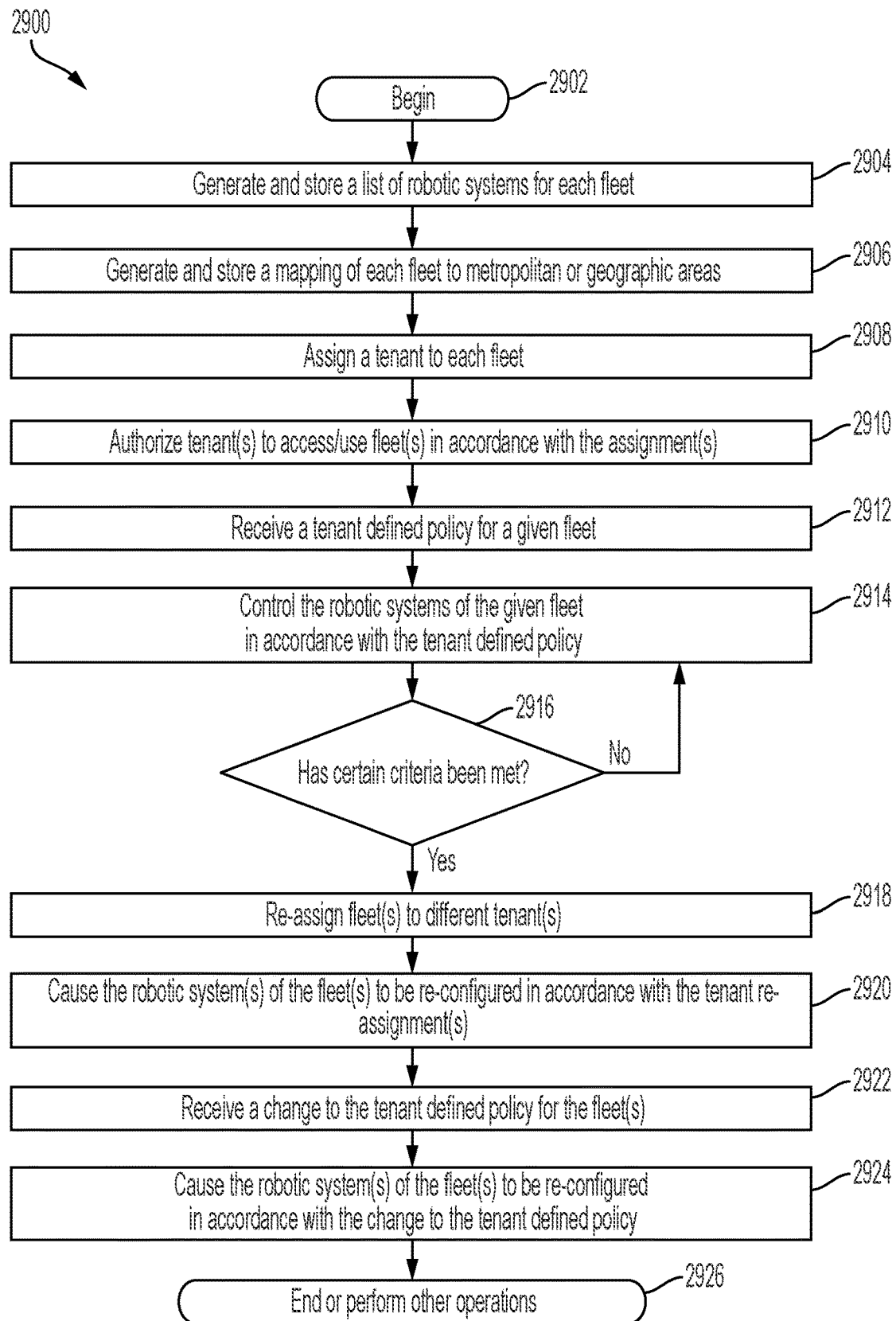
FIG. 29 illustrates a method for fleet management.

FIG. 29 provides a flow diagram of an illustrative method 2900 for fleet management. Method 2900 can be implemented by the fleet management service 210 of FIG. 2. Method 2900 begins with 2902 and continues with 2904 where a list of robotic system(s) (for example, robotic system(s) $116_1, \ldots, 116_N$) for each fleet (for example, fleet(s) 152 of FIG. 1) is generated by a computing device (for example, server(s) 106 and/or client device(s) 134 of FIG. 1) and stored in datastore(s) (for example, datastore 128 of FIG. 1). A mapping is generated in 2906 that maps each fleet to one or more metropolitan or geographic areas (for example, metropolitan area(s) $160_N$ of FIG. 1). The mapping can be generated manually by an operator of the system or automatically based on location information received from the robotic systems (for example, GPS information). In 2908, a tenant (for example, tenant $114_i$ or $114_N$ of FIG. 1) is assigned to each fleet. The system can then authorize tenant access to and use of fleet(s) in accordance with the assignment(s), as shown by 2910. The authorization can be achieved in the same as or similar to that described in relation to FIGS. 7-14.

In 2912, the system receives a tenant-specific policy for a given fleet. The tenant-specific policy can specify rule(s) and/or parameter setting(s) (for example, enterprise-wide) that are to be complied with by the robotic systems of the given fleet when the fleet is assigned to the tenant with whom the policy is associated. The parameters may be defined by the tenant, by the fleet management service provider, or by a combination of the two. For example, the specified rule(s) and/or parameter setting(s) can define: a time of day that the robotic systems are to leave a terminal or parking lot; a time of day that the robotic systems are to return to the terminal or parking lot; a maximum speed; a maximum and/or minimum braking distance; a radio channel on which one or more communication or audio systems of the robotic systems will operate; a maximum speaker volume for audio systems within the vehicle or other robotic system; a metropolitan or other geographic area constraint; route constraint(s); ride or delivery rate(s); re-fueling/re-charging location(s) and/or time(s); and/or mobile device usage constraint(s) (for example, smart phones can only establish a short range communication with the robotic system(s) when certain criteria is met). The specified rule(s) and/or parameter setting(s) can overwrite parameter values set during manufacturing of the robotic system. The present solution is not limited to the particulars of this example. The system may store tenant-specific policies for multiple tenants in a data store and/or access a data store that contains such policies.

In 2914, when a fleet is assigned to a tenant, the fleet management system performs operations to remotely control the robotic system(s) of the given fleet in accordance with the tenant-specific policy for that tenant. For example, a tenant-specific policy may specify hours of operation during which robotic systems in a fleet will be assigned to that tenant (for example, 8 AM EST-3 PM EST, Monday through Friday). The system will automatically control the robotic systems of the fleet to comply with all parameters of the tenant-specific policy during that time period (i.e., hours of operation). In effect, the robotic systems are caused to be dispatched from a terminal at the start of the operating hours for the given tenant (for example, 8 AM EST) and return to the terminal or assigned to a different tenant at the end of the operating hours (for example, 3 PM EST). The present solution is not limited to the particulars of this example. For example, a robotic system may be assigned to different tenant (and thus provided with a different tenant-specific policy), or even a different fleet, when certain conditions are satisfied. For example, movement of a vehicle from one geographic area into another (such as across a state, country or city boundary) may trigger assignment of a different tenant-specific policy to the vehicle, or assignment of the vehicle to a different fleet.

Next in 2916, the system detects when certain criteria are met (or when previously-satisfied criteria are no longer met). For example, the system may detect when a certain period of time has expired or a particular service is to be provided by a robotic system. The present solution is not limited in this regard. When such a detection of certain criteria is made [2916:YES], the fleet(s) is(are) re-assigned to other tenant(s) at 2918. For example, a given fleet is first assigned to a first tenant and then re-assigned to a second different tenant responsive to the system's detection that certain criteria has been met. The present solution is not limited in this regard. The robotic system(s) of the fleet(s) is/are caused to be re-configured in accordance with the tenant re-assignment(s), as shown by 2920.

In 2922, the system receives a change to the tenant-specific policy for the fleet(s). The change may be a modification to a policy under which a fleet is currently operating or a change in the tenant (and thus a change in the tenant-specific policy) in which the fleet is to operate at a given time. In response to this change, the system performs operations to cause the robotic system(s) of the fleet(s) to be re-configured in accordance with the change as shown by 2924. The re-configuration can include, but is not limited to, setting (or modifying) radio parameters, setting a maximum speed, setting (or modifying) a distance between the robotic system and another robotic system at which breaking is to be initialized, setting (or modifying) a time parameter for the robotic system(s) to leave a terminal, setting (or modifying) ride/delivery rates, and/or setting (or modifying) a time parameter for the robotic system(s) to return to a terminal. Subsequently, 2926 is performed where method 2900 ends or other operations are performed.

Thus, as described above, in a first aspect, the present disclosure concerns implementing systems and methods for managing permissions and authorizing access to a service supported by a computing device. The methods comprise, by a computing device (for example, a server): intercepting a request to access the service sent along with a certificate including a first tenant identifier (the first tenant identifier identifying a first business entity other than a second business entity providing the service); using the first tenant identifier to obtain permission information from a datastore (the permission information specifying which resources of a plurality of resources can be returned in response to requests from the first business entity); generating a web authentication token including the first tenant identifier and the permission information; and initiating operations of the service in response to a validation of the web authentication token. The permission information comprises a second tenant identifier, a metropolitan identifier identifying a metropolitan area, and a fleet identifier identifying a fleet of robotic systems remotely located from the computing device. The second tenant identifier may be the same as or different than the first tenant identifier.

In some scenarios, the methods of the first aspect also comprise: performing the operations of the service to cause a remotely located robotic system (for example, an autonomous vehicle) of a fleet to provide a ride to passenger(s) or deliver an item to a receiving location; and/or providing resources to a remote computing device associated with the first tenant identifier as part of the service. The total number of resources is variable based on values of the metropolitan identifier and fleet identifier. In this regard, the total number of resources is greater when at least one of the metropolitan and fleet identifiers has a null value as compared to when both the metropolitan and fleet identifiers have values other than null values.

In some scenarios, the methods of the first aspect also comprise receiving a tenant-specific policy for the fleet and remotely controlling the robotic systems of the fleet in accordance with the tenant-specific policy for the fleet. The methods also may comprise receiving a change to the tenant-specific policy for the fleet and causing the robotic systems of the fleet to be re-configured in accordance with the change to the tenant-specific policy.

In some scenarios, the methods of the first aspect comprise assigning the first business entity to the fleet, detecting when certain criteria have been met, and dynamically reassigning a different business entity to the fleet responsive to the detecting. The methods also may comprise causing the robotic systems of the fleet to be re-configured in accordance with the re-assignment of the fleet to the different business entity.

In the first aspect or any of the other aspects, this document also concerns implementing systems and methods for managing permissions and authorizing access to a service supported by a system. The methods comprise by a server: receiving an authentication token from a client device; using a user identity of the authentication token to obtain permission information from a datastore (the permission information specifying which resources of a plurality of resources can be returned in response to requests from a user of the client device); converting the authentication token into a web authentication token including the user identity and the permission information; receiving a request to access the service sent along with the web authentication token; and initiating operations of the service in response to a validation of the web authentication token. The server and the client device may be owned and operated by a single entity providing the service to other entities.

The converting described above can be achieved by: removing a signature from the authentication token; appending the permission information to a payload portion of the authentication token; generating a new signature using a hashing algorithm; and appending the new signature to the payload permission information to produce the web authentication token. The permission information may include, but is not limited to, a user identifier identifying the user, a metropolitan identifier identifying a metropolitan area, and a fleet identifier identifying a fleet of robotic systems remotely located from the computing device. The user identifier of the permission information may be the same as or different than the user identity.

The methods of this or any aspect may also comprise, alone or in combination with other aspects: performing the operations of the service to cause a remotely located robotic system (for example, an autonomous vehicle) of a fleet to provide a ride to a passenger or deliver an item to a receiving location; and/or providing resources to the client device as part of the service, wherein the total number of resources is variable based on values of the metropolitan identifier and fleet identifier. The total number of resources is greater when at least one of the metropolitan and fleet identifiers has a null value as compared to when both the metropolitan and fleet identifiers have values other than null values.

This disclosure also describes methods, systems and computer program products for managing a fleet of robotic systems, the methods, which may be used in any of the aspects described herein, may comprise: using, by a server, a first authentication token to obtain permission information from a datastore. The methods also comprise identifying a first tenant associated with the first authentication token and accessing a first tenant-specific policy for the first tenant. The methods also comprise, in response to one or more first conditions satisfying the first tenant-specific policy, assigning a fleet of robotic systems to the first tenant and causing the robotic systems to operate according to the first tenant-specific policy while the one or more first conditions continue to be satisfied. The methods also comprise, in response to determining that the one or more conditions no longer continue to be satisfied: identifying a second tenant associated with a second authentication token; accessing a second tenant-specific policy for the second tenant; and in response to one or more second conditions satisfying the second tenant-specific policy, assigning the fleet of robotic systems to the second tenant and causing the robotic systems to operate according to the second tenant-specific policy while the one or more second conditions continue to be satisfied.

In a second aspect, this disclosure describes methods, systems and computer program products for estimating a time of arrival for a vehicle at a destination. The system will include a processor, which may include a processor of a producer of adjacency graph as described below, a user of the graph, or a combination of the two. The system and computer program product will include a computer-readable memory and programming instructions that are configured to cause the processor to implement the method. The processor may receive navigation data indicating a present location of the vehicle along a route to a location in a geographic area. The processor will access an adjacency graph comprising various nodes and edges, in which (a) each node is associated with a unique location in a geographic area in which a vehicle is traveling, and (b) each edge connects two of the nodes and is associated with an estimated travel time between the two nodes to which the edge is connected. The processor will select, from locations in adjacency graph, a first location that is near a present location of the vehicle and a second location that is near the destination. The first location will be associated with a first node in the adjacency graph and the second location will be associated with a second node in the adjacency graph. The processor will calculate a shortest path along the edges in the adjacency graph from the first node to the second node. The processor will then calculate an estimated time of arrival (ETA) for the vehicle as a function of the estimated travel times of the edges along the shortest path. The processor will then generate a message that includes the ETA.

Optionally, in some embodiments of the second aspect, whether alone or in combination with other aspects, to select the second location that is closest to the destination, the processor may send a request to a service that stores the adjacency graph to identify, from the nodes in the adjacency graph, a node having coordinates closed to the destination. Optionally, the request may include a request to not return any node having coordinates that are not reachable from the route.

Optionally, in any of the embodiments of the second aspect, whether alone or in combination with other aspects, to calculate the shortest path, the system may use Dijkstra's algorithm, Floyd's algorithm, a depth-first search algorithm, a breadth-first search algorithm, or the Bellman-Ford algorithm. In addition, when calculating the shortest path the system may disqualify from inclusion in the shortest path any edge that leads to a node that is not reachable via the route.

Optionally, in any of the embodiments of the second aspect, whether alone or in combination with other aspects, to calculate the ETA as a function of the estimated travel times of the edges along the shortest path comprise instructions to generate a sum of the estimated travel times of the edges along the shortest path. In addition, to calculate the ETA as a function of the estimated travel times of the edges along the shortest path the system also may, upon receiving traffic data for one or more geographic areas that correspond one or more of the nodes along the shortest path, adjust one or more of the estimated travel times based on the traffic data. Alternatively, upon receiving traffic data for a geographic area that corresponds to an identified node in the adjacency graph, the system may adjust the estimated travel times for each edge to which the identified node is connected each based on the traffic data.

Optionally, in any of the embodiments of the second aspect, whether alone or in combination with other aspects, the system may generate the adjacency graph by: (i) accessing a set of points that represent potential destinations in the geographic area; (ii) converting each of the points to a lane in the geographic area to yield a set of lanes; (iii) for each lane in the set, applying Dijkstra's algorithm until another lane in the set is reached to yield at least one adjacent vertex for the lane; and (iv) generating a mapping of each lane in the set to each of its adjacent vertices to yield the adjacency graph.

In a third aspect, this disclosure describes methods, systems and computer program products for generating a planned path for a first vehicle. A processor that is remote from the first vehicle will, upon receiving a trip service request for the first vehicle, access a data store containing a plurality of candidate motion planning systems. Each of the candidate motion planning systems is associated with at least the first vehicle, or at least one fleet of vehicles. The processor will identify a starting point and a destination for the trip service request, and it will access a high definition map that includes the starting point and the destination. The processor will use an identifier for the first vehicle or for a fleet with which the first vehicle is associated to select, from the candidate motion planning systems, a motion planning system that corresponds to the first vehicle or to the fleet with which the first vehicle is associated. The processor will then use the functions of the selected motion planning system to generate a plurality of candidate trajectories for the first vehicle from the starting point to the destination in the map. The processor will select the planned route from the candidate trajectories, and it will then output trip instructions that are configured to cause the motion control system of the first vehicle to move along the planned route. Optionally, the processor may transmit the trip instructions to the first vehicle. Also optionally, the processor may cause a simulation system to use the trip instructions to simulate a run of the first vehicle.

In any of the embodiments described above for the third aspect, whether alone or in combination with other aspects, when using the functions of the selected motion planning system to generate the plurality of candidate trajectories for the first vehicle, the selecting the planned route, or both the processor may do so based in part on one or more physical capabilities of the first vehicle.

In any of the embodiments described above for the third aspect, whether alone or in combination with other aspects, when using the functions of the selected motion planning system to generate the plurality of candidate trajectories for the first vehicle, selecting the planned route, or both comprise instructions to do so based in part on one or more operating restrictions that correspond to the trip service request.

In a fourth aspect, this disclosure describes methods, systems and computer program products for generating a planned path for a real-world vehicle. The system will include a processor that is remote from the vehicle, a data store of vehicle profiles, and a computer-readable memory containing programming instructions that are configured to cause the processor to perform the steps described below. The processor will identify a starting point and a destination for a run of the real-world vehicle. The processor will select, from the data store of vehicle profiles, a phantom vehicle having an associated motion planning system that corresponds to a system that is deployed on the real-world vehicle. The processor will access a high definition map that includes the starting point and the destination, and it will use the high definition map to generate a planned route for the real-world vehicle from the starting point to the destination in the map. The processor will run a simulation in which the phantom vehicle moves along the planned route in the map. The processor will then output a record of the simulation to a user of the real world-vehicle or to a system of the real-world vehicle.

Optionally, in the fourth aspect the user may be a first tenant who shares use of the vehicle with one or more other tenants. If so, then when outputting the record of the simulation to the user the system may transmit the record of the simulation to the first tenant. Optionally, after transmitting the record of the simulation to the first tenant and in response to receiving a modification request from the first tenant, the system may use the modification request to modify or replace the planned route with a modified route. Optionally, when running the simulation in which the phantom vehicle moves along the planned route in the map, the system may access a first tenant-specific policy for the first tenant, and the system may cause the phantom vehicle to operate according to the first tenant-specific policy while running the simulation. Then, the system may later access a second tenant-specific policy for a second tenant, use the high definition map to generate a second planned route for the real-world vehicle in the map; run a second simulation in which the phantom vehicle moves along the second planned route according to the second tenant-specific policy, and output a record of the second simulation to the second tenant.

In any of the embodiments described above for the fourth aspect, whether alone or in combination with other aspects, the system may output trip instructions that are configured to cause a motion control system of the real-world vehicle to move along the planned route.

In any of the embodiments described above for the fourth aspect, whether alone or in combination with other aspects, generating the planned route for the real-world vehicle may include generating a plurality of candidate trajectories for the first vehicle from the starting point to the destination in the map, and then selecting the planned route from the candidate trajectories.

In any of the embodiments described above for the fourth aspect, whether alone or in combination with other aspects, the system may include and/or access a data store of candidate motion planning systems. Each of the candidate motion planning systems will be associated with one or more vehicles or one or more fleets. Before generating the planned route for the first vehicle, the system may identify the candidate motion planning system that is associated with the first real-world or one of the fleets of which the real-world vehicle is a part. Then, when selecting the phantom vehicle, the system may select the phantom vehicle that is associated with a motion planning system that matches the identified candidate motion planning system.

In any of the embodiments described above for the fourth aspect, whether alone or in combination with other aspects, when running the simulation in which the phantom vehicle moves along the planned route, a phantom vehicle service may, on a periodic basis, report a current location of the phantom vehicle to the cloud deployment service.

In any of the embodiments described above for the fourth aspect, whether alone or in combination with other aspects, when using the high definition map to generate a planned route for the real-world vehicle, the system may use the functions of the associated motion planning system to generate a plurality of candidate trajectories for the real-world vehicle based in part on (a) one or more physical capabilities of the first vehicle, and/or (b) one or more operating restrictions that correspond to the trip service request.

In a fifth aspect, this disclosure describes methods, systems and computer program products for obtaining serviceable areas for a robotic system in a metropolitan area. The methods include obtaining, by a computing device, information specifying places where (i) the robotic system can route to and from in the metropolitan area or (ii) the robotic system can stop in the metropolitan area. The methods include using, by the computing device, the information to generate clusters of places where the robotic system can route or stop in the metropolitan area. The methods include creating, by the computing device, a geometric shape for each cluster. Each such shape has a boundary defined by outermost places contained in the cluster. The methods include using, by the computing device, the geometric shapes to define the serviceable areas for the robotic system within the metropolitan area. The methods also include using, by the computing device, the serviceable areas to generate a map showing at least one geographic area representing a portion of the metropolitan area where a concentrated number of the places exist.

Optionally, the methods of the fifth aspect, whether alone or in combination with other aspects, also may include causing, by the computing device, the robotic system to be controlled based on contents of the map.

Optionally, in the fifth aspect alone or in combination with other aspects, the robotic system may comprise an autonomous vehicle. The autonomous vehicle may be caused to autonomously travel from a first place in the metropolitan area to a second different place in the metropolitan area.

Optionally, in the fifth aspect alone or in combination with other aspects, the clusters may be generated based on at least one of a distance between two places where the robotic system can route or stop in the given metropolitan area, a minimum number of places required for a cluster, a minimum number of neighbor places for a given place where the robotic system can route or stop in the given metropolitan area, and a reachability of a place to all other neighboring places where the robotic system can route or stop in the given metropolitan area.

Optionally, in the fifth aspect alone or in combination with other aspects, the clusters may be generated using a density-based spatial clustering of applications with noise algorithm, a concave hull algorithm, or a convex hull algorithm.

Optionally, in the fifth aspect alone or in combination with other aspects, the geometric shape may be created using a Graham's scan algorithm.

Optionally, any of the methods above also may comprise validating the information by using at least one of current road condition information, traffic information, road repair information, road closure information, school zone information, pickup-drop off hour information, predicted high traffic area information, and environmental condition information. Such methods also may include modifying the information based on results of the validating.

Optionally, any of the methods above also may include receiving a request for the serviceable areas from a remote computing device and communicating a response to the request that causes the map to be displayed by the remote computing device.

The implementing systems described above can comprise: a processor; and a non-transitory computer-readable storage medium comprising programming instructions that are configured to cause the processor to implement a method for operating an automated system. The above-described methods can also be implemented by a computer program product comprising a memory and programming instructions that are configured to cause a processor to perform operations.

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited to such embodiments. Other embodiments and modifications to them are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described herein) have significant utility to fields and applications beyond the examples described in this document.

Embodiments have been described in this document with the aid of functional building blocks illustrating the implementation of specified functions and relationships thereof. The boundaries of these functional building blocks have been arbitrarily defined in this document for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described in this document.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments but should be defined only in accordance with the following claims and their equivalents.

The invention claimed is:

1. A method of determining an estimated time of arrival (ETA) at which a vehicle will arrive at a destination, the method comprising, by a processor:
receiving navigation data indicating a present location of the vehicle as autonomous driving operations of the vehicle are being controlled to cause the vehicle to travel along a route to a location in a geographic area;

accessing an adjacency graph comprising a plurality of nodes and edges, in which:
  each node is associated with a unique location in the geographic area, and
  each edge connects two of the nodes and is associated with an estimated travel time between the two nodes to which the edge is connected;
selecting, from locations in the adjacency graph, a first location that is near the present location of the vehicle and a second location that is near the destination, wherein the first location is associated with a first node in the adjacency graph and the second location is associated with a second node in the adjacency graph;
calculating a shortest path along the edges in the adjacency graph from the first node to the second node using Dijkstra's algorithm, Floyd's algorithm, a depth-first search algorithm, a breadth-first search algorithm, or a Bellman-Ford algorithm;
calculating the ETA as a function of the estimated travel times of the edges along the shortest path;
generating a message that includes the ETA for a trip; and
performing operations by a control system to control movement of the vehicle along a route planned for the trip.

2. The method of claim 1, wherein selecting the second location comprises sending a request to a service that stores the adjacency graph to identify, from the nodes in the adjacency graph, a node having coordinates closest to the destination.

3. The method of claim 2, wherein the request also comprises a request to not return any node having coordinates that are not reachable from the route.

4. The method of claim 1, wherein calculating the shortest path comprises disqualifying from inclusion in the shortest path any edge that leads to a node that is not reachable via the route.

5. The method of claim 1, wherein calculating the ETA comprises generating a sum of the estimated travel times of the edges along the shortest path.

6. The method of claim 5, wherein calculating the ETA further comprises:
  receiving traffic data for one or more geographic areas that correspond one or more of the nodes along the shortest path; and
  adjusting one or more of the estimated travel times based on the traffic data.

7. The method of claim 5, further comprising, before calculating the shortest path:
  receiving traffic data for a geographic area that corresponds to an identified node in the adjacency graph; and
  adjusting the estimated travel times for each edge to which the identified node is connected each based on the traffic data.

8. The method of claim 1, further comprising generating the adjacency graph by:
  accessing a set of points that represent potential destinations in the geographic area;
  converting each of the points to a lane in the geographic area to yield a set of lanes;
  for each lane in the set, applying Dijkstra's algorithm until another lane in the set is reached to yield at least one adjacent vertex for the lane; and
  generating a mapping of each lane in the set to each of its adjacent vertices to yield the adjacency graph.

9. A system for estimating a time of arrival for a vehicle at a destination, the system comprising:
a processor; and
a computer-readable medium containing programming instructions that are configured to instruct the processor to:
  receive navigation data indicating a present location of the vehicle as autonomous driving operations of the vehicle are being controlled to cause the vehicle to travel along a route to a location in a geographic area;
  access an adjacency graph comprising a plurality of nodes and edges, in which:
    each node is associated with a unique location in the geographic area in which the vehicle is traveling; and
    each edge connects two of the nodes and is associated with an estimated travel time between the two nodes to which the edge is connected,
  select, from locations in adjacency graph, a first location that is near a present location of the vehicle and a second location that is near the destination, wherein the first location is associated with a first node in the adjacency graph and the second location is associated with a second node in the adjacency graph,
  calculate a shortest path along the edges in the adjacency graph from the first node to the second node using Dijkstra's algorithm, Floyd's algorithm, a depth-first search algorithm, a breadth-first search algorithm, or a Bellman-Ford algorithm,
  calculate an estimated time of arrival (ETA) for the vehicle as a function of the estimated travel times of the edges along the shortest path, and
  generate a message that includes the ETA for a trip; and
  control operations of the vehicle to move along a route planned for the trip.

10. The system of claim 9, wherein the instructions to select the second location comprise instructions to send a request to a service that stores the adjacency graph to identify, from the nodes in the adjacency graph, a node having coordinates closed to the destination.

11. The system of claim 10, wherein the request also comprises a request to not return any node having coordinates that are not reachable from the route.

12. The system of claim 9, wherein the instructions to calculate the shortest path further comprise instructions to disqualify from inclusion in the shortest path any edge that leads to a node that is not reachable via the route.

13. The system of claim 9, wherein the instructions to calculate the ETA comprise instructions to generate a sum of the estimated travel times of the edges along the shortest path.

14. The system of claim 13, wherein the instructions to calculate the ETA further comprise instructions to:
  upon receiving traffic data for one or more geographic areas that correspond one or more of the nodes along the shortest path, adjust one or more of the estimated travel times based on the traffic data.

15. The method of claim 13, further comprising instructions to, before calculating the shortest path:
  upon receiving traffic data for a geographic area that corresponds to an identified node in the adjacency graph, adjust the estimated travel times for each edge to which the identified node is connected each based on the traffic data.

16. The system of claim 9, further comprising instructions to generate the adjacency graph by:
- accessing a set of points that represent potential destinations in the geographic area;
- converting each of the points to a lane in the geographic area to yield a set of lanes;
- for each lane in the set, applying Dijkstra's algorithm until another lane in the set is reached to yield at least one adjacent vertex for the lane; and
- generating a mapping of each lane in the set to each of its adjacent vertices to yield the adjacency graph.

17. A computer program product for estimating a time of arrival for a vehicle at a destination, the computer program product comprising a memory and programming instructions that are configured to instruct a processor to:
- receive navigation data indicating a present location of the vehicle as autonomous driving operations of the vehicle are being controlled to cause the vehicle to travel along a route to a location in a geographic area;
- access an adjacency graph comprising a plurality of nodes and edges, in which:
  - each node is associated with a unique location in the geographic area in which the vehicle is traveling, and
  - each edge connects two of the nodes and is associated with an estimated travel time between the two nodes to which the edge is connected;
- select, from locations in adjacency graph, a first location that is near a present location of the vehicle and a second location that is near the destination, wherein the first location is associated with a first node in the adjacency graph and the second location is associated with a second node in the adjacency graph;
- calculate a shortest path along the edges in the adjacency graph from the first node to the second node using Dijkstra's algorithm, Floyd's algorithm, a depth-first search algorithm, a breadth-first search algorithm, or a Bellman-Ford algorithm;
- calculate an estimated time of arrival (ETA) for the vehicle as a function of the estimated travel times of the edges along the shortest path; and
- generate a message that includes the ETA for a trip; and
- control operations of the vehicle to move along a route planned for the trip.

18. The computer program product of claim 17, further comprising programming instructions to generate the adjacency graph by:
- accessing a set of points that represent potential destinations in the geographic area;
- converting each of the points to a lane in the geographic area to yield a set of lanes;
- for each lane in the set, applying Dijkstra's algorithm until another lane in the set is reached to yield at least one adjacent vertex for the lane; and
- generating a mapping of each lane in the set to each of its adjacent vertices to yield the adjacency graph.

* * * * *